(12) United States Patent
Verbeke et al.

(10) Patent No.: US 7,805,407 B1
(45) Date of Patent: Sep. 28, 2010

(54) SYSTEM AND METHOD FOR DYNAMIC CONFIGURATION OF REPLICATED DATABASE SERVERS

(75) Inventors: Jerome M. Verbeke, San Jose, CA (US); Neelakanth M. Nadgir, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1563 days.

(21) Appl. No.: 10/869,664

(22) Filed: Jun. 16, 2004

(51) Int. Cl.
*G06F 17/30* (2006.01)

(52) U.S. Cl. .................................... 707/634

(58) Field of Classification Search ......... 707/101, 707/102, 103
See application file for complete search history.

(56) References Cited

U.S. PATENT DOCUMENTS

| | | | |
|---|---|---|---|
| 5,606,693 A | 2/1997 | Nilsen et al. |
| 5,668,986 A | 9/1997 | Nilsen et al. |
| 5,737,601 A | 4/1998 | Jain et al. |
| 5,806,075 A | 9/1998 | Jain et al. |
| 5,924,096 A | 7/1999 | Draper et al. |
| 6,339,841 B1 | 1/2002 | Merrick et al. |
| 6,446,092 B1 | 9/2002 | Sutter |
| 6,470,494 B1 | 10/2002 | Chan et al. |
| 6,496,850 B1 | 12/2002 | Bowman-Amuah |
| 6,571,388 B1 | 5/2003 | Venkatraman et al. |
| 6,578,068 B1 | 6/2003 | Bowman-Amuah |
| 6,715,100 B1 | 3/2004 | Hwang |
| 2004/0015936 A1 | 1/2004 | Susarla et al. |
| 2004/0098447 A1 | 5/2004 | Verbeke et al. |
| 2004/0148326 A1 | 7/2004 | Nadgir et al. |

2004/0261069 A1 12/2004 Verbeke et al.

OTHER PUBLICATIONS

Gong, "Project JTXA: A Technology Overview", Sun Microsystems, Inc., 2001, pp. 1-11.*

Verbeke et al., "Framework for Peer-to-Peer Distributed Computing in a Heterogeneous, Decentralized Environment", Sun Microsystems Inc., 2002, pp. 1-13.*

Charlie Kindel, "The uuid: URI Scheme," URL Working Group, Nov. 24, 1997, (5 Pages).

Leach et al., "UUIDs and GUIDs," Network Working Group, Feb. 4, 1998(29 Pages).

Goodman et al., "A Recovery Algorithm for a Distributed Database System," 1983 ACM, 1983, (pp. 8-15).

(Continued)

*Primary Examiner*—Neveen Abel Jalil
*Assistant Examiner*—Farhan M Syed
(74) *Attorney, Agent, or Firm*—Robert C Kowert; Meyertons, Hood, Kivlin, Kowert & Goetzel, P.C.

(57) ABSTRACT

System and method for the dynamic configuration of replicated database servers. Embodiments may provide a mechanism to dynamically and automatically replace lost server nodes with a pool node to maintain a necessary or desired level of replication. Some embodiments may provide a mechanism or mechanisms to dynamically and automatically increase the number of server nodes to meet an increase in demand, and to dynamically and automatically decrease the number of server nodes during periods of decreased demand. To maintain consistency among the database replicas, some embodiments may provide a mechanism or mechanisms for synchronizing the database replicas on the server nodes. In one embodiment, the nodes may be peer nodes in a peer-to-peer network, and the pool nodes may be a peer group.

49 Claims, 28 Drawing Sheets

OTHER PUBLICATIONS

"Class java.lang.ClassLoader," Sun Microsystems, Inc., *Submit a bug or feature*—Version 1.1.8 of Java Platform API Specification, 1995-1999, 6 pages.
"iPlanet Application Server Overiew Guide", Chapters 2 & 4, Sun Microsystems, Inc., 2000, 14 pages.
"Programmer's Guide (Java™), iPlanet Application Server," Release 6.0, Apr. 2000, pp. 289-291.
"Java Language Reference," O'Reilly, $2^{nd}$ Edition, Jul. 1997, 11 pages.
Liang et al., Dynamic Class Loading in Java™ Virtual Machine, ACM, (pp. 36-44), Oct. 1998.
Gong, "Secure Java Class Loading," IEEE (pp. 56-61), Dec. 1998.
IBM Technical Disclosure Bulletin, "Java Dynamic Class Loader," vol. 39, No. 11, (pp. 107-108), Nov. 1996.
Juan Carlos Soto, "The Time is Right for P2P and Project JXTA," Project JXTA Technical Introduction, Dec. 2002, (37 pages).

* cited by examiner

SYSTEM AND METHOD FOR DYNAMIC CONFIGURATION OF REPLICATED DATABASE SERVERS

BACKGROUND OF THE INVENTION

1. Field of the Invention

This invention relates to network computing systems, and more particularly to replicating data in networks including peer-to-peer networks.

2. Description of the Related Art

Peer-to-Peer Networking

The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. In addition to improving the performance of information discovery, content delivery, and information processing, such a style also can enhance the overall reliability and fault-tolerance of computing systems.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

JXTA

JXTA technology is a set of open protocols that allow any connected device on the network ranging from cell phones and wireless PDAs to PCs and servers to communicate and collaborate in a P2P manner. JXTA peers create a virtual network where any peer can interact with other peers and resources directly even when some of the peers and resources are behind firewalls and NATs (Network Address Translators) or are on different network transports. In JXTA, every peer is identified by an ID (identifier), unique over time and space. Peer groups are user-defined collections of entities (peers) that share a common interest. Peer groups are also identified by unique IDs. Peers can belong to multiple peer groups, can discover other entities and peer resources (e.g. peers, peer groups, services, content, etc.) dynamically and can also publish themselves and resources so that other peers can discover them.

Distributed Computing Systems

In a distributed computing environment, code (e.g. an application, applet, servlet, executable code fragment, or any other computer-executable code) on one machine or virtual machine (e.g. Java Virtual Machine (JVM)) can be distributed to and run on different machines and/or on different virtual machines (e.g. JVMs).

A distributed computing environment may provide a framework for large computational tasks that can be split over a large number of nodes and run in parallel. For instance, a Monte-Carlo simulation may take several months to run. Monte-Carlo simulations can typically be split into several thousands of tasks and run in parallel over a large number of computing nodes. A database may be used to keep track of the tasks that have not been sent to computing nodes for execution, the tasks that have already been submitted to computing nodes, and the tasks that have completed and for which the results are available.

Conventional distributed computing systems such as SETI@Home, described below, may utilize a centralized server to distribute and post-process tasks over the network. This can create reliability and efficiency issues if the centralized server is not working properly or is bogged down, or if the network connections to the centralized server are lost. In a worst-case scenario, if the centralized server fails, the framework goes down and all the tasks and results may be lost.

SETI@Home is an exemplary distributed computing application that enables a large computational job to be executed over several thousands of nodes. The large computational job can be split into many tasks, which are run independently of each other on individual computing nodes. In the SETI@Home project, data from astronomical measurements is farmed out over the Internet to many processors for processing, and when completed returned to a centralized server and post-processed, in an attempt to aid in the detection of alien species. The tasks all reside in a central database and are sent one by one by the centralized server to the individual computing nodes. When the server has sent a task to a computing node, it marks the task as "submitted" in its database, the prior state being "non-submitted". Once a computing node has completed its assigned task, it sends the result of the execution back to the centralized server, which stores it in its database. The task is then marked "completed". If too many nodes contact the centralized server, the server becomes a limiting factor in the scalability of the entire system. Further, reliability and efficiency of the system is affected if the centralized server is not working properly or is bogged down, or if the network connections to the centralized server are lost.

Note that such reliability and efficiency problems in systems with a single centralized server for a database are not unique to distributed computing systems.

Distributed Databases

One conventional solution to the reliability and efficiency problems created by having a single centralized server for a database, for example a database in a distributed computing system, is to provide several servers with a distributed database. For example, in an exemplary distributed computing system using a distributed database with three servers, each of the servers may contain approximately one third of the entire database, and may have a pool of computing nodes connecting to them for computations. In this system, a server A may send and receive tasks to/from a set A of computing nodes, a server B may send and receive tasks to/from a set B of computing nodes, and a server C may send and receive tasks to/from a set C of computing nodes, the sets A, B, and C of computing nodes being disjoint. In this example, the bandwidth required for each of the servers would be one third of the total bandwidth. If the bandwidth per server were identical, this would in effect increase the total number of connections possible for the entire system by a factor of 3.

In networks including, but not limited to, peer-to-peer networks, nodes on the network may go down at any time or lose network connectivity for long periods. For instance, server A in the above example may become unreachable for an indefinite period, in which case one third of the data collected may be effectively lost.

Replicated Databases

Another solution to the reliability and efficiency problems created by having a single centralized server for a database, for example a database in a distributed computing system, is to replicate the entire database across two or more servers on the network. This solution helps to avoid the problem of the potential loss of a portion of a distributed database described above.

In a network, for example a peer-to-peer network, nodes on the network may be unreliable; that is, the nodes may go down or leave the network at any time. Since the nodes are not reliable, a database that resides on a single node (e.g. a peer node, in a peer-to-peer network) becomes unavailable to clients on the network if the node hosting the database (which may be referred to as a server node, server peer, or simply server) goes down. Therefore, in some database systems, the database may be replicated on two or more server nodes that may be, but are not necessarily, located in different geographical locations, so that the loss of one node does not result in the loss of availability of the database. In addition, two or more server nodes that replicate a database may allow the access and processing load on the database to be spread across the server nodes. Different clients may access different copies of the database replicated on the two or more server nodes, which may help to improve the overall performance of the database.

FIG. 2 illustrates an exemplary database 154 replicated across three servers 152 on a network 150. One or more clients 156 may each access a copy of the database 154 (e.g. copy 154A, 154B or 154C) on one of the servers 152 via network 150. Different clients 156 may access different copies of the database 154. Note that servers 152 and clients 156 may be implemented on peer nodes in a peer-to-peer networking environment, or on nodes in other types of networking environments.

SUMMARY

Embodiments of a system and method for the dynamic configuration of replicated database servers in networks, including peer-to-peer networks, are described. Embodiments may provide a mechanism to dynamically and automatically replace lost server nodes to maintain a necessary or desired level of replication. Some embodiments may provide a mechanism or mechanisms to dynamically and automatically increase the number of server nodes to meet an increase in demand, and to dynamically and automatically decrease the number of server nodes during periods of decreased demand. To maintain consistency among the database replicas, some embodiments may provide a mechanism or mechanisms for synchronizing the database replicas on the server nodes.

In one embodiment, a database may be replicated on a specified number of server nodes on the network to provide a desired or necessary level of reliability and/or efficiency. In this embodiment, a mechanism to dynamically and automatically replace lost server nodes from a pool of nodes, or any other collection or set of nodes available to become server nodes, may be used to insure that the specified number of server nodes is maintained if one or more of the server nodes goes down. In one embodiment, upon booting up, the new server node may send a message to one or more of the existing server nodes requesting a copy of the database. One or more of the existing server nodes may reply by sending one or more messages containing the entire database to the new server node. In one embodiment, other information (e.g., replicated database server software and configuration information) may also be copied to the new server node.

In some embodiments, the number of server nodes including the replicated database may be determined dynamically based on database usage metrics including one or more of, but not limited to, database accesses and the number of clients accessing the server nodes. In addition to a mechanism to dynamically and automatically replace lost server nodes from a pool of nodes, these embodiments may also provide a mechanism to automatically increase the number of server nodes by adding server nodes from a pool of nodes if the database usage metrics indicate more server nodes are required to meet increased demand and a mechanism to automatically decrease the number of server nodes if the database usage metrics indicate fewer server nodes are required because of decreased demand.

Some embodiments may provide a mechanism for synchronizing the database replicas on the server nodes. In one embodiment, one or more clients send their messages to one of the server nodes (a server node A, for example), which then sends or broadcasts a summary current status of its database to the other server nodes at periodic or aperiodic time intervals. The other server nodes may then compare a summary current status of their databases to the summary current status received from server node A, and may reply to server node A with differences in the statuses, if any. Server node A may then update its database according to the differences, if any. Note that each of the server nodes may also periodically or aperiodically send the summary current status of their respective databases to the other server nodes.

Some embodiments may be implemented in peer-to-peer network environments. Some embodiments may be implemented in a peer-to-peer environment on a network in accordance with one or more peer-to-peer platform protocols. In one embodiment, the peer-to-peer platform may be the JXTA platform.

Embodiments may be used, for example, for the dynamic configuration of replicated database servers in a distributed, or "grid", computing framework for submitting computational tasks in a distributed heterogeneous networked environment that utilizes peer groups to decentralize task dispatching and post-processing functions and enables a plurality of jobs to be managed and run simultaneously. As another example, embodiments may be used for the dynamic configuration of replicated database servers in distributed computing systems that distribute tasks to different nodes on the network to perform a job.

Figure 1A:
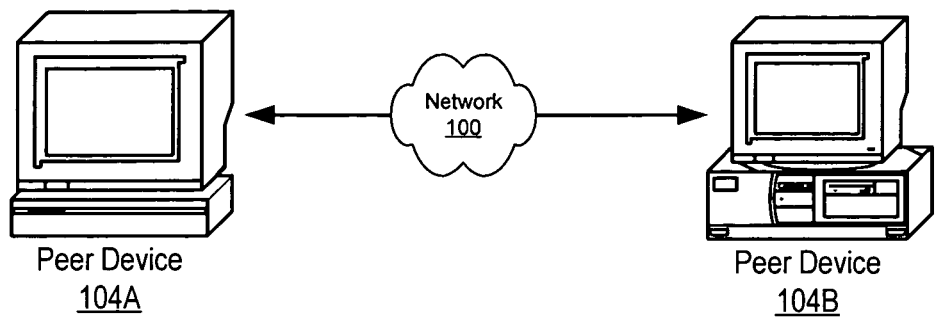
FIG. 1A illustrates an example of two devices connected as peers.
Figure 1B:
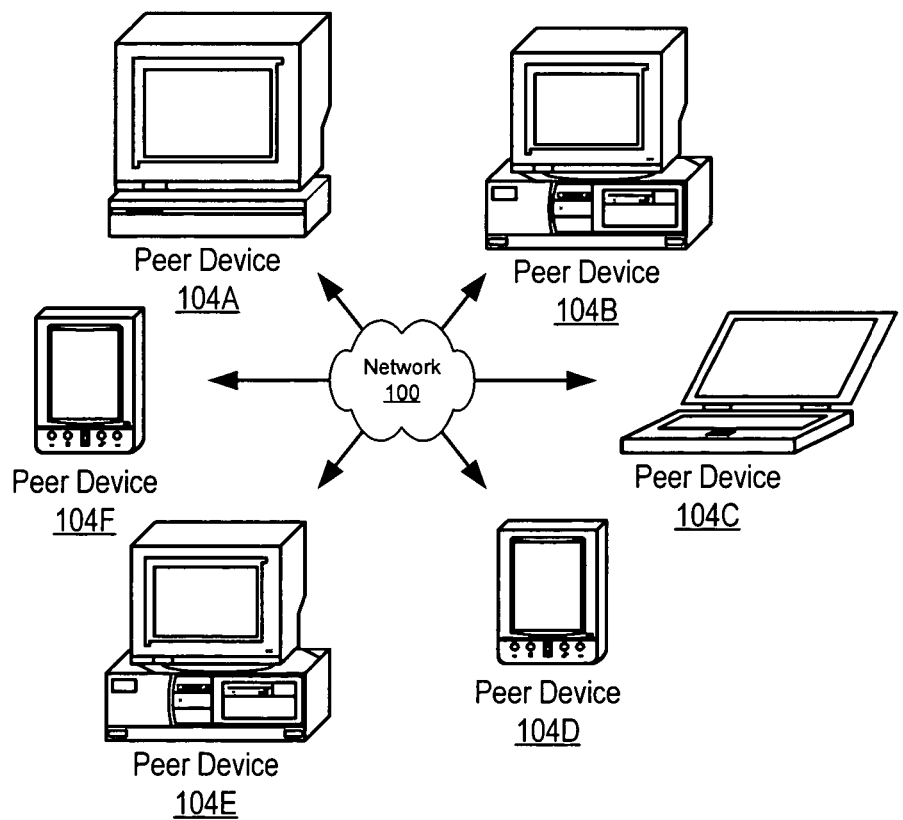
FIG. 1B illustrates an example of several peer devices connected over the network in a group.
Figure 2:
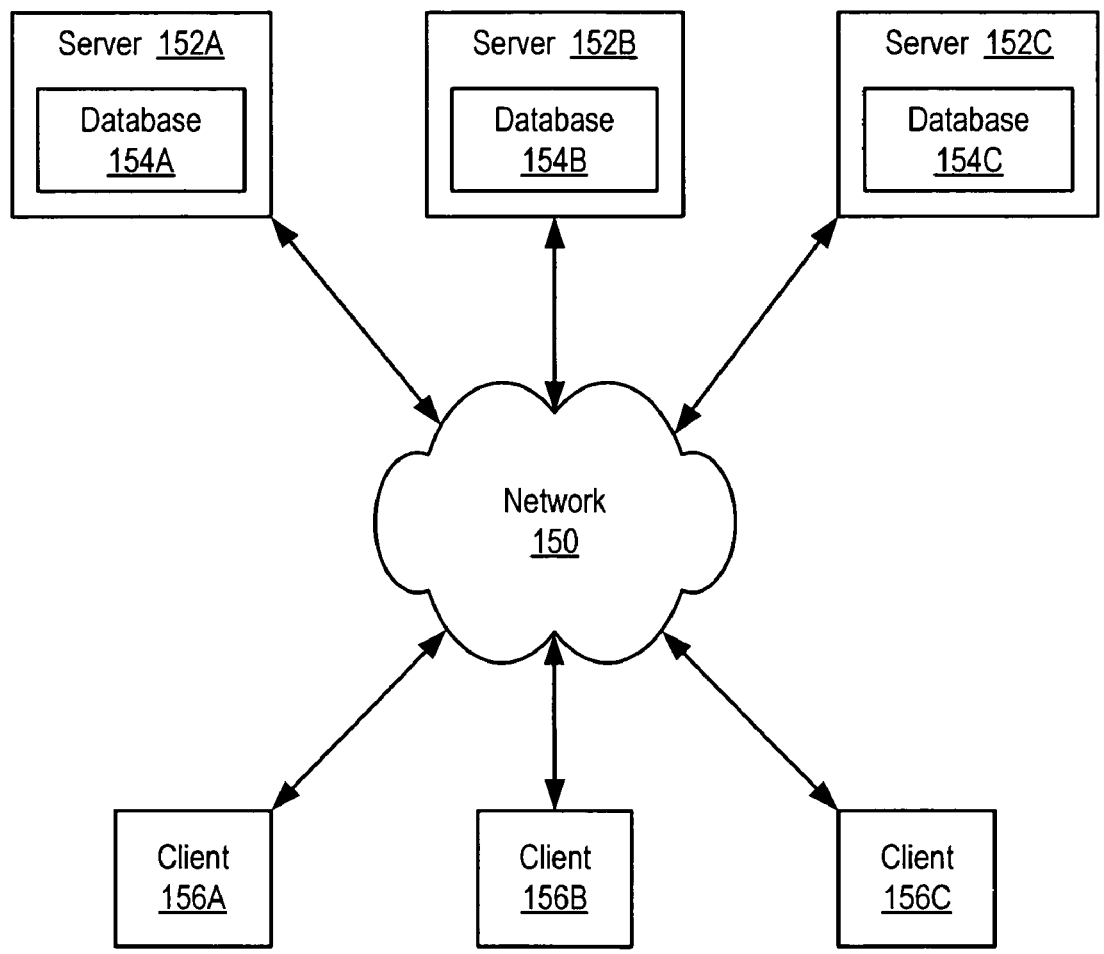
FIG. 2 illustrates a database replicated across servers on a network.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for the dynamic configuration of replicated database servers in networks, including peer-to-peer networks, are described. As described above, a solution to the reliability and efficiency problems created by having a single centralized server for a database, for example a database in a distributed computing system, is to replicate the database across two or more server nodes on the network. However, nodes on a network may be unreliable; that is, the nodes may go down or leave the network at any time. Thus, one or more of the server nodes hosting the replicated database may go down or leave the network. Embodiments may provide a mechanism to dynamically and automatically replace lost server nodes to maintain a necessary or desired level of replication. In addition, demand on a replicated database may vary over time; database accesses and/or the number of clients of the database may increase or decrease. Therefore, some embodiments may provide a mechanism or mechanisms to dynamically and automatically increase the number of server nodes to meet an increase in demand, and to dynamically and automatically decrease the number of server nodes during periods of decreased demand. To maintain consistency among the database replicas, some embodiments may provide a mechanism or mechanisms for synchronizing the database replicas on the server nodes.

In one embodiment, a database may be replicated on a specified number of server nodes on the network to provide a desired or necessary level of reliability and/or efficiency. For example, in a particular distributed computing environment, it may be specified that five server nodes are necessary to provide a desired level of reliability and/or efficiency. In this embodiment, a mechanism to dynamically and automatically replace lost server nodes from a pool of nodes may be used to insure that the specified number of server nodes is maintained if one or more of the server nodes goes down. This mechanism allows a server node to go down and to be replaced by a new server node simply and transparently. In one embodiment, upon booting up, the new server node may send a message to one or more of the existing server nodes requesting a copy of the database. One or more of the existing server nodes may reply by sending one or more messages containing the entire database to the new server node.

In some embodiments, the number of server nodes including the replicated database may be determined dynamically based on database usage metrics including one or more of, but not limited to, database accesses and the number of clients accessing the server nodes. These embodiments may provide a mechanism to dynamically and automatically replace lost server nodes from a pool of nodes which may be used to insure that the number of server nodes determined from the database usage metrics is maintained if one or more of the server nodes goes down. These embodiments may also provide a mechanism to automatically increase the number of server nodes by adding server nodes from a pool of nodes if the database usage metrics indicate more server nodes are required to meet increased demand, and thus to avoid problems such as Denial of Service for the clients of the database. These embodiments may also provide a mechanism to automatically decrease the number of server nodes if the database usage metrics indicate fewer server nodes are required because of decreased demand, thus releasing one or more of the server nodes from processing database transactions to work on other activities, thus using their CPU time more efficiently.

Using these mechanisms, if the server nodes communicate to each other that the workload is low, the server peers may agree on converting one of the server nodes to a non-server node. This converted node joins the other non-server nodes in the pool and can run other processes until recalled to be a server node, if ever. Similarly, if the server nodes communicate to each other that the workload is high, the server nodes may invite one or more other nodes in the pool to become server nodes. In one embodiment, the pool node(s) may intercept the message via their message handling code and determine whether to become a server node. In one embodiment, upon booting up, a new server node may send a message to one or more of the existing server nodes requesting a copy of the database. One or more of the other server nodes may reply by sending one or more messages containing the entire database to the new server node.

In one embodiment, one of the server nodes may be designated as a master server node, which is also replaceable, to control the activity of all the server nodes.

In some embodiments, there may be a minimum and maximum for the number of server nodes, for example three server nodes as a minimum and ten as a maximum. In one embodiment, the minimum and maximum number of server nodes may be user-specifiable. Note that, in one embodiment, the absolute minimum for the number of server nodes may be one, though the database would no longer be replicated with only one server node. In this embodiment, the mechanism to automatically decrease the number of server nodes during times of decreased demand may be allowed to reduce the number of server nodes to one if demand drops below a certain threshold, and the mechanism to automatically increase the number of server nodes may then add server nodes if demand goes up again. In one embodiment, the maximum threshold may be effectively set to "infinity" or no limit. In this embodiment, the mechanism to automatically increase the number of server nodes may be allowed to add server nodes to meet increased demand as long as there are pool nodes available to become server nodes.

Some embodiments may be implemented in peer-to-peer network environments. Some embodiments may be implemented in a peer-to-peer environment on a network in accordance with one or more peer-to-peer platform protocols for enabling the peer nodes to discover each other, communicate with each other, and cooperate with each other to form peer groups in the peer-to-peer environment. In one embodiment, the peer-to-peer platform may be the JXTA platform.

Embodiments may be used, for example, for the dynamic configuration of replicated database servers in a distributed computing framework for submitting computational tasks in a distributed heterogeneous networked environment that utilizes peer groups to decentralize task dispatching and post-processing functions and enables a plurality of jobs to be managed and run simultaneously, such as the exemplary distributed computing framework described below. In a distributed computing framework, instead of having fixed number of server nodes or ratio of server nodes to client nodes, embodiments may enable a dynamic mix of server nodes and client nodes. Using embodiments, if server nodes in the distributed computing framework die, remaining server nodes may invite client nodes to become server nodes. In addition, server nodes may be added or removed to meet changes in demand in the distributed computing framework.

As another example, embodiments may be used for the dynamic configuration of replicated database servers in distributed computing systems that distribute tasks to different nodes on the network to perform a job, such as the exemplary peer-to-peer distributed computing system implemented according to the exemplary distributed computing framework described below.

Note that the term "pool of nodes" is used herein as a general term to describe any collection or set of nodes available to become server nodes, and is not meant to imply any particular structure or grouping of the nodes.

FIGS. 3-10 describe means for replicating a database on two or more server nodes, means for the server nodes determining that a new server node is needed (e.g., due to the loss of a server node or an increase in demand), means for the server nodes recruiting a pool node from a pool of nodes as the new server node, means for the server nodes determining that one of the server nodes is no longer needed (e.g., due to decrease in demand), and means for one of the server nodes to be released to the pool of nodes.

Figure 3:
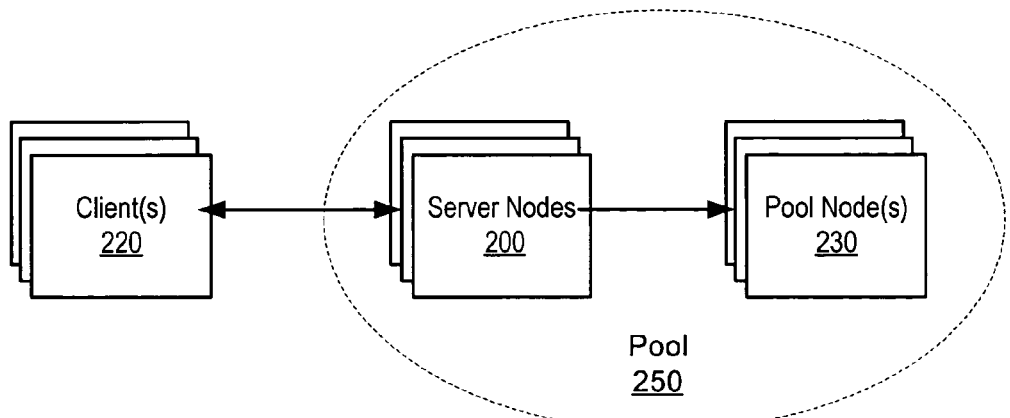
FIG. 3 illustrates a replicated database network system according to one embodiment.

FIG. 3 illustrates a replicated database network system according to one embodiment. Pool 250 may include a plurality of nodes. Two or more of the nodes in pool 250 may be server nodes 200, each containing a copy of the replicated database. Two or more other nodes in pool 250 may be referred to as pool nodes 230. Note that pool nodes 230 may themselves be running one or more other applications, services, processes, etc. such as other database servers, web servers, application servers, etc. Also note that, in one embodiment, one or more of the server nodes 200 may be running other applications, services, processes, etc. than the replicated database and its associated replicated database server.

Clients 220 may access the replicated database on server nodes 200. In one embodiment, if one of server nodes 200 goes down, the remaining server node(s) 200 may automatically detect the loss of the server node and broadcast a message to the pool nodes 230 to determine if one of the pool nodes 230 is available to become a replacement server node. In one embodiment, if demand on the database increases above a threshold, the server node(s) 200 may automatically detect the increase in demand and broadcast a message to the pool nodes 230 to determine if one of the pool nodes 230 is available to become an additional server node. In one embodiment, once a new or replacement server node is found in the pool nodes 230, the software, configuration information and data (including, but not limited to, the database) necessary to enable the node to become a server node 200 may be copied to the new node, which may then join the server nodes 230. In one embodiment, if demand on the database decreases below a threshold, the server node(s) 200 may automatically detect the decrease in demand and select one of the server nodes 200 to leave the server nodes and be added to the pool nodes 230.

As previously mentioned, some embodiments may be implemented in a peer-to-peer environment on a network in accordance with one or more peer-to-peer platform protocols for enabling the peer nodes to discover each other, communicate with each other, and cooperate with each other to form peer groups in the peer-to-peer environment. In one embodiment, the peer-to-peer platform may be the JXTA platform. In these embodiments, pool 250 may be a peer group in a peer-to-peer network, and the server and pool nodes may be peer nodes. Note that clients 220 may also be peer nodes in the peer-to-peer network.

Note that, in one embodiment, a pool node 230 may itself be a client of the database replicated on server nodes 200. Thus, a pool node 230 may also be a client 220. Also note that, while FIG. 3 and other Figures may show the pool as including only some nodes on a network (for example in an embodiment implemented in a peer-to-peer network, the pool may include some or all of the peer nodes in a peer group), in one embodiment, the pool 250 may include all available nodes on a network. For example, in an embodiment implemented in a peer-to-peer network, the pool may include all peer nodes on the peer-to-peer network.

Figure 4:
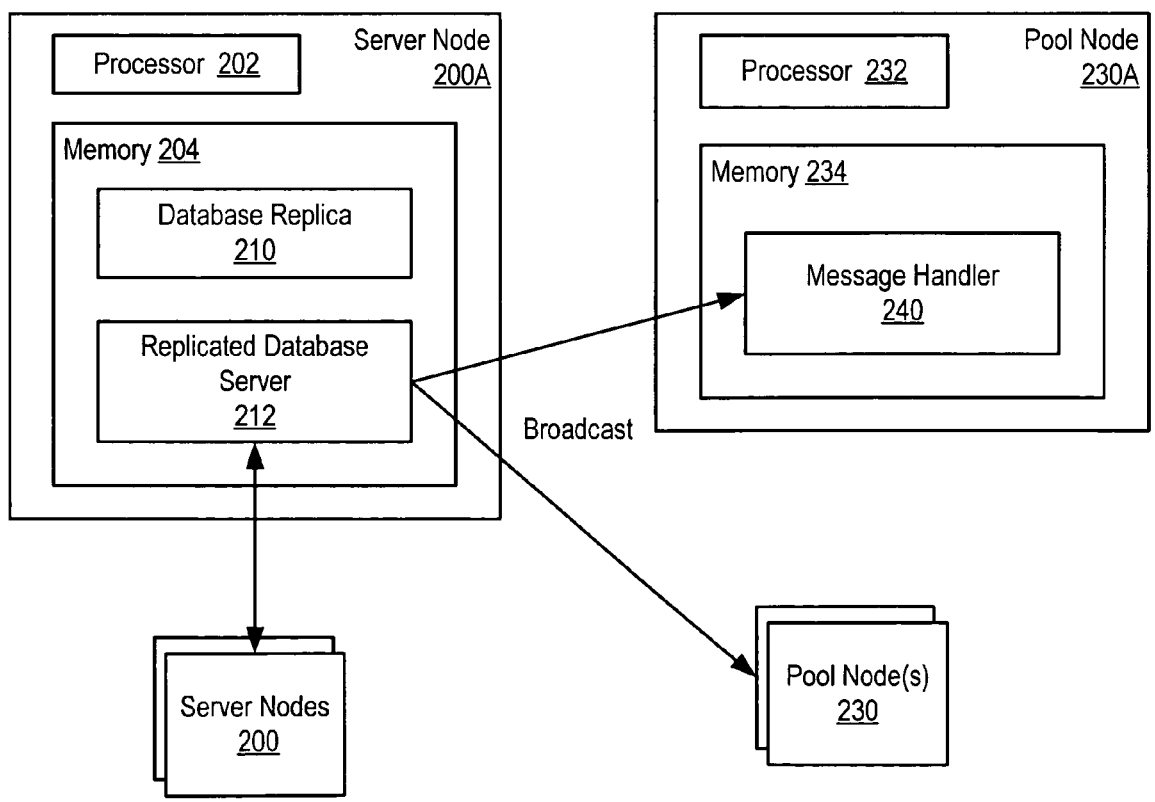
FIG. 4 illustrates a server node and a pool node in a replicated database network system according to one embodiment.

FIG. 4 illustrates a server node and a pool node in a replicated database network system according to one embodiment. In FIG. 4, an exemplary architecture of one of the server nodes 200 (server node 200A) and one of the pool nodes (pool node 230A) from pool 250 of FIG. 3 are shown. Note that, in some embodiments, the server and pool nodes may be peer nodes in a peer-to-peer network.

A node, such as server node 200A or pool node 230A, may be any of various types of devices, including, but not limited to, a personal computer system, desktop computer, laptop or notebook computer, mainframe computer system, workstation, network computer, Personal Digital Assistant (PDA), cell phone, pager, smart appliances or other suitable device. In general, a node in a pool may be any device with a digital heartbeat. A node may include at least one processor, such as processor 202 of server node 200 and processor 232 of pool node 230. The processor may be coupled to a memory, such as memory 204 of server node 200 and memory 234 of pool node 230. Memory 204 and 234 are representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Nodes may couple over a network to one or more other devices via one or more wired or wireless network interfaces.

Each server node 200 may include, in memory 204, a database replica 210 and an instance of a replicated database server 212. The instances of the replicated database server 212 on the server nodes 200 may communicate with each other, for example via communications channels (e.g., pipes) according to a peer-to-peer platform protocol, and may be configured to detect the loss of a server node 200 and to recruit a pool node 230 to replace the lost server node 200, and also may be configured to detect changes in demand on the replicated database and to add or remove server nodes 200 in response to the detected changes in demand.

Each pool node 230 may include, in memory 234, a message handler 240. Message handler 240 may be configured to receive messages including messages from a server node 200. In one embodiment, if the server nodes 200 need to replace a lost server node 200 or to add a new server node 200 in response to increased demand, at least one of the server nodes 200 may broadcast a message to the pool nodes 230 in the pool to determine if one or more of the pool nodes 230 are available to become server nodes 200. In one embodiment, the message may be broadcast according to a peer-to-peer platform protocol. Message handler 240 on a pool node 230 such as pool node 230A may receive the broadcast message and generate a response to the message if the pool node 230 is able to become a server node 230. Note that, in one embodiment, memory 204 of a server node 200 may also include a message handler 240.

Figure 5:
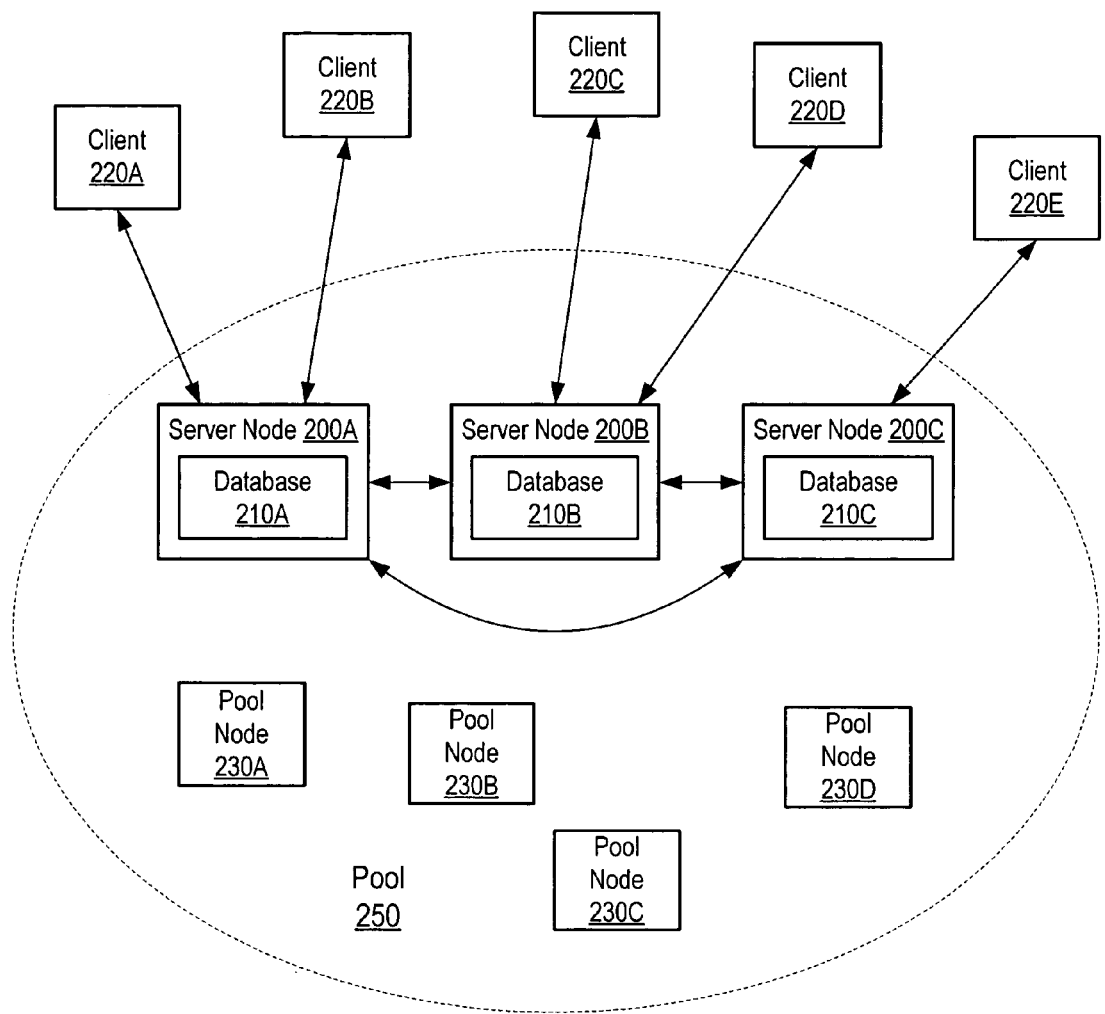
FIG. 5 illustrates an exemplary replicated database network system including clients and a pool of server nodes and pool nodes according to one embodiment.

FIG. 5 illustrates an exemplary replicated database network system including clients and a pool of server nodes and pool nodes according to one embodiment. In this example, pool 250 includes three server nodes 200A, 200B, and 200C, each containing a copy of the replicated database 210A, 210B, and 210C, respectively. Pool 250 also includes four pool nodes 230A, 230B, 230C, and 230D. Five clients 220 access the replicated database on the server nodes 200, with clients 220A and 220B accessing server node 200A, clients 220C and 220D accessing server node 200B, and client 220E accessing server node 200C. In some embodiments, pool 250 may be a peer group in a peer-to-peer network, and the server and pool nodes may be peer nodes in the pool 250.

In one embodiment, a server node 200 may only interact with a limited set of clients 220. For example, in FIG. 5, server node 200A may only interact with clients 220A and 220B, server node 200B may only interact with clients 220C and 220D, and server node 200C may only interact with client 220E. In one embodiment, these sets of clients may be disjoint.

In one embodiment, the nodes in pool 250 may listen for broadcast and individual messages from other nodes in pool 250, and may decide to run a different process or perform a different role depending on the outcome of evaluation of a message by a message handler. The different nodes in pool 250 may each be running one or more of a variety of processes including one or more of, but not limited to, database server processes, web server processes, application server processes, etc. The nodes may intercept messages broadcast within the pool (or peer group, in a peer-to-peer network embodiment), and may receive individual messages sent to them by other nodes in the pool 250. The nodes all listen to these messages, and the process that a node is currently running may be interrupted whenever a message is received. At this point, a message handler (e.g., message handler 240 of FIG. 4) may handle the message to determine whether to continue to run the interrupted process or to run another process, such as a replicated database server process (e.g., replicated database server 212 of FIG. 4).

The server nodes 200 currently running the replicated database server process are responsible for determining whether to broadcast messages to invite pool nodes to join them as server nodes 200 due to the loss of a server node or increased demand, and for determining if one or more of the server nodes 200 can be released due to decrease in demand. In one embodiment, the server nodes 200 may communicate with each other using a restricted broadcast mechanism (for example, in an exemplary peer-to-peer network, a propagate pipe of the JXTA peer-to-peer platform). This restricted broadcast enables the server nodes 200 to exchange messages among themselves without the messages being visible to any non-server nodes. The server nodes 200 may use the restricted broadcast mechanism to communicate to each other, for example, the state of their workload and updates of recent data collected from their clients 220. The server nodes 200 may also use the restricted broadcast mechanism to communicate with each other for other purposes, for example for selecting one from among two or more pool nodes 230 that have volunteered to become server nodes, to determine demand level and thus whether to add or release server nodes, and, if a server node is to be released, to determine which server node is to be released.

Using the mechanism of listening for messages in pool 250 and determining from received messages whether to switch to running a different process as described above, pool nodes 230 in pool 250 may listen for messages from server nodes 200 in pool 250. If server nodes 200 determine that another server node is needed (either due to loss of a server node 200 or to an increase in demand), one or more of the server nodes 200 may send or broadcast a message to one or more of the pool nodes 230 in pool 250 requesting one or more of the pool nodes 230 to "volunteer" to become server nodes. In one embodiment, each server node 200 may include a replicated database server process such as replicated database server 212 of FIG. 4, and this process may handle determining if another server node is needed and then sending or broadcasting the message requesting "volunteers", if necessary. If, upon receiving and handling the message, a pool node 230 determines that it can switch its "role" to that of a server node, the pool node 230 may respond to the message by replying with a message (which may be broadcast in pool 250 or, alternatively, directly sent to one or more of the server nodes 200) indicating that it is available to become a server node 200.

Figure 7A:
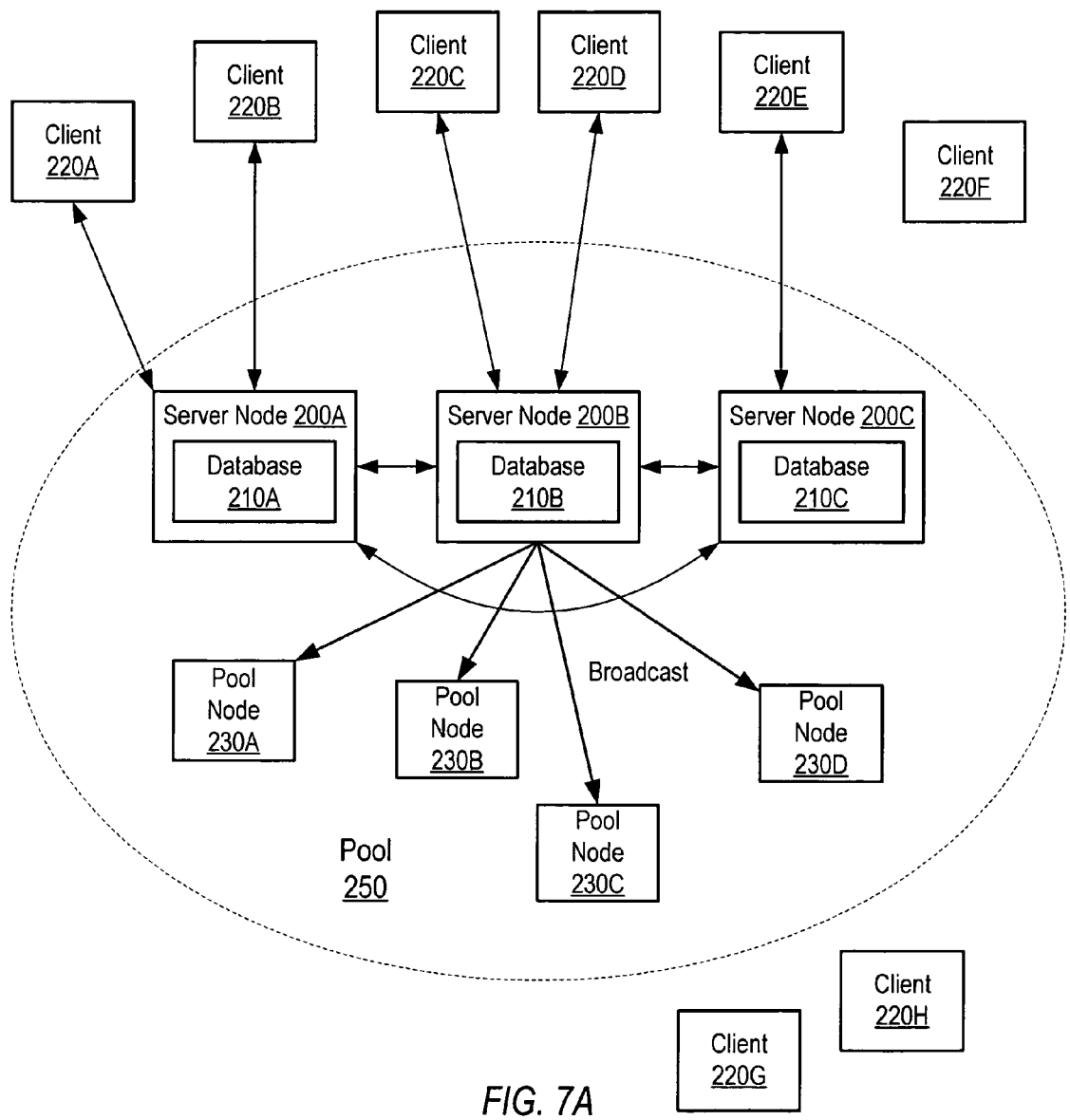
FIGS. 7A-7B illustrate recruiting a pool node as an additional server node, for example to meet an increase in demand, in a replicated database network system according to one embodiment.
Figure 7B:
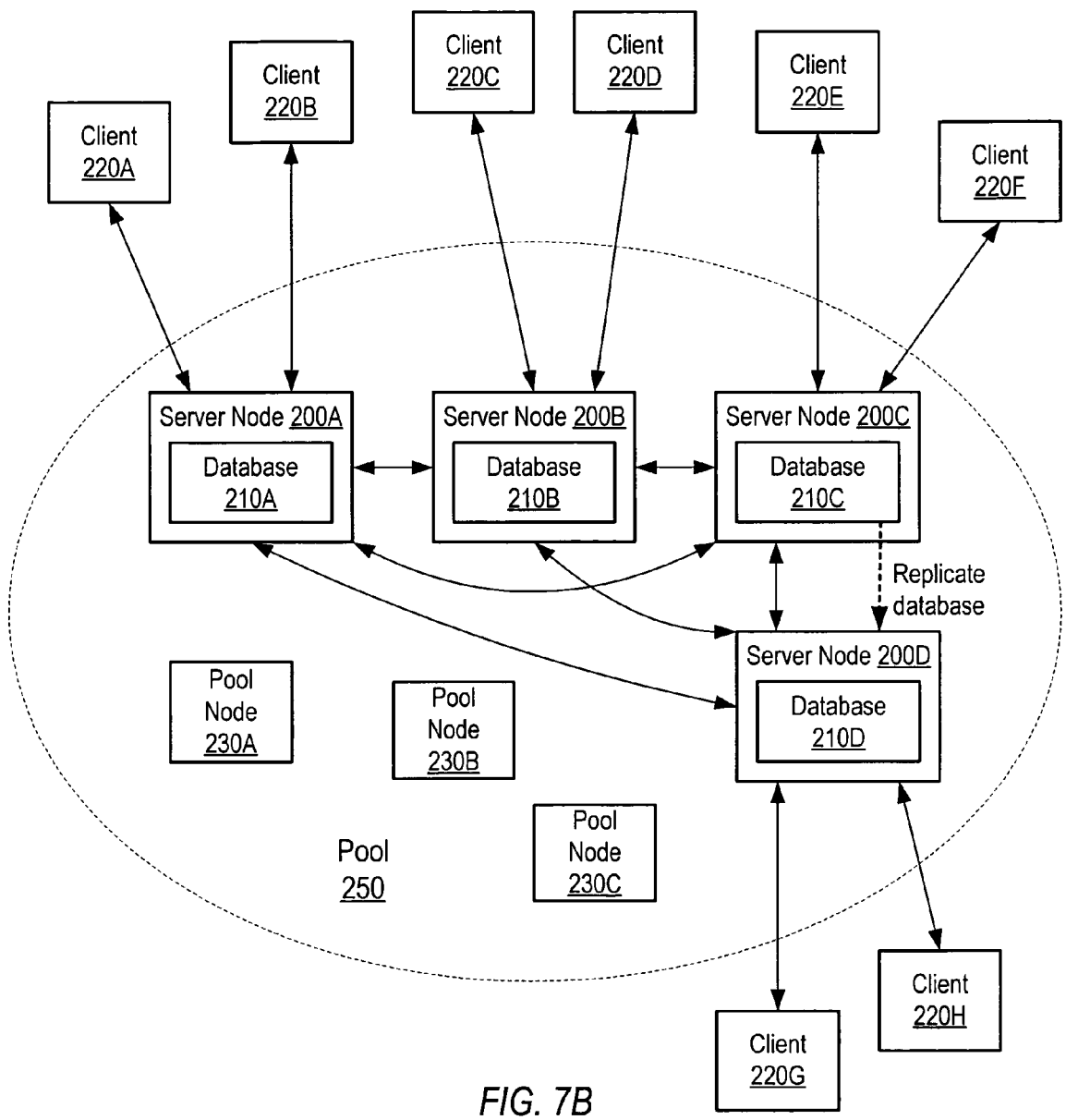
Figure 8:
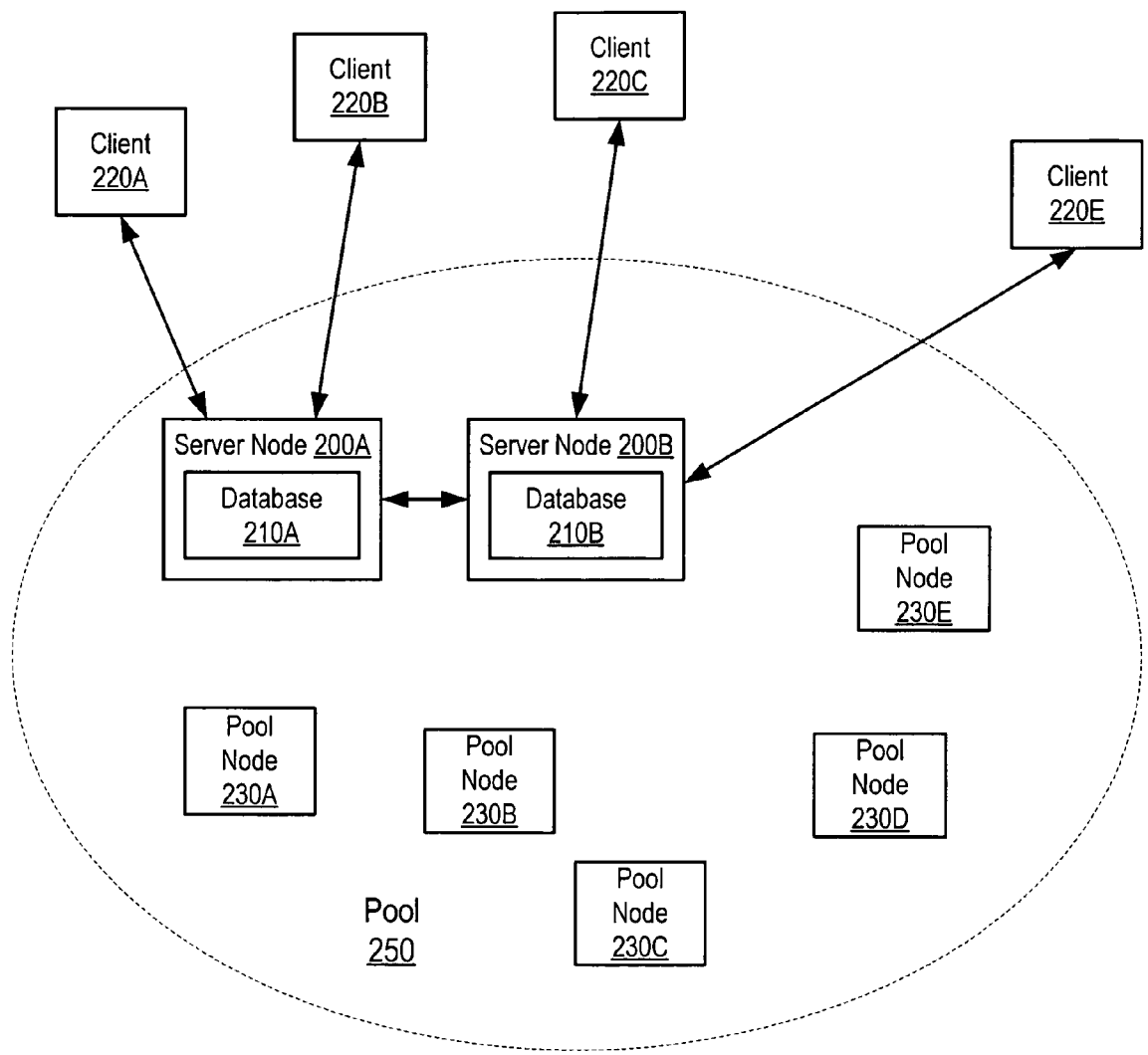
FIG. 8 illustrates dropping a server node, for example to meet a decrease in demand, in a replicated database network system according to one embodiment.

The exemplary replicated database network system of FIG. 5 is used in FIGS. 6-8 to describe the automatic and dynamic operations in the exemplary replicated database network system of detecting the loss of a server node and recruiting a pool node to replace the lost server node, and adding or removing server nodes in response to changes in demand.

Figure 6A:
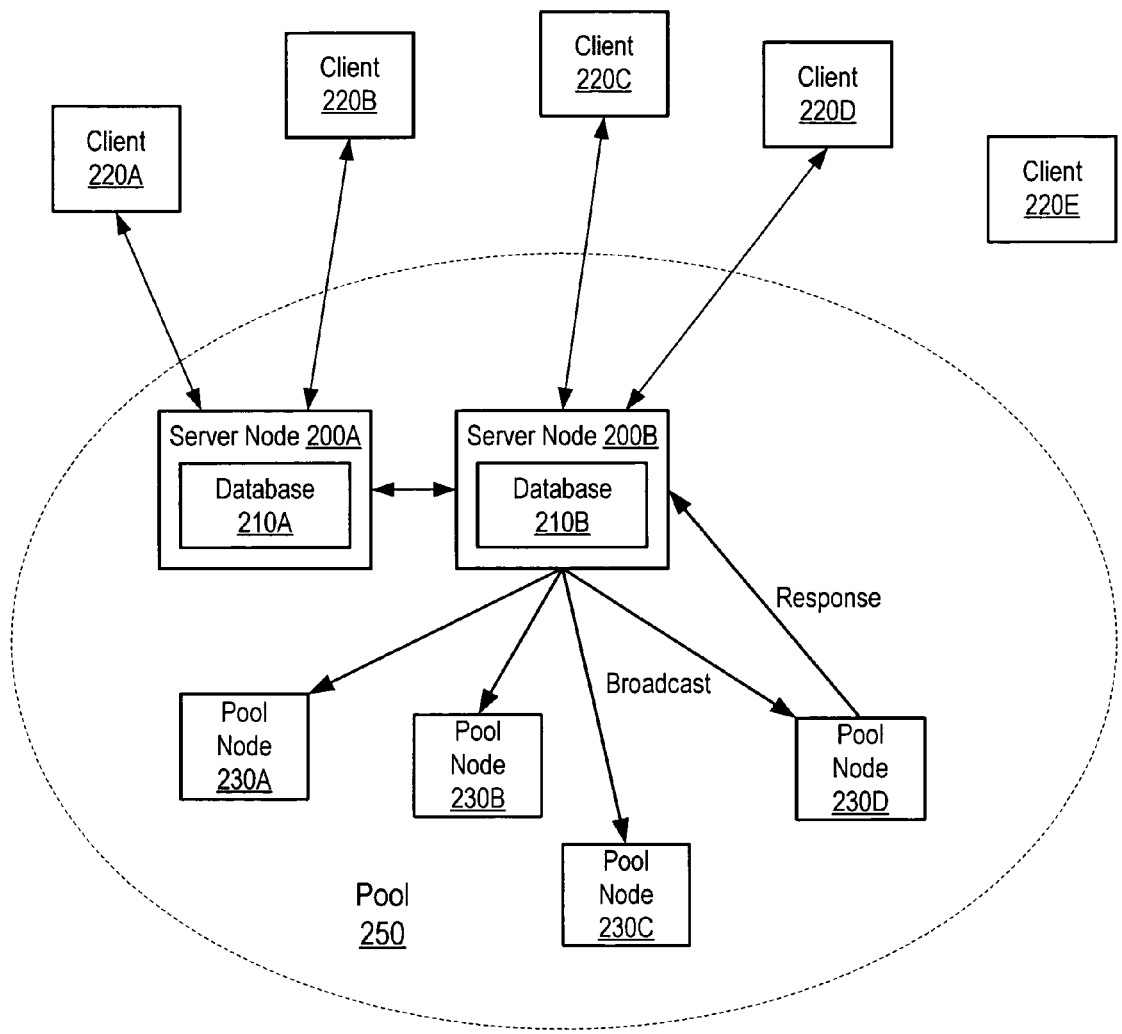
FIGS. 6A-6B illustrate detecting the loss of a server node and recruiting a pool node to replace the lost server node in a replicated database network system according to one embodiment.
Figure 6B:
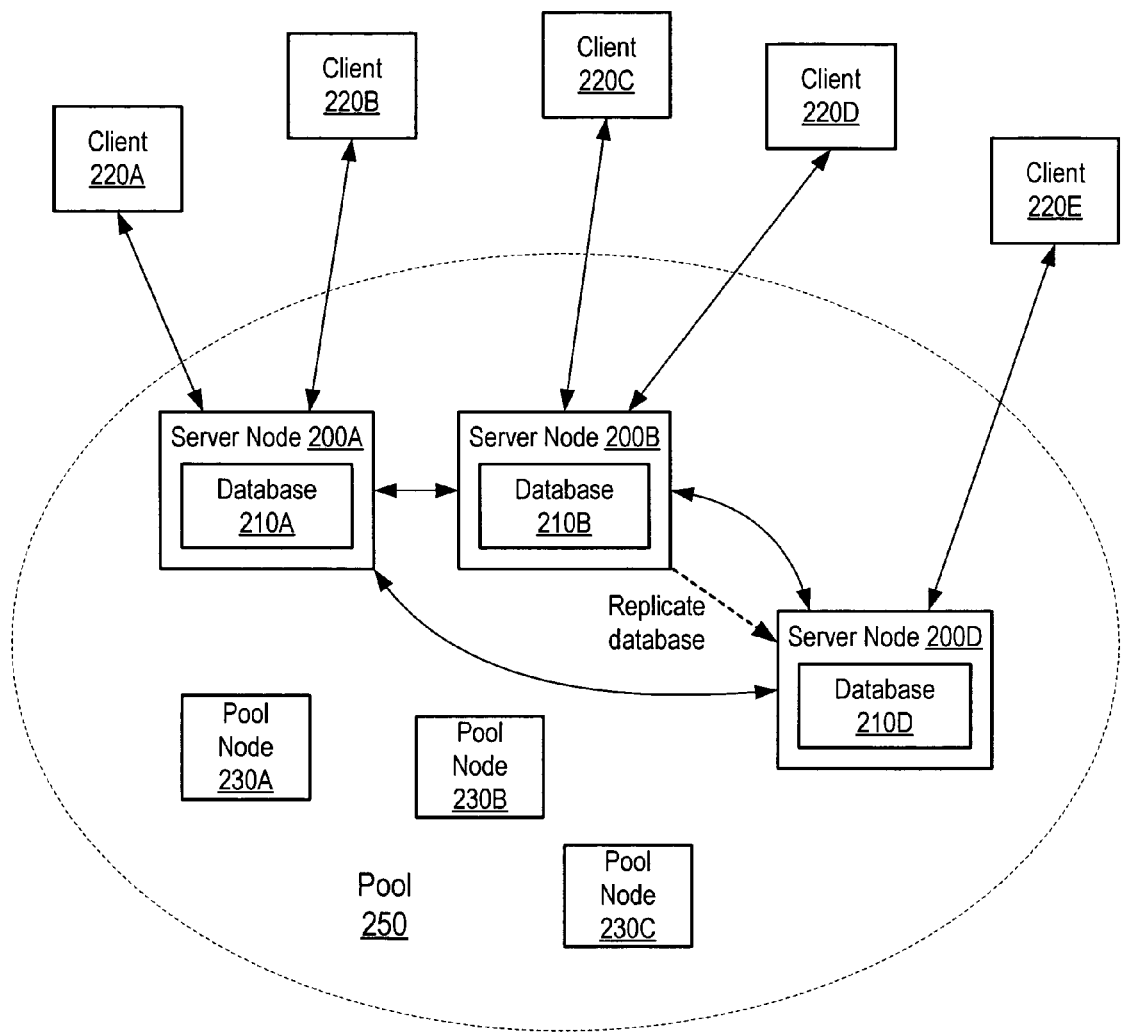

FIGS. 6A-6B illustrate detecting the loss of a server node and recruiting a pool node to replace the lost server node in a replicated database network system according to one embodiment. In FIG. 6A, server node 200C of FIG. 5 has become unavailable for some reason. Because the database is replicated on a plurality of server nodes (three, in this example, with two remaining after the loss of server node 200C), the impact of a server node loss may be minimized. However, the loss decreases the total bandwidth available for connections to clients 220. Thus, the lost server node 200 may be replaced by a new server node so that the database is replicated a necessary or desired number of times, and so that the availability and existence of the database is not compromised. Also note that, in FIG. 6A, client 220E lost access to the database when server node 200C went down.

In some embodiments, communications between the server nodes 200 may be performed at periodic or aperiodic intervals. In these embodiments, to detect the loss of a server node 200, in one embodiment, if one of the server nodes 200 (e.g., server node 200C of FIG. 5) fails to contact the other server nodes 200 for a specified number of intervals (e.g., three intervals or five intervals), or alternatively for a specified length of time (e.g., ten seconds, or one minute), the other server nodes 200 may conclude that the non-communicating server node has gone down and therefore should be replaced with a new server node. Other embodiments may use other mechanisms for determining if a server node is down, and/or how many server nodes are currently active, for example periodic or aperiodic polling of the server nodes, or as another example, queuing models may be used to determine the number of messages being processed by the server nodes and, based on how many messages were previously processed, inferring the number of server nodes.

If server node 200A and/or server node 200B determines that server node 200C has gone down and thus another server node is needed, one or both of the server nodes 200 may send or broadcast a message to one or more of the pool nodes 230 in pool 250 requesting one or more of the pool nodes 230 to "volunteer" to become a server node (broadcast is shown in this example). The content of the message is an invitation to become a server node.

Using the mechanism of listening for messages in pool 250 and determining from received messages whether to switch to running a different process as described above, pool nodes 230 in pool 250 may listen for messages from server nodes 200 in pool 250. Upon receipt of the invitation message, the message handling mechanism of each of the contacted pool nodes 230 may then determine whether the pool node 230 is to become a server node 200. If, upon receiving and handling the message, a pool node 230 determines that it can switch its "role" to that of a server node, the pool node 230 may respond to the message by replying with a message (which may be broadcast in pool 250 or, alternatively, directly sent to one or more of the server nodes 200) indicating that it is available to become a server node 200. In this example, pool node 230D responds to the received message by sending a response message to server node 200B indicating that it is available to become a server node 200.

Note that more than one pool node 230 may respond; if so, server nodes 200 may use some mechanism to determine one of the responding pool nodes 230 to become the new server node. Any suitable mechanism may be used to determine one of the responding pool nodes 230 to become the new server node, from a simple mechanism such as first-to-respond to a more complex mechanism such as an evaluation and comparison of the capabilities or performance of the responding pool nodes 230 using information about the pool nodes included in the response message or acquired from elsewhere. In one embodiment, one of the server nodes 200 may be designated as a master server node that decides which server node 200 should be added, for example by comparing activity levels on the pool nodes 220 and selecting a pool node 220 with the least amount of current activity. Other embodiments may use a distributed consensus mechanism, voting mechanism, or any other suitable mechanism to select a pool node 220 to be added as a new server node 200.

In FIG. 6B, pool node 230D of FIG. 6A becomes a new server node 200D by obtaining the server software and/or configuration information if necessary, obtaining a replicate of the database from one of the server nodes 200, and starting the server process. In one embodiment, if pool node 230D does not have the software and/or configuration information necessary to become a server node, one of the server nodes 200 may send the necessary software and/or configuration information to the pool node 230D. Alternatively, if pool node 230D does not have the software and/or configuration information necessary to become a server node, the pool node 230D may obtain the software and/or configuration information from some other source, for example another non-server node in the pool 250 or a node outside the pool. Pool node 230D receives a replicate of the database 210 from one of the server nodes, in this example server node 200B. After obtaining the software and configuration information, if necessary, and obtaining the replicate of the database (database 210D replicated from server node 200B, in this example), pool node 230D starts the replicated database server process to become server node 200D.

Note that client 220E may attempt to reconnect to one of the server nodes 200 after losing connection to server node 200C of FIG. 6A when it goes down. In one embodiment, client 220E may send a broadcast message requesting a response from a server node 200. One or more of the server nodes 200 may respond to this message, and client 220E may then connect to one of the responding server nodes 200. In this example, client 220E is shown as connected to the new server node 200D.

FIGS. 7A-7B illustrate recruiting a pool node as an additional server node, for example to meet an increase in demand, in a replicated database network system according to one embodiment. For example, the number of requests to the database in a replicated database network system such as that depicted in FIG. 5 may increase to a point that the requests may no longer be served by the server nodes 200, and Denial of Service may result. In this case, the number of server nodes 200 accepting transactions may be dynamically and automatically increased to handle the increase in activity. An increase in demand may be due, for example, to an increase in the number of clients 220; the database may need to be replicated over additional server nodes 200 to meet the increased demand in connections due to the increase in the number of clients 220.

In FIG. 7A, additional clients 220F, 220G, and 220H may access the replicated database. Thus, a new server node 200 may need to be added so that the database is replicated a necessary or desired number of times to meet the increase in demand, and so that the availability of the database is not compromised.

In some embodiments, communications between the server nodes 200 may be performed at periodic or aperiodic intervals. In these embodiments, the communications among the server nodes 200 may include information about activity and demand on the server nodes, e.g. the number of clients, the number of client requests, etc. One or more of the server nodes 200 may analyze this activity/demand information to determine if an additional server node 200 is needed to meet a detected increase in activity/demand. In one embodiment, a demand threshold may be specified and compared against an analysis of the activity/demand information to determine if activity/demand has increased to a point that requires additional server node(s). Other embodiments may use other mechanisms for determining if activity/demand has increased to the point that additional server node(s) are required, for example through periodic or aperiodic polling of the server nodes to determine activity/demand levels.

If one or more of the server nodes 200 determines that activity/demand has increased to a level that another server node is needed, one or more of the server nodes 200 may send or broadcast a message to one or more of the pool nodes 230 in pool 250 requesting one or more of the pool nodes 230 to "volunteer" to become a server node (broadcast is shown in this example, initiated by server node 200B). The content of the message is an invitation to become a server node.

Using the mechanism of listening for messages in pool 250 and determining from received messages whether to switch to running a different process as described above, pool nodes 230 in pool 250 may listen for messages from server nodes 200 in pool 250. Upon receipt of the invitation message, the message handling mechanism of each of the contacted pool nodes 230 may then determine whether the pool node 230 is to become a server node 200. If, upon receiving and handling the message, a pool node 230 determines that it can switch its "role" to that of a server node, the pool node 230 may respond to the message by replying with a message (which may be broadcast in pool 250 or, alternatively, directly sent to one or more of the server nodes 200) indicating that it is available to become a server node 200. In this example, pool node 230D responds to the received message by sending a response message to server node 200B indicating that it is available to become a server node 200.

Note that more than one pool node 230 may respond; if so, server nodes 200 may use some mechanism to determine one of the responding pool nodes 230 to become the new server node. Any suitable mechanism may be used to determine one of the responding pool nodes 230 to become the new server node, from a simple mechanism such as first-to-respond to a more complex mechanism such as an evaluation and comparison of the capabilities or performance of the responding pool nodes 230 using information about the pool nodes included in the response message or acquired from elsewhere. In one embodiment, one of the server nodes 200 may be designated as a master server node that decides which server node 200 should be added, for example by comparing activity levels on the pool nodes 220 and selecting a pool node 220 with the least amount of current activity. Other embodiments may use a distributed consensus mechanism, voting mechanism, or any other suitable mechanism to select a pool node 220 to be added as a new server node 200.

In FIG. 7B, pool node 230D of FIG. 7A becomes a new server node 200D by obtaining the server software and/or configuration information if necessary, obtaining a replicate of the database from one of the server nodes 200, and starting the server process. In one embodiment, if pool node 230D does not have the software and/or configuration information necessary to become a server node, one of the server nodes 200 may send the necessary software and/or configuration information to the pool node 230D. Alternatively, if pool node 230D does not have the software and/or configuration information necessary to become a server node, the pool node 230D may obtain the software and/or configuration information from some other source, for example another non-server node in the pool 250 or a node outside the pool. Pool node 230D receives a replicate of the database 210 from one of the server nodes, in this example server node 200C. After obtaining the software and configuration information, if necessary, and obtaining the replicate of the database (database 210D replicated from server node 200C, in this example), pool node 230D starts the replicated database server process to become server node 200D.

Note that clients 220F, 220G and 220H may attempt to connect to the server nodes 200. In one embodiment, the new clients 220 may send broadcast messages requesting a response from a server node 200. One or more of the server nodes 200 may respond to this message, and the clients 220 may each connect to one of the responding server nodes 200.

In this example, client 220F is shown as connected to server node 200C, and clients 220G and 220H are show as connected to the new server node 200D.

In one embodiment, when a new server node 200 is added, the server node waits for clients 220 to broadcast for a server node to obtain clients. In another embodiment, one or more current clients may be handed over to the new server node 200 from one or more existing server nodes.

FIG. 8 illustrates dropping a server node, for example to meet a decrease in demand, in a replicated database network system according to one embodiment. During periods of decreased demand on the database, server nodes may be released from processing database transactions to work on other activities, thus using their CPU time more efficiently. For example, the number of requests to the database in a replicated database network system such as that depicted in FIG. 5 may decrease to a point that the number of server nodes 200 may be more than enough to meet the requests, possibly resulting in idle time for one or more of the server nodes 200. In this case, the number of server nodes 200 accepting transactions may be dynamically and automatically decreased in response to the decrease in activity. A decrease in demand may be due, for example, to a decrease in the number of clients 220.

In FIG. 8, client 220D is no longer accessing the replicated database. Thus, activity/demand may have dropped to a level that three server nodes 200 are no longer needed to service the decreased level of activity/demand. For a more efficient use of resources in the pool 250, one or more of the server nodes 200 may be dropped.

In some embodiments, communications between the server nodes 200 may be performed at periodic or aperiodic intervals. In these embodiments, the communications among the server nodes 200 may include information about activity and demand on the server nodes, e.g. the number of clients, the number of client requests, etc. One or more of the server nodes 200 may analyze this activity/demand information to detect a decrease in activity/demand. In one embodiment, a demand threshold may be specified and compared against an analysis of the activity/demand information to determine if activity/demand has decreased to a point that can be serviced by fewer server nodes. Other embodiments may use other mechanisms for determining if activity/demand has decreased, for example through periodic or aperiodic polling of the server nodes to determine activity/demand levels.

If one or more of the server nodes 200 determines that activity/demand has decreased to a level that the current number of server nodes is not needed to meet demand, the server nodes 200 may communicate with each other to determine one of the server nodes 200 to be removed. Any suitable mechanism may be used to determine a server node 200 to be removed. In one embodiment, one of the server nodes 200 may be designated as a master server node that decides which server node 200 should be removed, for example by comparing activity levels on the server nodes 200 and selecting a server with the least amount of demand or the fewest current clients. Other embodiments may use a distributed consensus mechanism, voting mechanism, or any other suitable mechanism to select a server node 200 to be removed.

In FIG. 8, server node 200C of FIG. 5 is selected to be removed, and thus becomes pool node 230E of FIG. 8. In one embodiment, a message may be sent to server node 200C instructing it to stop its server process; the message may be handled by a message handler on the server node, terminating the replicated database server process. Pool node 230E may then begin running some other process, if necessary or desired. In one embodiment, the database 210C on server node 200C may be deleted from the node. In one embodiment, any software and/or configuration information for running the replicated database server process may be deleted from the node.

Note that, in FIG. 8, client 220E loses access to the database when server node 200C is removed. Client 220E may attempt to reconnect to one of the server nodes 200 after losing connection to server node 200C of FIG. 5. In one embodiment, client 220E may send a broadcast message requesting a response from a server node 200. One or more of the remaining server nodes 200 may respond to this message, and client 220E may then connect to one of the responding server nodes 200. In this example, client 220E is shown as connected to server node 200B. Note that, in another embodiment, the clients 220 connected to a server node 200 that is being removed may first be moved to one or more other server nodes prior to taking the server node down.

Figure 9:
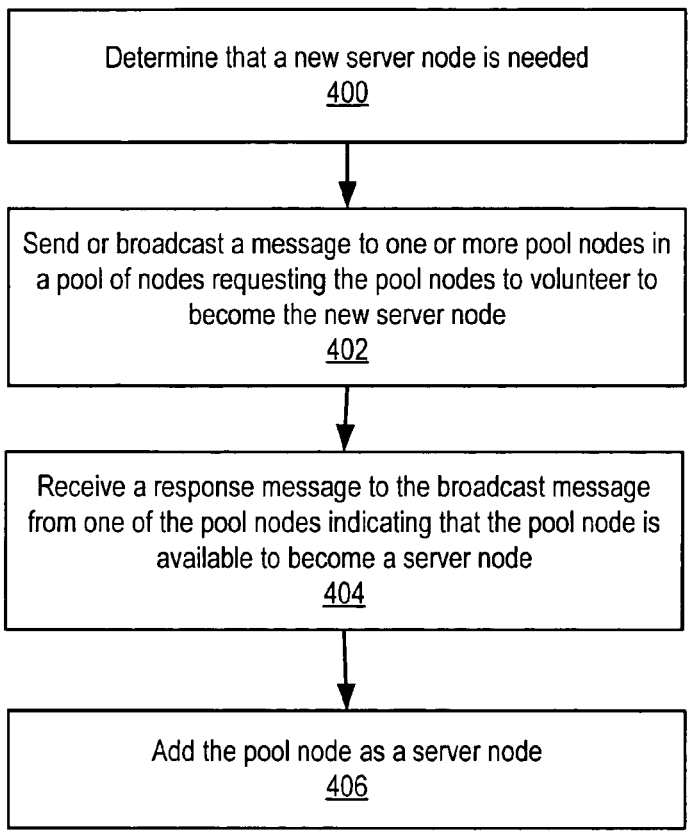
FIG. 9 is a flowchart of a method for determining that a new server node is needed and for adding the new server node in a replicated database system according to one embodiment.

FIG. 9 is a flowchart of a method for determining that a new server node is needed and for adding the new server node in a replicated database system according to one embodiment. Note that a new server node may be needed due to the loss of a server node or due to an increase in demand.

As indicated at 400, the server nodes may determine that a new server node is needed. In one embodiment, to determine that a new server node is needed, the server nodes may detect that one of the server nodes has gone down. In one embodiment, to determine that a new server node is needed, each of the server nodes may communicate with the other server nodes at periodic or aperiodic intervals, and, to detect that one of the server nodes has gone down, the server nodes may detect that the server node has not communicated with the other server nodes for a specified number of intervals or, alternatively, for a specified time period. Other embodiments may use other mechanisms to detect that a server node has gone down. In one embodiment, to determine that a new server node is needed, the server nodes may determine that demand on the replicated database has increased above a demand threshold, and thus an additional server node is needed to meet the demand.

After determining that a new server node is needed, either to replace a down server node or to meet an increase in demand, the server nodes may recruit a pool node from a pool of nodes to be the new server node. In one embodiment, the server nodes and pool nodes may be peer nodes in a peer group in a peer-to-peer network. To recruit a pool node, in one embodiment, one or more of the server nodes may send or broadcast a message to one or more pool nodes in the pool of nodes requesting the pool nodes to volunteer to become the new server node, as indicated at 402. One or more of the pool nodes may receive the message and, if available to become a server node, may respond to the message. As indicated at 404, one or more of the server nodes may receive a response message to the sent or broadcast message from one of the pool nodes indicating that the pool node is available to become a server node.

As indicated at 406, the volunteering pool node may then be added as the new server node. In one embodiment, upon receiving the sent or broadcast message asking for volunteers to become server nodes, a message handler on the pool node may stop execution of a current process on the pool node and start execution of a replicated database server process on the pool node. In one embodiment, if the pool node is not configured to become a server node, one or more of the server nodes may configure the pool node as the new server node in response to the response message from the pool node. In one embodiment, one or more of the server nodes may provide software and configuration information to the pool node to enable the pool node to operate as a server node. In one embodiment, one or more of the server nodes may send a copy or replica of the database to the pool node.

Figure 10:
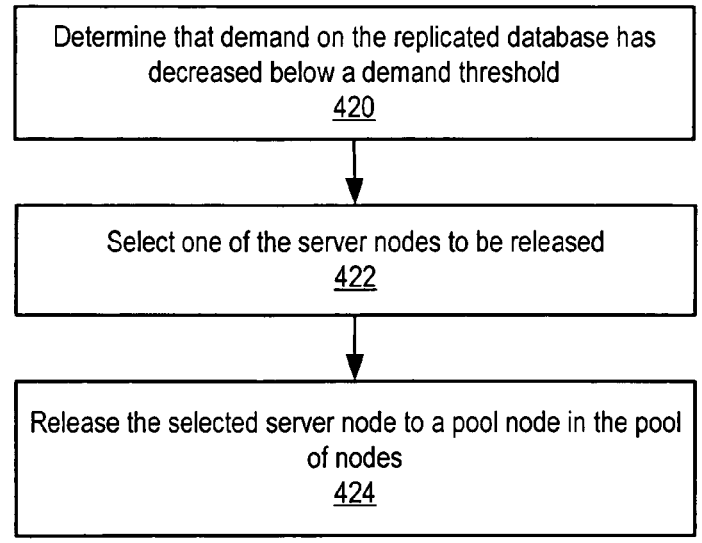
FIG. 10 is a flowchart of a method for releasing a server node due to a decrease in demand in a replicated database system according to one embodiment.

FIG. 10 is a flowchart of a method for releasing a server node due to a decrease in demand in a replicated database system according to one embodiment. As indicated at 420, the server nodes may determine that demand on the replicated database has decreased below a demand threshold. In some embodiments, communications between the server nodes may be performed at periodic or aperiodic intervals. In these embodiments, the communications among the server nodes may include information about activity and demand on the server nodes, e.g. the number of clients, the number of client requests, etc. One or more of the server nodes may analyze this activity/demand information to detect a decrease in activity/demand. In one embodiment, a demand threshold may be specified and compared against an analysis of the activity/demand information to determine if activity/demand has decreased to a point that can be serviced by fewer server nodes. Other embodiments may use other mechanisms for determining if activity/demand has decreased, for example through periodic or aperiodic polling of the server nodes to determine activity/demand levels.

If one or more of the server nodes 200 determines that activity/demand has decreased to a level that the current number of server nodes is not needed to meet demand, the server nodes may then select one of the server nodes to be released, as indicated at 422. In one embodiment, one of the server nodes may be designated as a master server node that decides which server node should be removed, for example by comparing activity levels on the server nodes and selecting a server with the least amount of demand or the fewest current clients. Other embodiments may use a distributed consensus mechanism, voting mechanism, or any other suitable mechanism to select a server node to be removed.

As indicated at 424, the selected server node may then be released, becoming a pool node in the pool of nodes. In one embodiment, a message may be sent to server node instructing it to stop its server process; the message may be handled by a message handler on the server node, terminating the replicated database server process. The server node, now a pool node, may then begin running some other process, if necessary or desired.

Synchronization of Replicated Data

To maintain consistency among the database replicas, some embodiments may provide a mechanism or mechanisms for synchronizing the database replicas on the server nodes, referred to herein as a database synchronization mechanism. In one embodiment, the database synchronization mechanism may be a component of the replicated database server software, such as replicated database server 212 of FIG. 5. Note that this section describes means for synchronizing the replicas of a database on two or more server nodes.

Figure 11:
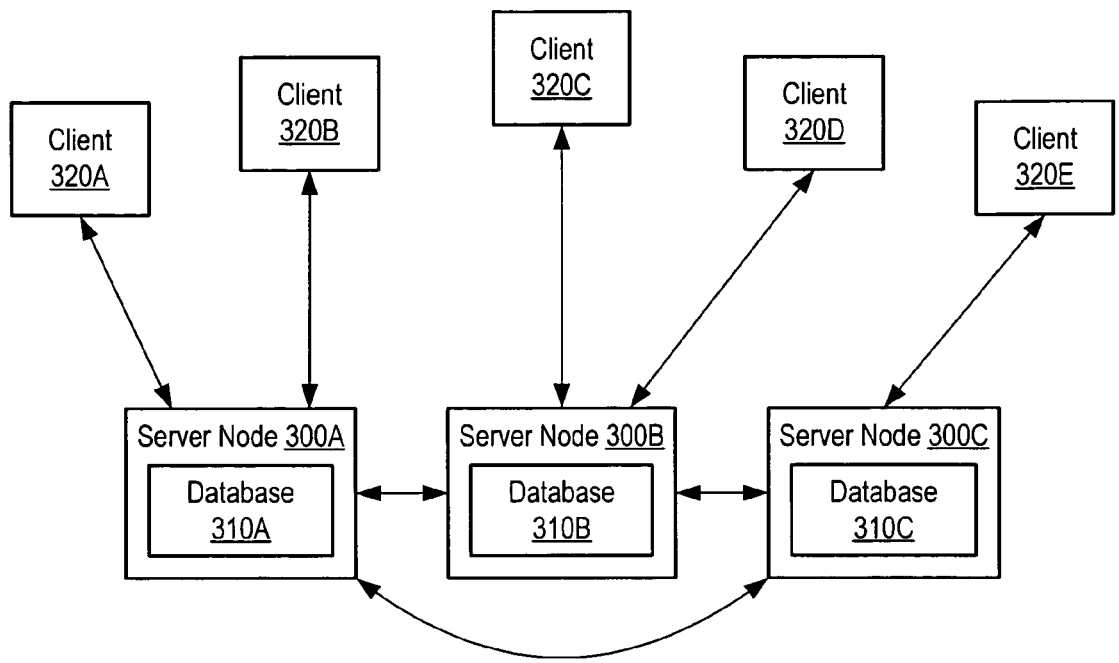
FIG. 11 illustrates an exemplary replicated database network system including clients and several server nodes according to one embodiment.

FIG. 11 illustrates an exemplary replicated database network system including clients and several server nodes according to one embodiment. This example includes three server nodes 300A, 300B, and 300C, each containing a copy of the replicated database 310A, 310B, and 310C, respectively. Five clients 320 access the replicated database on the server nodes 300, with clients 320A and 320B accessing server node 300A, clients 320C and 320D accessing server node 300B, and client 320E accessing server node 300C. In some embodiments, server nodes 300 may be peer nodes in a peer group in a peer-to-peer network, and clients 320 may be peer nodes either in the peer group or outside of the peer group.

In one embodiment, the server nodes 300 may communicate with each other, for example using a restricted broadcast mechanism. In one embodiment, the server nodes may be peer nodes in an exemplary peer-to-peer network implemented according to the JXTA peer-to-peer platform protocols, and the broadcast mechanism may be a propagate pipe of the JXTA peer-to-peer platform. This restricted broadcast enables the server nodes 300 to exchange messages among themselves without the messages being visible to any non-server nodes. The server nodes 300 may use the restricted broadcast mechanism to communicate to each other, for example, the state of their workload and updates of recent data collected from their clients 320. The server nodes 300 may also use the restricted broadcast mechanism to communicate with each other for other purposes, for example for selecting one from among two or more pool nodes that have volunteered to become server nodes, to determine demand level and thus whether to add or release server nodes, and, if a server node is to be released, to determine which server node is to be released.

The exemplary replicated database network system of FIG. 11 is used in FIGS. 12-15 to describe embodiments of several different database synchronization mechanisms that may be used in the exemplary replicated database network system for database synchronization.

Figure 12:
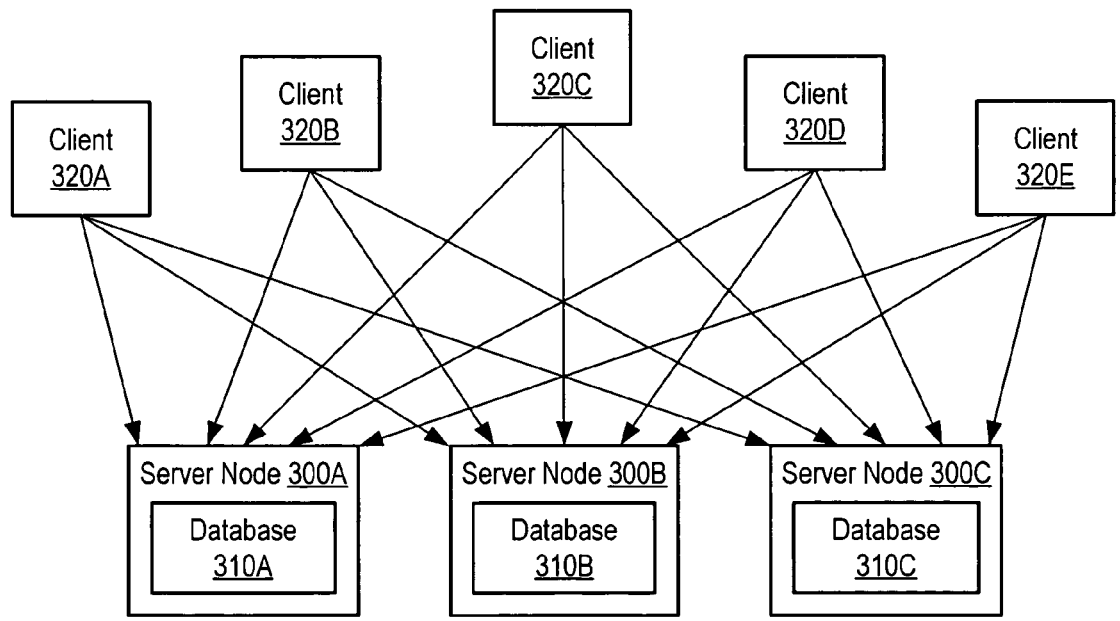
FIG. 12 illustrates a database synchronization mechanism in which each client sends all messages (e.g., requests and results) to each of the server nodes according to one embodiment.

FIG. 12 illustrates a database synchronization mechanism in which each client sends all messages (e.g., requests and results) to each of the server nodes according to one embodiment. In this embodiment, all of the clients 320 (e.g., computing nodes in a distributed computing system) send their messages (e.g. requests and results) to each of the three server nodes 300, and each of the server nodes independently processes the messages. However, this mechanism may not scale well, and performance may be low.

Figure 13:
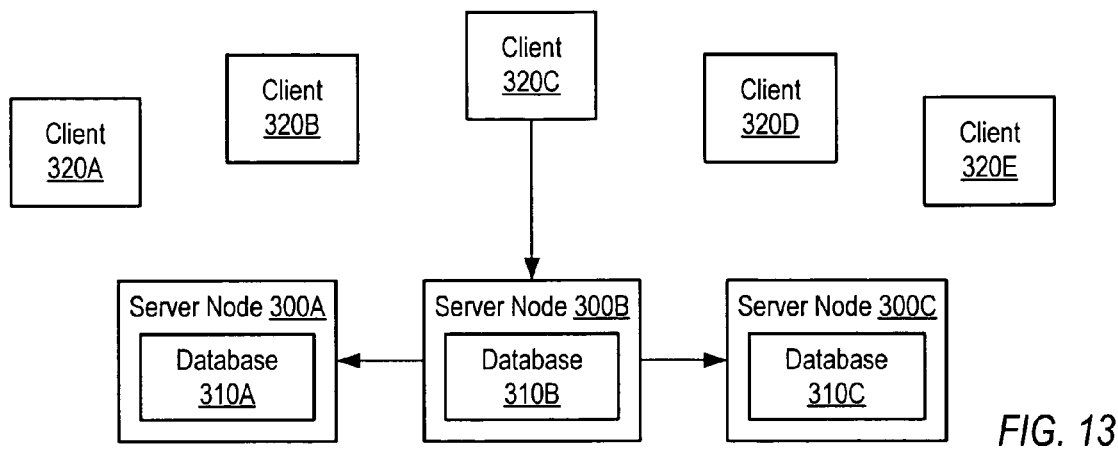
FIG. 13 illustrates a database synchronization mechanism in which each client sends its messages to only one of the server nodes, which then forwards the messages to the other server nodes, according to one embodiment.

FIG. 13 illustrates a database synchronization mechanism in which each client sends its messages (e.g., requests and results) to only one of the server nodes, which then forwards the messages to the other server nodes, according to one embodiment. In this embodiment, a server node 300 (server node 300B, in this example) sends updates to the other server nodes 300 whenever it receives a message (e.g., new data) from a client (client 320C, in this example). From a communication bandwidth perspective, this embodiment may be better than the embodiment depicted in FIG. 12 because a message from a client 320 is only sent to a single server node 300, which in turn forwards the message to all other server nodes 300. However, this embodiment may generate numerous messages among server nodes 300, which may use a considerable amount of the communication bandwidth.

Figure 14A:
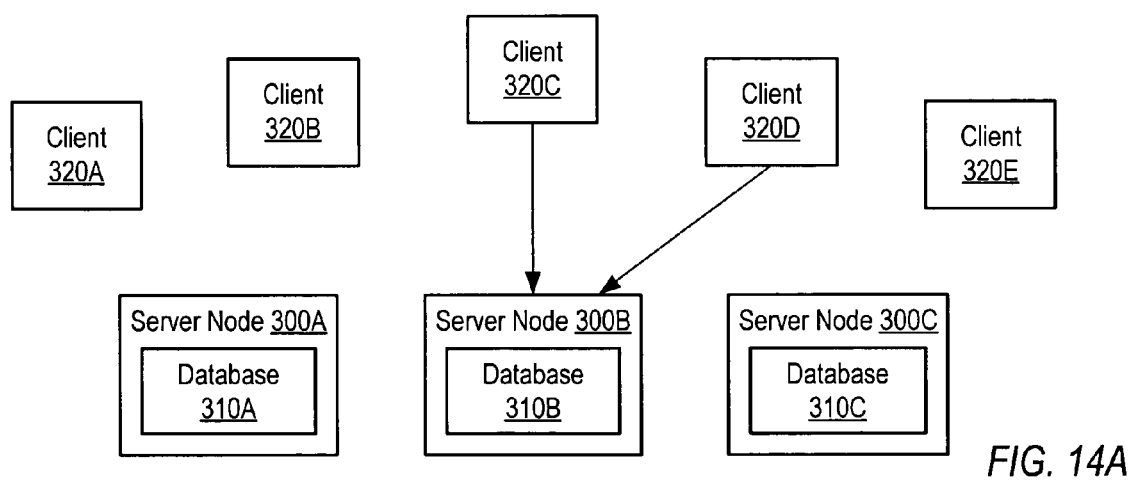
FIGS. 14A-14B illustrate a database synchronization mechanism in which each client sends its messages to one of the server nodes, which then forwards the messages to the other server nodes at periodic or aperiodic time intervals, according to one embodiment.
Figure 14B:
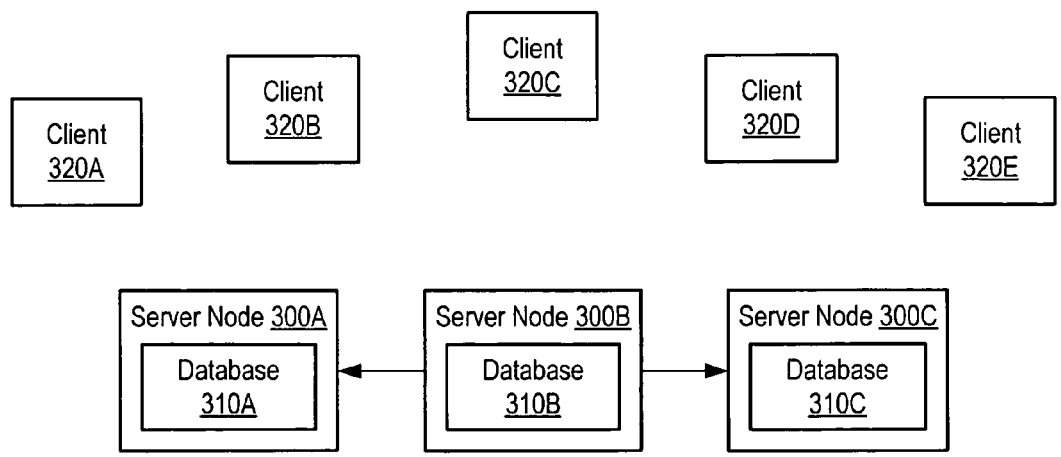

FIGS. 14A-14B illustrate a database synchronization mechanism in which each client sends its messages (e.g., requests and results) to one of the server nodes, which then forwards the messages to the other server nodes at periodic or aperiodic time intervals, according to one embodiment. This embodiment is similar to the embodiment described for FIG. 13, but updates are not sent every time a server node 300 receives a message from a client 320, but rather at periodic or aperiodic time intervals. These intervals may vary from fractions of a second to minutes or more. In FIG. 14A, clients 320C and 320D send messages to server node 300B. In FIG. 14B, at some periodic or aperiodic time interval, server node 300B sends updates to server nodes 300A and 300C. Note that server nodes 300A and 300C may also periodically or aperiodically send updates to the other server nodes.

This embodiment has advantages including, but not limited to, limiting the number of messages among server nodes 300 and reducing the communication bandwidth required. An advantage of stateless message exchanges is the reduction of bandwidth requirements. However, as previously noted, communications may not be reliable in some networks such as peer-to-peer networks, and thus server nodes may not be reachable at all times. Because communications may not be reliable, server node 300B may send its latest update to server nodes 300A and 300C, and only server node 300A might receive it, in which case server node 300C may have an inconsistent database. Server node 300C may not be able to easily recover from that state, since server node 300B may not include the data previously sent in its next update.

Figure 15A:
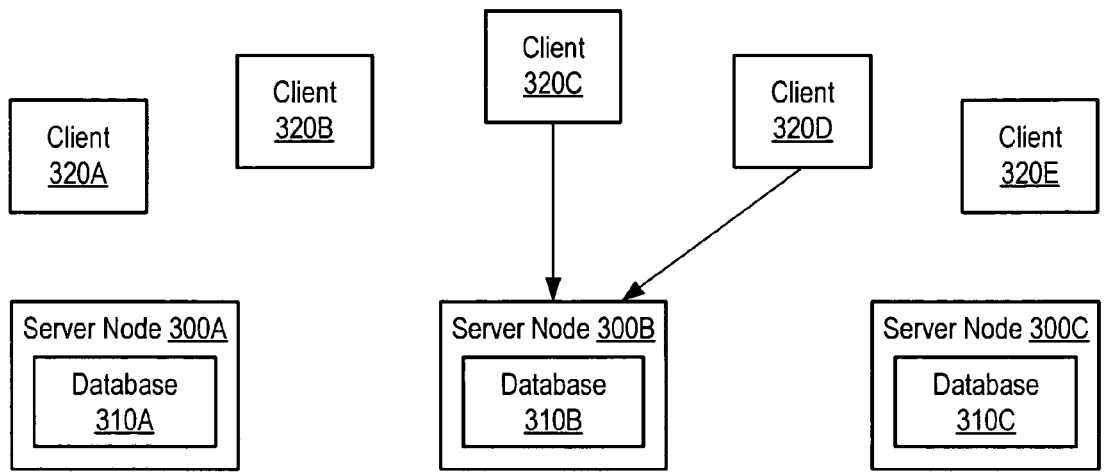
FIGS. 15A-15B illustrate a database synchronization mechanism in which each client sends its messages to one of the server nodes, which then sends or broadcasts a current status of its database to the other server nodes at periodic or aperiodic time intervals, according to one embodiment.
Figure 15B:
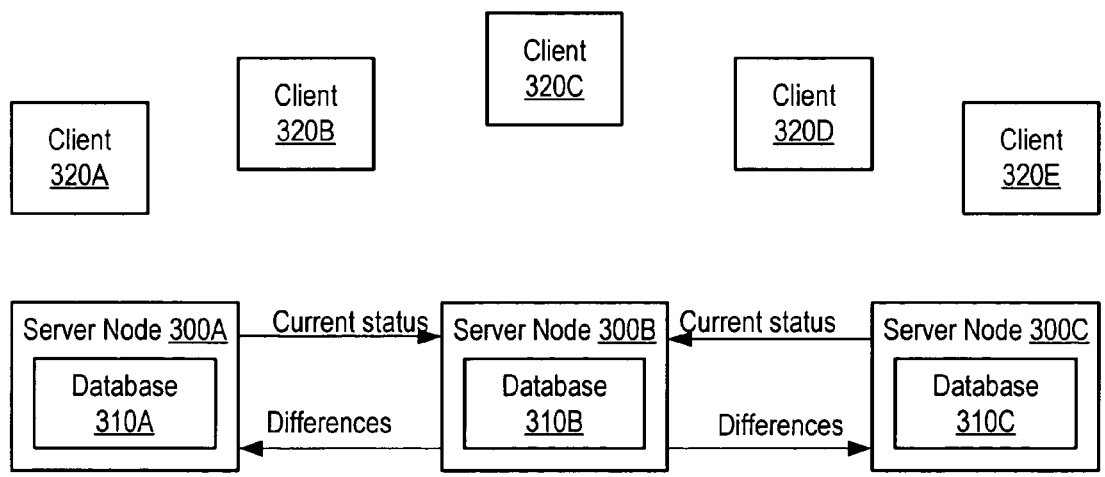

FIGS. 15A-15B illustrate a database synchronization mechanism in which each client sends its messages (e.g., requests and results) to one of the server nodes, which then sends or broadcasts a current status of its database to the other server nodes at periodic or aperiodic time intervals, according to one embodiment. In FIG. 15A, clients 320C and 320D send messages to server node 300B. The messages may include or indicate one or more changes (e.g., new database elements) for database 310B. In FIG. 15B, at some periodic or aperiodic time interval, server nodes 300A and 300C may send the current status of their respective databases (310A and 310C) to server node 300B. Server node 300B then may compare the current status of database 310B to the received current statuses of databases 310A and 310C, and reply to server nodes 300A and 300C with determined differences in the statuses, if any. In this example, differences in the status would include any changes to the database resulting from the messages received by server node 300B in FIG. 15A. After receiving the differences in the statuses, server nodes 300A and 300C may update their respective databases 310. Note that server node 300A and 300C may also periodically or aperiodically send the current status of their respective databases 310A and 310C to each other, and server node 300B may also periodically send the current status of database 310B to the other server nodes. This embodiment has advantages including, but not limited to, limiting the number of messages among server nodes 300 and reducing the communication bandwidth required.

This embodiment takes into account that messages may be exchanged in a connectionless manner in some networks such as a peer-to-peer network, and therefore should not be assumed to be exchanged reliably. In this embodiment, each server node 300 may send each other server node the current status of its database 310 at periodic or aperiodic time intervals, and request that the other server nodes reply with the differences, if any, between their own database's current status and the sent current status. In this embodiment, instead of a server node 300 sending updates at regular time intervals to the other server nodes, the server node 300 sends one or more messages to the other server nodes 300 including a current status of its copy of database 310. Upon receiving the message(s) including the current status of the copy of the database 310, each of the other server nodes 300 may compare the current status of its copy of the database 310 to the current status received in the message(s). If any differences are detected, the server node 300 then sends the new/different data to the server node 300 that sent its current status. In one embodiment, if there are many differences, the data may be split into two or more messages. The server node 300 that sent its current status receives the message(s) including differences and updates its database 310 accordingly. In one embodiment, if a server node 300 receives the same new data from two or more other server nodes 300, it keeps one and discards the rest. Note that race conditions may occur. In one embodiment, if a race condition between differences received from two or more server nodes is detected, the difference with the most recent time is accepted as correct and used for updating the database.

In one embodiment, to conserve bandwidth, the size of the messages containing the current database status may be limited. In one embodiment, the current status of the database sent in one or more messages to other server nodes 300 may include information summarizing the status of the database on the server node. For example, in an exemplary replicated database implemented in a distributed computing system, the summary status may include one or more of, but is not limited to, a list of numbers indicating "completed" tasks, a list of numbers indicating "submitted" tasks, and a list of numbers indicating "non-submitted" tasks. In this example, the summary status does not include the tasks themselves. In other implementations of a replicated database, depending on the information contained in the database, different sets of information may be used to summarize the database status (e.g. timestamps, modifications, etc.)

In one embodiment, when a new server node is added, it receives a replica of the entire database from one of the other server nodes. The new server may then send or broadcast a "blank" current status to the other server nodes and receive back differences to synchronize its database.

Figure 16:
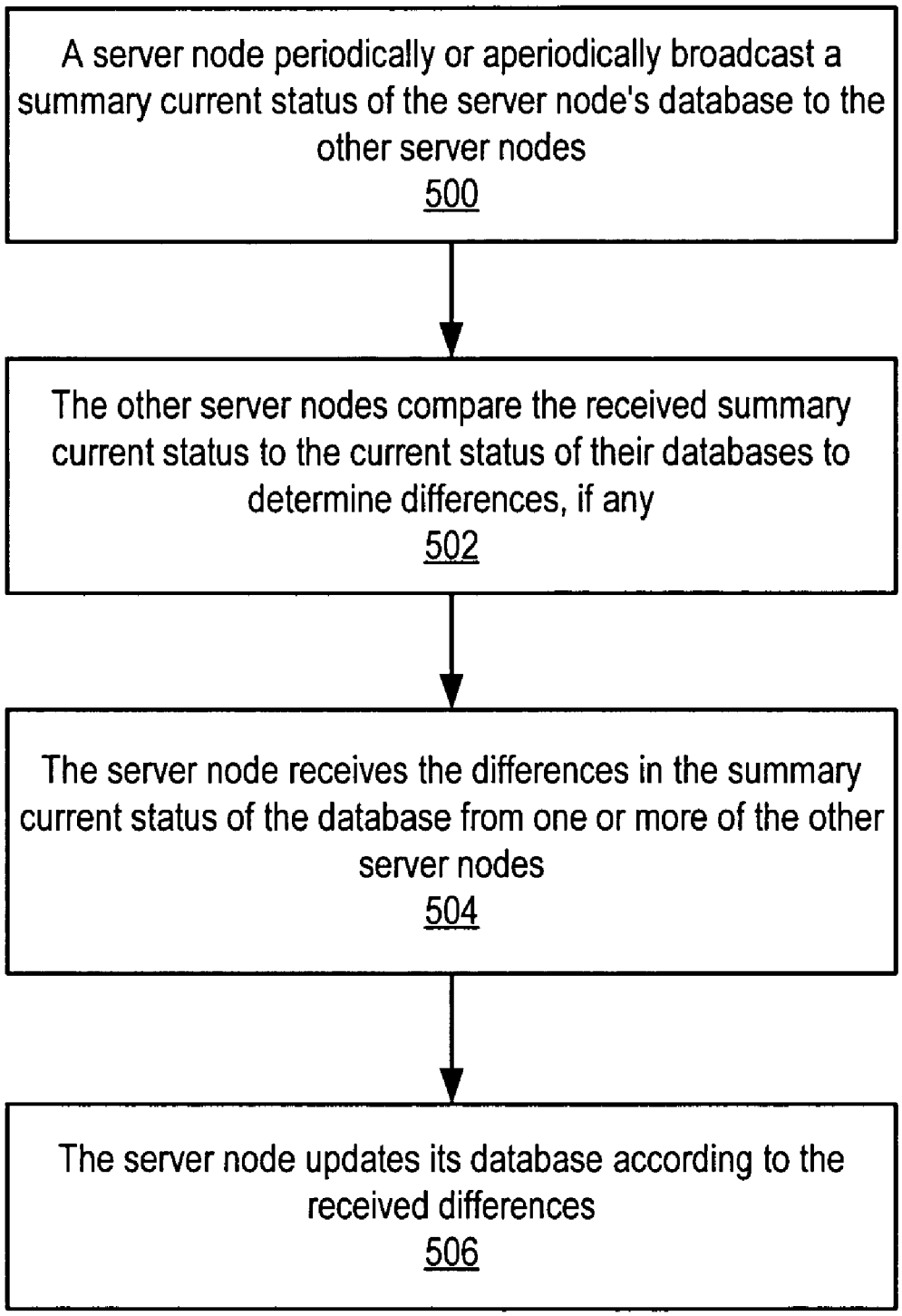
FIG. 16 is a flowchart of a method for synchronizing database replicas in replicated database system according to one embodiment.

FIG. 16 is a flowchart of a method for synchronizing database replicas in replicated database system according to one embodiment. As indicated at 500, a server node periodically or aperiodically broadcasts a summary current status of the server node's database to the other server nodes. As indicated at 502, the other server nodes compare the received summary current status to the current status of their databases to determine differences, if any. The differences are then sent to the originating server node. As indicated at 504, the server node receives the differences in the summary current status of the database from one or more of the other server nodes. As indicated at 506, the server node then updates its database according to the received differences. Note that each of the server nodes in the replicated database system may periodically update its database using this mechanism.

Exemplary Distributed Computing System

Embodiments of an exemplary distributed computing framework, or grid computing framework, and an exemplary distributed computing mechanism, or grid computing mechanism, which may be implemented with the framework, are described. Embodiments of the system and method for the dynamic configuration of replicated database servers in networks described above may be used in embodiments of the exemplary distributed computing system to dynamically configure and synchronize replicated databases within the framework.

Exemplary Distributed Computing Framework

Embodiments of an exemplary system and method for submitting computational tasks in a distributed heterogeneous networked environment are described. Embodiments of this exemplary distributed computing framework may utilize peer groups in a distributed architecture to decentralize task dispatching and post-processing functions and to provide the ability to manage and run many different applications simultaneously. Embodiments may provide a dynamic grid (hence, "grid computing framework"), where nodes are added and removed during the lifetime of the jobs. Embodiments may provide redundancy, where the dynamic nature of the grid does not affect the results. In embodiments, computational resources may be organized into groups, such that internode communications does not occur in a one-to-all or all-to-all mode. Embodiments may provide heterogeneity, where a wide variety of computational platforms are able to participate. Embodiments of this exemplary distributed computing framework may be used to implement embodiments of the distributed computing mechanism described below. Embodiments of the system and method for the dynamic configuration of replicated database servers in networks described above may be used in mechanisms implemented with the exemplary distributed computing framework, such as embodiments of the distributed computing mechanism described below, to dynamically to dynamically configure and synchronize replicated databases.

One embodiment may utilize peer groups, such as those of the JXTA platform, as a fundamental building block of the framework. Using peer groups, resources may be grouped according to functionality, in the process building redundancy and restricting communication messages to relevant peers.

In one embodiment, the distributed computing framework may include one or more monitor peer groups, one or more worker peer groups, one or more task dispatcher peer groups, and one or more repository peer groups. A monitor group may be a top-level group that coordinates the overall activity of the framework, including handling request for peers to join the framework and their subsequent assignment of the node to peer groups, and high-level aspects of the job-submission process. A worker group may be responsible for performing the computations of a particular job, while a task dispatcher group distributes individual tasks to workers. A repository group may serve as a cache for code and data. One of ordinary skill in the art will recognize that not all of the above groups need to be present in order to implement the present invention. Each group may be independently implemented on top of other architectures to provide various advantages described above.

A single node may belong to several peer groups in the framework, and likewise there may be many instances of each peer group within the framework. These interconnectivity and redundancy features may preferably handle the dynamic nature of the environment, where resources are added and removed on a regular basis.

In one embodiment, there may be two parts to a job: the code used by the worker nodes, which is common for all tasks within the global job, and the data used by the code, which generally varies for each task within a global job. For simplicity, the data used by the code will be referred to as a task. Many types of data are divisible into multiple tasks. The data segment of the job submission may range from being simple parameters that vary from task to task, to large data sets required for computations. The storage of the two elements for a job may be distributed through the network in a decentralized fashion. The management of these components may fall under the repository peer group.

Figure 17:
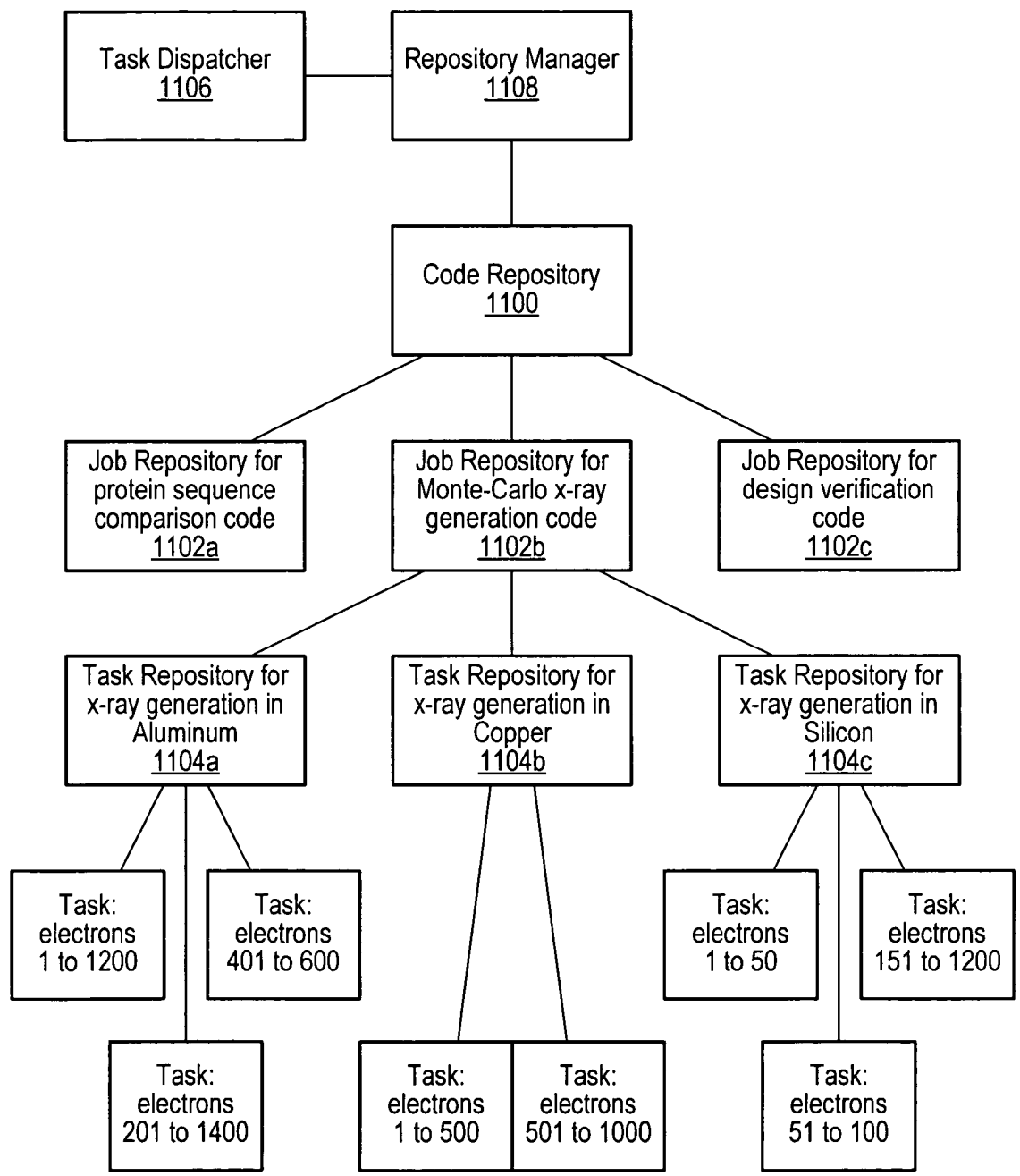
FIG. 17 is a diagram illustrating an example of a repository peer group according to one embodiment.

FIG. 17 illustrates an example of a repository peer group according to one embodiment. The code repository 1100 may include three codes, each having its own job repository 1102a, 1102b, and 1102c. Each job then may then be composed of a different number of tasks 1104a, 1104b, and 1104c. The interaction of the code repository group 1100 with the rest of the framework may be through the task dispatcher group 1106. Upon receiving the job submission, the task dispatcher may poll the repository to determine the status of the code within the code repository. If the repository is current, then the code may be retrieved, and otherwise may be uploaded and stored in the code repository. For each job, a job repository may be created. A job repository is a tree containing a repository for tasks within the job, which are submitted by the end-user. In one embodiment, the task dispatcher may not be required to keep track of the job submitters that contacted it.

In one embodiment, the submission of a job may proceed as follows. The job submitter may send a message (e.g. a markup language message such as an Extensible Markup Language (XML) message) to the task dispatcher with identification (such as a name) of the code to be run. The task dispatcher then may check with the repository manager 1108 to see whether the identification of the code to be run is already in the code repository. If it is not in the code repository, then a task dispatcher may request the classes for the code from the job submitter. The job submitter may send the classes for the code to the task dispatcher, which may submit them to the repository manager. The repository manager may create a job repository for this code, where the classes are stored.

Turning now to the worker groups, within each worker group there may be a task dispatcher. Idle workers may regularly poll the task dispatcher relaying information regarding resources available, including codes the worker has cached. Based on this information, the task dispatcher may poll the repository for tasks to be performed on available codes, or alternatively for codes to be downloaded to the workers. Upon distribution of code and tasks, the worker may perform the task and return the result to the task dispatcher. In one embodiment, the task dispatcher may not be required to keep track of which workers are performing which tasks.

In one embodiment, handshaking may not be required between the worker and the task dispatcher. Both are working in such a manner that lost messages may not affect the completion of a job. As such, a worker may become inaccessible during execution, which would not affect the completion of a job. The task dispatcher may update the repository with information about task completion, and redundant tasks may be performed to account for node failure.

In one embodiment, the joining of workers to the framework to execute the work contained in the code repository may proceed as follows. Workers may first contact the task dispatcher by sending a message (e.g. an XML message). If the worker has recently been working on some codes, it may send a list of recently worked-on codes along with this message. Then the task dispatcher may look at the codes sent by the worker and decide based on this which code the worker may work on. Once the code is determined, the task dispatcher may send the classes required to run the code to the worker. If there are no tasks available for execution in the code repository, the task dispatcher may tell the worker to sleep for a period and to check again for work afterwards. In one embodiment, this period is a tunable parameter. The worker may store the classes in a directory that belongs to its class path so that these classes may be loaded dynamically at code execution time. Afterwards, the worker may request tasks for the code from the task dispatcher. The task dispatcher may hand this request to the repository manager. The repository manager may check whether a job has been submitted for this code; that is, if there is a job repository for this code. If several jobs have been submitted, i.e., the job repository contains several task repositories, in one embodiment, the repository manager may choose the task repository that was submitted first and of which all the tasks have not yet completed. From this task repository, the repository manager may choose a task that has not yet been submitted to a worker. If all tasks have already been submitted, the repository manager may choose a task that has already been submitted but has not completed yet. The chosen task may be handed back to the task dispatcher, who sends the chosen task to the worker.

The worker may receive the task and execute it. Once the execution is complete, the worker may send the task back to the task dispatcher. The returned task may include the results of the execution. The task dispatcher gives the task to the repository manager, which may store the task in the relevant repository. At this point, the worker may request another task from the task dispatcher, if desired.

A work group may be composed of a group of peers. In one embodiment, access to this peer group may be limited, and nodes outside the peer group may not access the peer group without special authorization. Using a peer group may preferably enable intercommunication to be limited to a set of peers, and may preferably reduce or eliminate processing of messages from the outside world that may reduce the overall communication bandwidth within the peer group.

Figure 18:
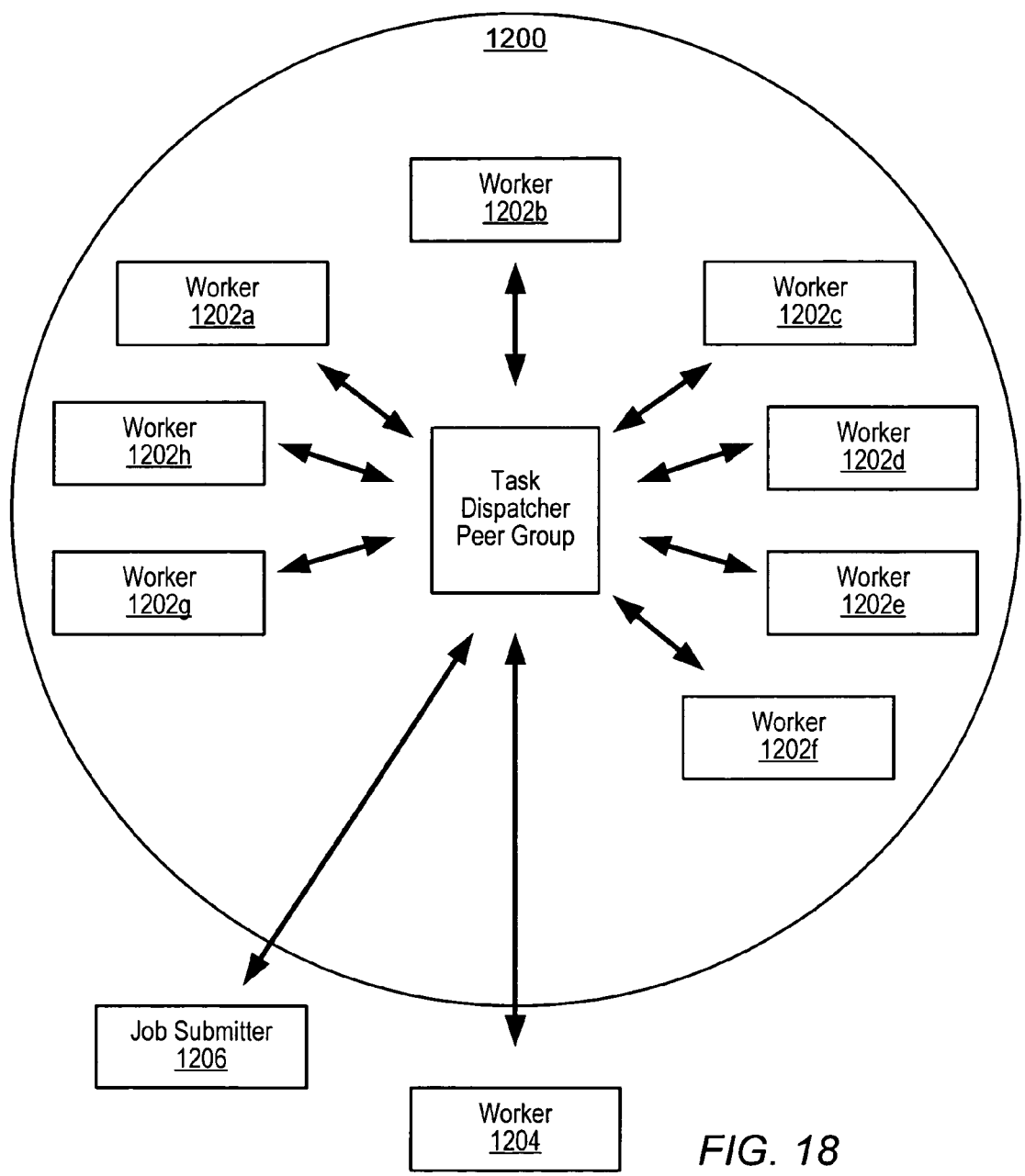
FIG. 18 is a diagram illustrating the interactions between workers, a task dispatcher, and the outside world according to one embodiment.

FIG. 18 is a diagram illustrating the interactions between workers, a task dispatcher peer group, and the outside world according to one embodiment. Peer group 1200 may include peers 1202a-1202g, which may exchange messages with each other. In one embodiment, communication with the "outside world" is preferably only necessary when a peer outside of the work group desires to establish communication with the task dispatcher peer group. For example, a worker 1204 may want to join the work group. As another example, a job submitter 1206 may want to submit a job to the work group.

Once a job has completed, that is, all the tasks in its task repository have completed, the tasks are ready to be sent back to the job submitter. In one embodiment, the task dispatcher may not be required to keep track of the job submitters. In this embodiment, it may be up to the job submitter to initiate the result retrieval process. The job submitter may include a procedure that polls the task dispatcher to determine whether the job that it submitted has completed. Each job may have a job repository, which may have a unique identifier (ID). This unique ID may be sent to the job submitter when the job repository is created, and may be used to request the results. The task dispatcher may relay this request to the repository, which may return the results if the job has completed. These results may be sent back to the job submitter. The job submitter may retrieve the array of tasks and post-processes them, if desired.

Figure 19:
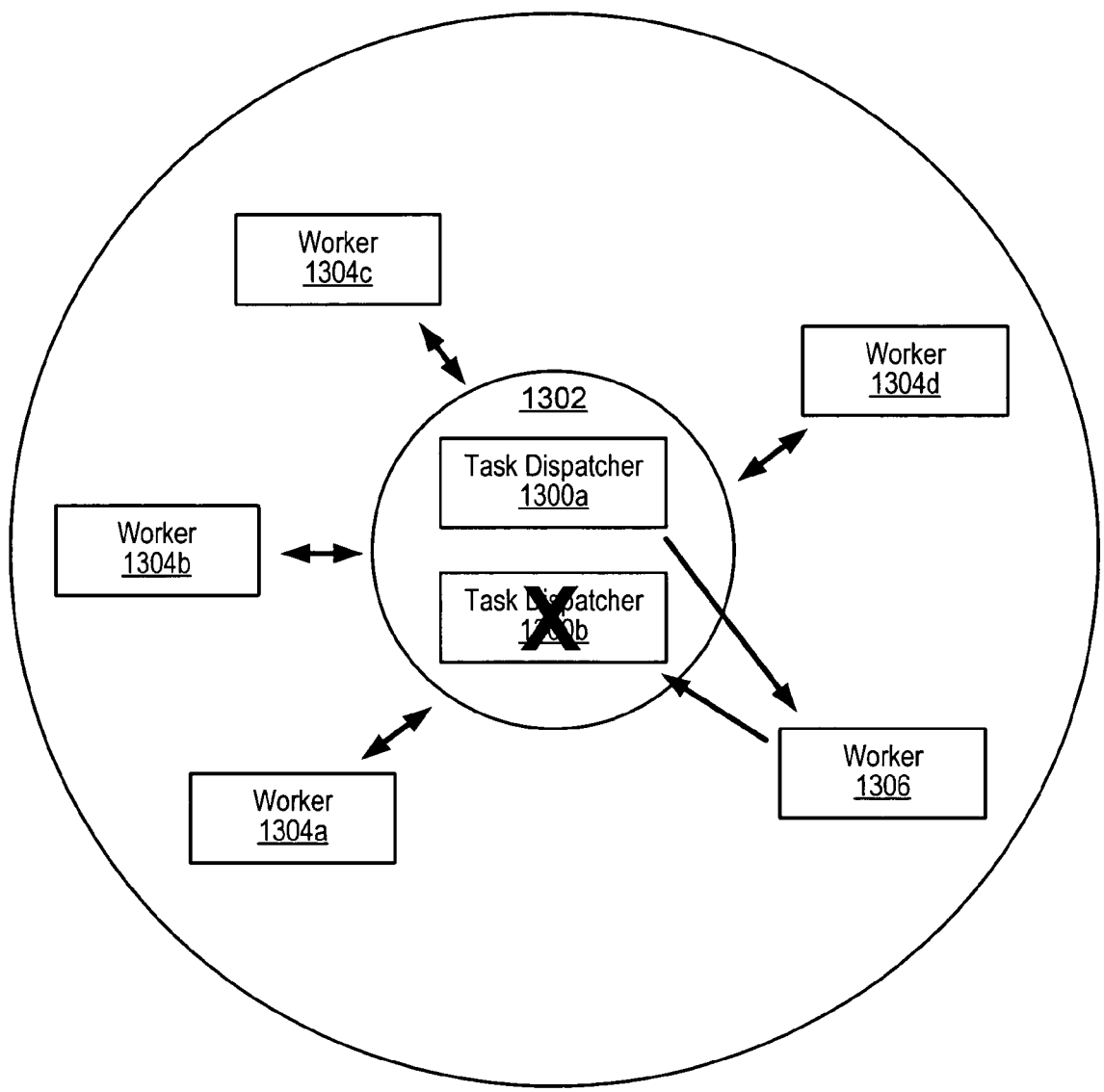
FIG. 19 is a diagram illustrating a worker node assuming the role of task dispatcher according to one embodiment.

FIG. 19 is a diagram illustrating a worker node assuming the role of task dispatcher according to one embodiment. If there was only a single task dispatcher and it was interrupted, all the results from the tasks executed by the workers who sent their results to the task dispatcher would be lost. Therefore, redundant task dispatchers (e.g. task dispatchers 1300a and 1300b) may be included in task dispatcher peer groups 1302. With multiple task dispatchers keeping each other up-to-date with the latest results they have received, the information is not lost if one of the task dispatchers incurs an outage.

In one embodiment, a new worker joining a work group does not contact a particular task dispatcher, but instead contacts the task dispatcher peer group. One of the task dispatchers may then reply to the incoming message. The question of which task dispatcher replies is discussed later in this application. The worker then may establish communication with the task dispatcher. This is illustrated by workers 1304a, 1304b, 1304c, and 1304d. In one embodiment, if a task dispatcher fails to respond to a worker, the worker may back out a level and contact the task dispatcher peer group again. A different task dispatcher may then respond to the worker.

In one embodiment, task dispatchers in a peer group may communicate by sending each other messages, for example at regular time intervals. This regular message exchange may be termed the task dispatcher heartbeat. When a task dispatcher receives new results from a worker, the task dispatcher may send the results to another task dispatcher in the group to maintain a redundant copy of the results. In one embodiment, in order to reduce the communication between task dispatchers, task dispatches may update each other with the newest results only during heartbeats.

In one embodiment, if a task dispatcher 1300a in a peer group realizes that its redundant counterpart (e.g. task dispatcher 1300b) is missing, it may invite a worker 306 requesting a task to execute the task dispatcher code in its peer group, thus transforming a regular worker into a task dispatcher. In one embodiment, both the worker and task dispatcher codes implement a common interface, making them equally schedulable in this mode.

In one embodiment, the number of task dispatchers in the task dispatcher peer group may not be limited to two. Triple or higher redundancy of task dispatchers in the peer group is possible. In one embodiment, because the communication protocols may be applied in a large network, the distributed computing framework may take advantage of the higher reliability offered by having redundant task dispatchers in different geographical regions. By having redundant task dispatchers in different regions, for example, a power outage in one region may not result in loss of information.

As workers are added to a work group, the communication bandwidth between workers and task dispatchers may become a bottleneck. To prevent this, another role may be introduced, the monitor. The main function of the monitor is to intercept requests from peers that do not belong to any peer group yet. Monitors may act as middlemen between work groups and joining peers. Job submitters who want to submit a job and workers who want to join a work group to work on a task may contact a monitor. Monitors free task dispatchers from direct communication with the outside world. Work groups communicate with their monitor and, in one embodiment, do not see the rest of the communication outside of the work group.

A monitor may have several work groups to monitor and may redirect requests from peers from the outside to any of the work groups it monitors. This redirection may depend on the workload of these subgroups. In one embodiment, monitors may participate in monitor peer groups, with several monitors updating each other within a monitor peer group to provide redundancy.

With the addition of monitors, the way jobs are submitted to the framework may be as follows. Job submitters make requests to the monitor peer group. Monitors within the peer group may redirect these requests to a work group. The choice of this group may depend on what code these work groups are already working on, their workloads, etc. The work group may reply directly to the job submitter, which establishes a working relationship with the work group.

The redirection by the top monitor group may happen only once at the initial request by the job submitter to submit a job. Afterwards, messages may be directly sent from the job submitter to the correct work group. A similar protocol may be followed when a new worker wants to join the framework. In addition to redirecting newcomers to the right work groups, the role of the monitors may include monitoring the work groups. In one embodiment, it is up to the monitor to decide to which work group a job should be submitted. The monitor may therefore keep track of work group loads, codes, and information about the loss of task dispatchers in a work group.

In one embodiment, monitors may keep each other up to date with the status of the work groups under them with the monitor group heartbeat. Monitors may also request a worker to become a monitor in case of a monitor failure. If too many peers are present in a work group, the communication bandwidth within that group may become a bottleneck. This may also happen if too many work groups are associated with the same monitor peer group. Therefore, one embodiment may enable a hierarchy of monitor peer groups, with each monitor peer group monitoring a combination of work groups and monitor groups. Whenever a monitor group becomes overloaded, the monitor group may split off a separate monitor group, which takes some of the load off the original monitor group.

Figure 20:
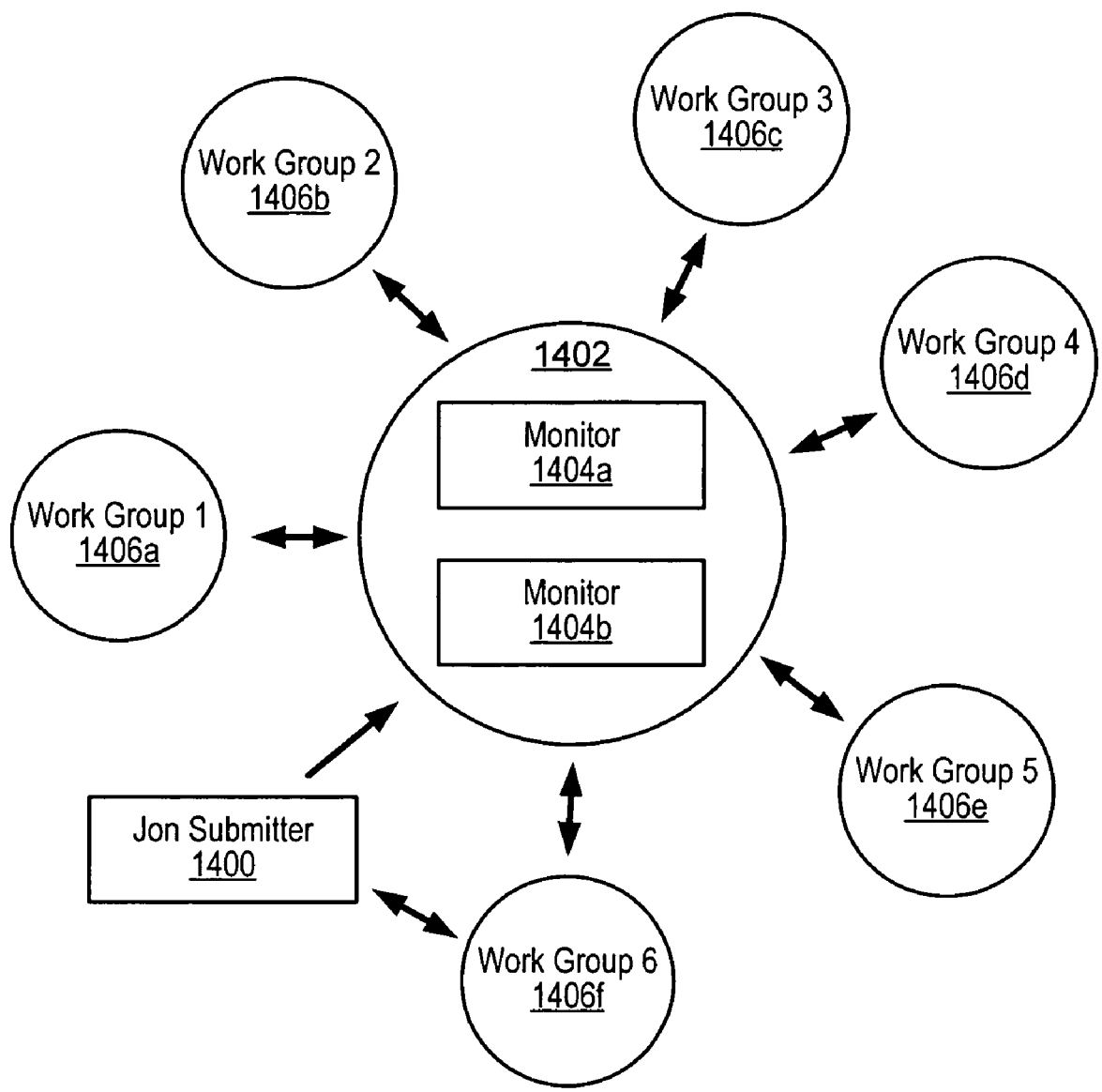
FIG. 20 is a diagram illustrating a mechanism used to submit a job or to request a task from a framework according to one embodiment.

FIG. 20 is a diagram illustrating a mechanism used to submit a job or to request a task from a framework according to one embodiment. The job submitter 1400 or worker contacts the top monitor group 1402. Based on the information passed with the message, one of the peers 1404a and 1404b in the top monitor group may decide which subgroup 406a-406f to hand on the request to, and forward the request to the chosen subgroup. If this subgroup is a monitor group, the message may be forwarded until it reaches a work group. Once the message is in a work group, a task dispatcher in the work group may send a reply to the job submitter/worker. This message may contain the peer ID of the task dispatcher to contact, the ID of the task dispatcher peer group, as well as the peer group IDs of the intermediate peer groups involved in passing down the message. The job submitter/worker at this stage has a point of contact in a new work group. If it fails to contact the task dispatcher, it may successively contact the task dispatcher peer group, its parent, grandparent, etc. until it succeeds in contacting someone in the chain. The last level of the hierarchy is the top-level monitor group.

Because all the new peers joining the framework have to go through the top-level monitor group, the communication at that level might become a bottleneck in the model. In one embodiment, when a new peer contacts the top-level monitor group, all the monitors within this peer group receive the message. Each monitor in the monitor group has a subset of requests to which it replies. These subsets do not overlap and put together compose the entire possible set of requests that exist. Based on a request feature, a single monitor takes the request of the new peer and redirects it to a subgroup.

In one embodiment, monitors may decide whether to reply to a given request based on the request itself coming from the new peer. In this embodiment, there may be no need for communication between monitors to decide who will reply. For example, if there are two monitors in the monitor groups, one monitor could reply to requests from peers having odd peer IDs, while the other monitor could reply to requests from peers having even peer IDs. The decision may not require any communication between the monitors, and thus may reduce the communication needs and increase the bandwidth for other messages. This decision also may be based on the geographical proximity of the requester to the monitor.

Figure 21:
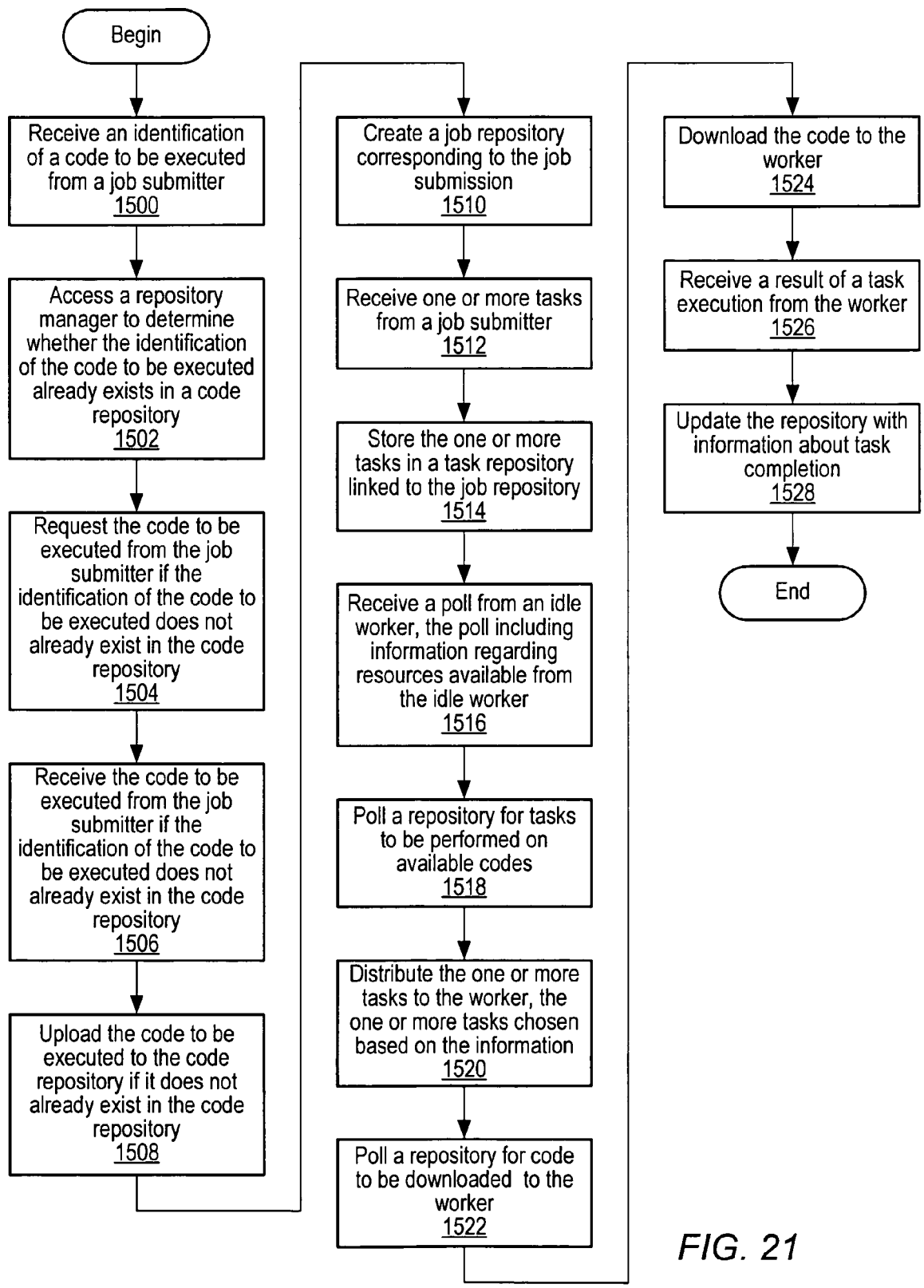
FIG. 21 is a flow diagram illustrating a method for coordinating a job submission in a distributed computing framework according to one embodiment.

FIG. 21 is a flow diagram illustrating a method for coordinating a job submission in a distributed computing framework according to one embodiment. At 1500, an identification of a code to be executed may be received from a job submitter. At 1502, a repository manager may be accessed to determine whether the identification of the code to be executed already exists in a code repository. At 1504, the code to be executed may be requested from the job submitter if the identification of the code to be executed does not already exist in the code repository. At 1506, the code to be executed may be received from the job submitter if the identification of the code to be executed does not already exist in the code repository. At 1508, the code to be executed may be uploaded to the code repository if it does not already exist in the code repository. At 1510, a job repository corresponding to the job submission may be created. This may be stored on multiple peers. It may also be a part of a repository peer group. At 1512, one or more tasks may be received from a job submitter. At 1514, the one or more tasks may be stored in a task repository linked to the job repository. In one embodiment, the creating and storing may be performed by a repository manager. The receiving an identification, uploading, creating, receiving one or more tasks, and storing may be performed using a peer-to-peer protocol, for example a peer-to-peer protocol of the JXTA platform. At 1516, a poll may be received from an idle worker. In one embodiment, the poll may include information regarding resources available from the idle worker. This information may include information regarding codes cached by the worker. At 1518, a repository may be polled for tasks to be performed on available codes. This may comprise contacting a repository manager. The repository manager may control one or more repositories in a repository peer group. At 1520, one or more of the tasks may be distributed to the worker; the one or more tasks may be chosen based on the information. At 1522, a repository may be polled for code to be downloaded to the worker. At 1524, the code may be downloaded to the worker. At 1526, a result of a task execution may be received from the worker. At 1528, the repository may be updated with information about task completion. The receiving a poll, polling a repository, distributing, receiving a result, and updating may be performed using a peer-to-peer protocol, for example a peer-to-peer protocol of the JXTA platform.

Figure 22:
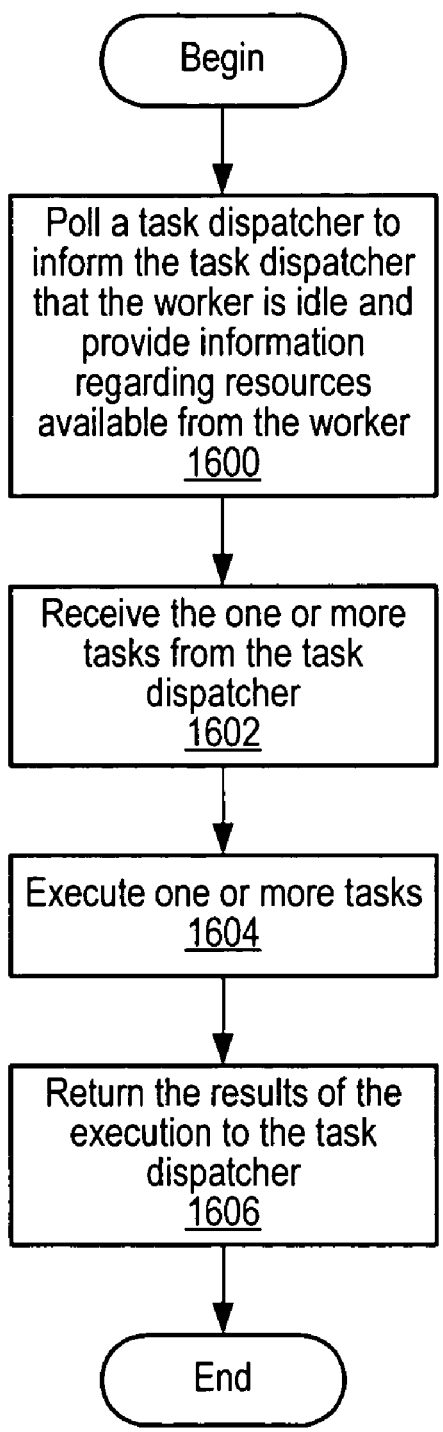
FIG. 22 is a flow diagram illustrating a method for coordinating execution of a task by an idle worker in a distributed computing framework according to one embodiment.

FIG. 22 is a flow diagram illustrating a method for coordinating execution of a task by an idle worker in a distributed computing framework according to one embodiment. At 1600, a task dispatcher may be polled to inform the task dispatcher that the worker is idle and provide information regarding resources available from the worker. This information may include information regarding codes cached by the worker. At 1602, the one or more tasks may be received from the task dispatcher. The task dispatcher may be a task dispatcher manager. This may be a task dispatcher that controls one or more task dispatchers in a peer group. At 1604, the one or more tasks may be executed. At 1606, the results of the execution may be returned to the task dispatcher. The polling, receiving, and returning may be performed using a peer-to-peer protocol, for example a peer-to-peer protocol of the JXTA platform.

Figure 23:
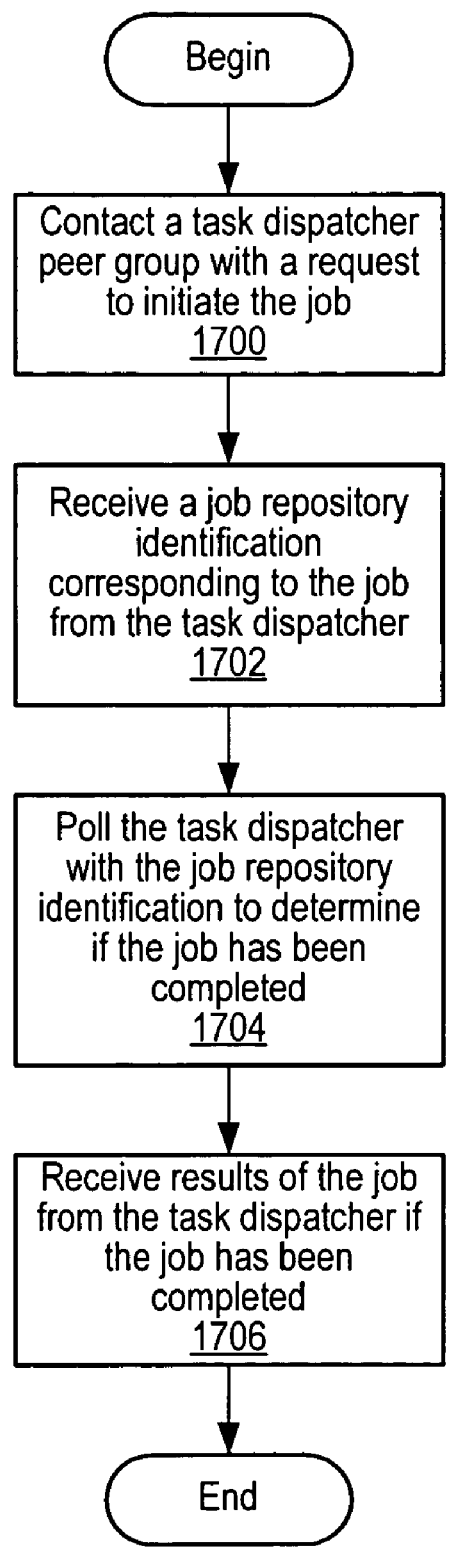
FIG. 23 is a flow diagram illustrating a method for submitting a job to a distributed computing environment according to one embodiment.

FIG. 23 is a flow diagram illustrating a method for submitting a job to a distributed computing environment according to one embodiment. At 1700, a task dispatcher peer group may be contacted with a request to initiate the job. A task dispatcher in the task dispatcher peer group may handle the request. This task dispatcher may be a task dispatcher manager that controls one or more task dispatchers in a task dispatcher peer group. At 1702, a job repository identification corresponding to the job may be received from the task dispatcher. At 1704, the task dispatcher may be polled with the job repository identification to determine if the job has been completed. At 1706, results of the job may be received from the task dispatcher if the job has been completed. The contacting, receiving a job repository identification, polling, and receiving results may be performed using a peer-to-peer protocol, for example a peer-to-peer protocol of the JXTA platform.

Figures 24, 25:
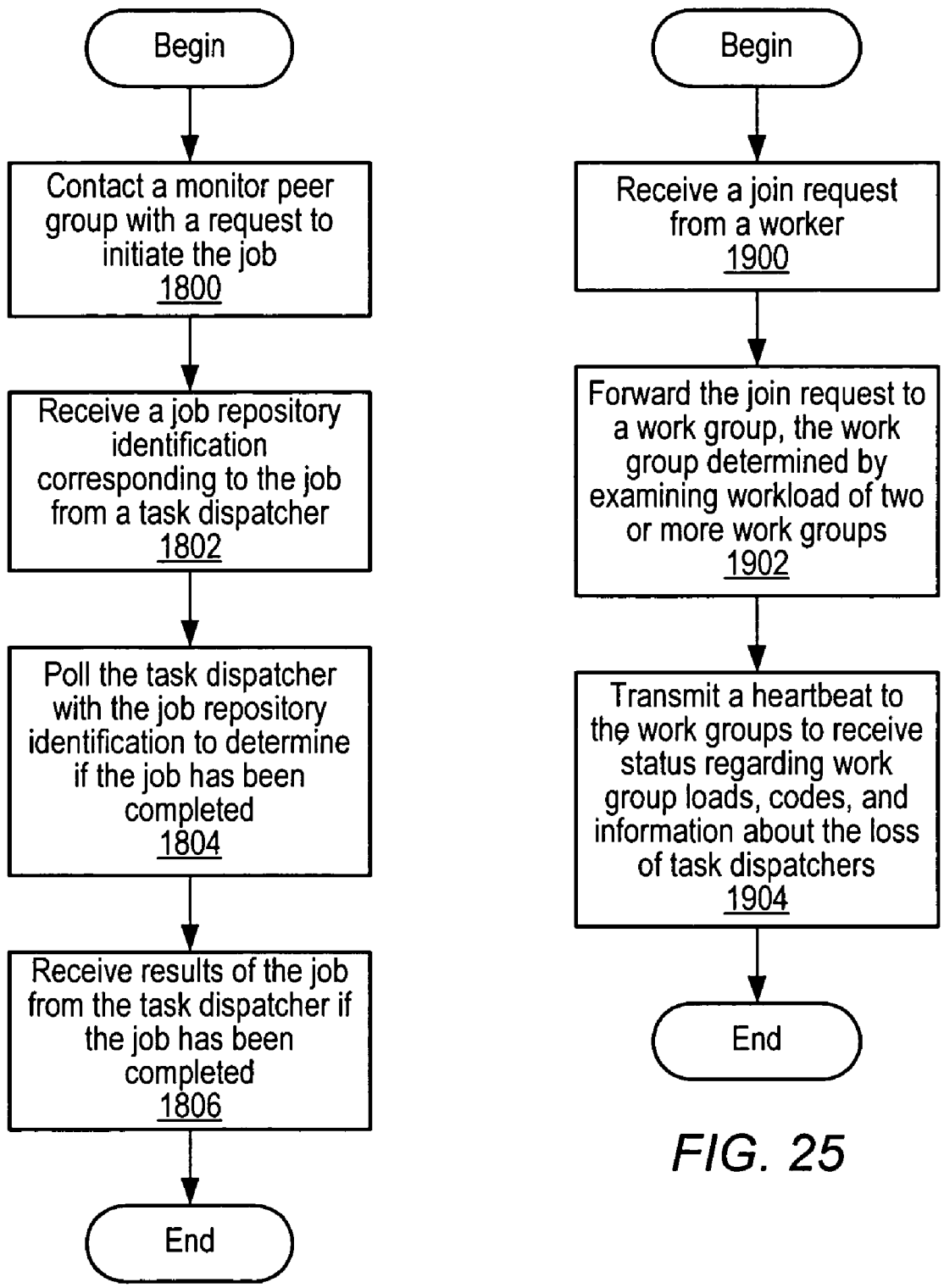
FIG. 24 is a flow diagram illustrating a method for submitting a job to a distributed computing environment according to one embodiment.
FIG. 25 is a flow diagram illustrating a method for adding a worker to a work group according to one embodiment.

FIG. 24 is a flow diagram illustrating a method for submitting a job to a distributed computing environment according to one embodiment. At 1800, a monitor peer group may be contacted with a request to initiate the job. The monitor may relay this request to a task dispatcher in its choice of workgroup. At 1802, a job repository identification corresponding to the job may be received from the task dispatcher. The task dispatcher may be a task dispatcher manager that controls one or more task dispatchers in a task dispatcher peer group. At 1804, the task dispatcher may be polled with the job repository identification to determine if the job has been completed. At 1806, results of the job may be received from the task dispatcher if the job has been completed. The contacting, receiving a job repository identification, polling, and receiving results may be performed using a peer-to-peer protocol, for example a peer-to-peer protocol of the JXTA platform.

FIG. 25 is a flow diagram illustrating a method for adding a worker to a work group according to one embodiment. At 1900, a join request may be received from a worker. At 1902, the join request may be forwarded to a work group; the work group may be determined, for example, by examining workload of two or more work groups. At 1904, a heartbeat is transmitted to the work groups to receive status regarding work group loads, codes, and information about the loss of task dispatchers.

Figure 26:
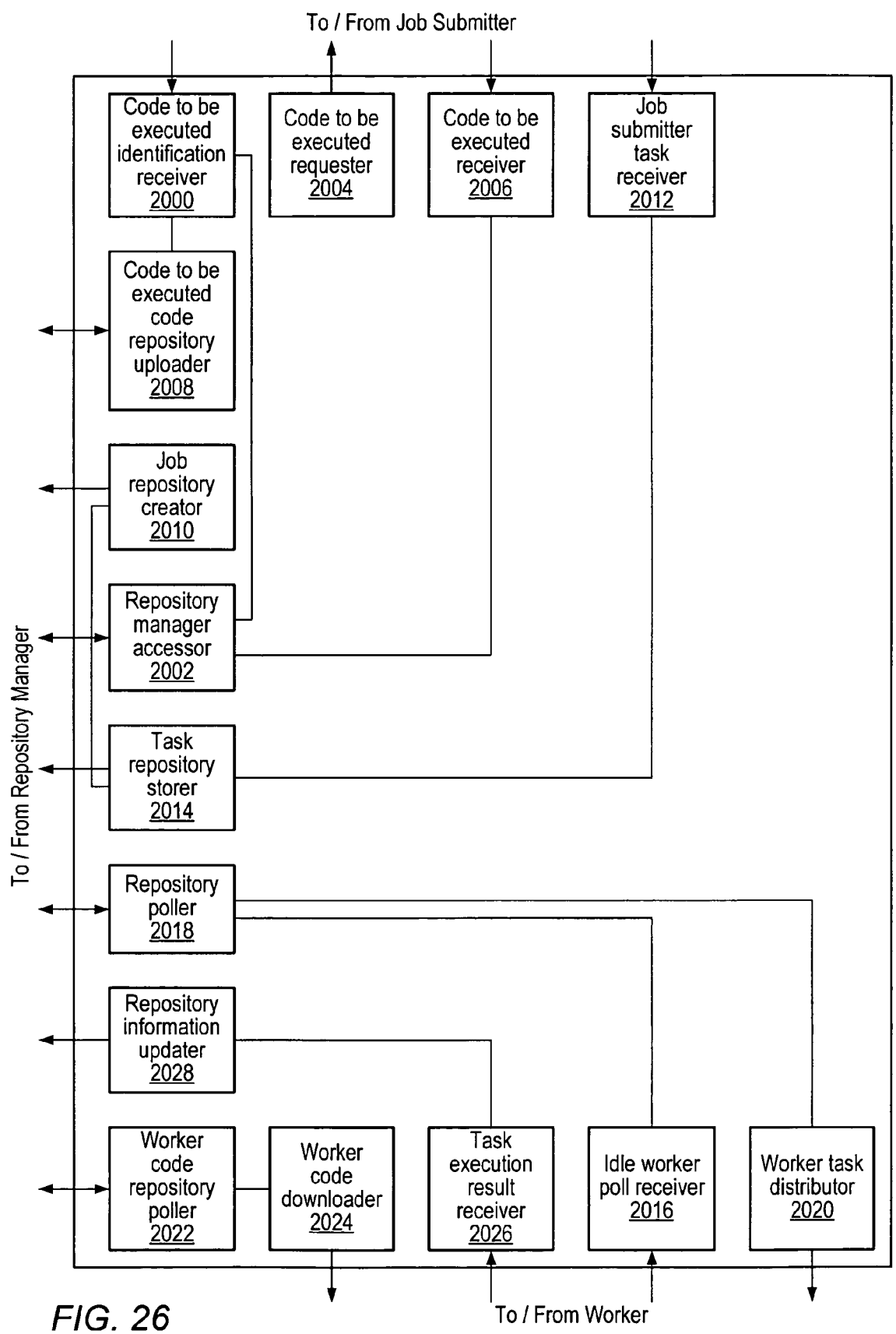
FIG. 26 is a block diagram illustrating an apparatus for coordinating a job submission in a distributed computing framework according to one embodiment.

FIG. 26 is a block diagram illustrating an apparatus for coordinating a job submission in a distributed computing framework according to one embodiment. A code to be executed identification receiver 2000 may receive an identification of a code to be executed from a job submitter. A repository manager assessor 2002 coupled to the code to be executed identification receiver 2000 may access a repository manager to determine whether the identification of the code to be executed already exists in a code repository. A code to be executed requester 2004 coupled to the repository manager assessor 2002 may request the code to be executed from the job submitter if the identification of the code to be executed does not already exist in the code repository. A code to be executed receiver 2006 may then receive the code to be executed from the job submitter if the identification of the code to be executed does not already exist in the code repository. A code to be executed code repository uploader 2008 coupled to the code to be executed identification receiver 2000 and to the code to be executed receiver 2006 may upload the code to be executed to the code repository if it does not already exist in the code repository. A job repository creator 2010 coupled to the code to be executed identification receiver 2000 may create a job repository corresponding to the job submission. In one embodiment, the job repository may be stored on multiple peers. In one embodiment, the job repository may be a part of a repository peer group. A job submitter task receiver 2012 may receive one or more tasks from a job submitter. A task repository storer 2014 coupled to the job submitter task receiver 2012 and to the job repository creator 2010 may store the one or more tasks in a task repository linked to the job repository. In one embodiment, the creating and storing may be performed by a repository manager. The receiving an identification, uploading, creating, receiving one or more tasks, and storing may be performed using a peer-to-peer protocol, for example a peer-to-peer protocol of the JXTA platform.

An idle worker poll receiver 2016 may receive a poll from an idle worker. In one embodiment, the poll may include information regarding resources available from the idle worker. This information may include information regarding codes cached by the worker. A repository poller 2018 coupled to the idle worker poll receiver 2016 may poll a repository for tasks to be performed on available codes. This may comprise contacting a repository manager. The repository manager may control one or more repositories in a repository peer group. A worker task distributor 2020 coupled to the repository poller 2018 may distribute one or more of the tasks to the worker, the one or more tasks chosen based on the information. A worker code repository poller 2022 may poll a repository for code to be downloaded to the worker. A worker code downloader 2024 coupled to the worker code repository poller 2012 may download the code to the worker. A task execution result receiver 2026 may receive a result of a task execution from the worker. A repository information updater 2028 coupled to the task execution result receiver 2026 may update the repository with information about task completion. The receiving a poll, polling a repository, distributing, receiving a result, and updating may be performed using a peer-to-peer protocol, for example a peer-to-peer protocol of the JXTA platform.

Figure 27:
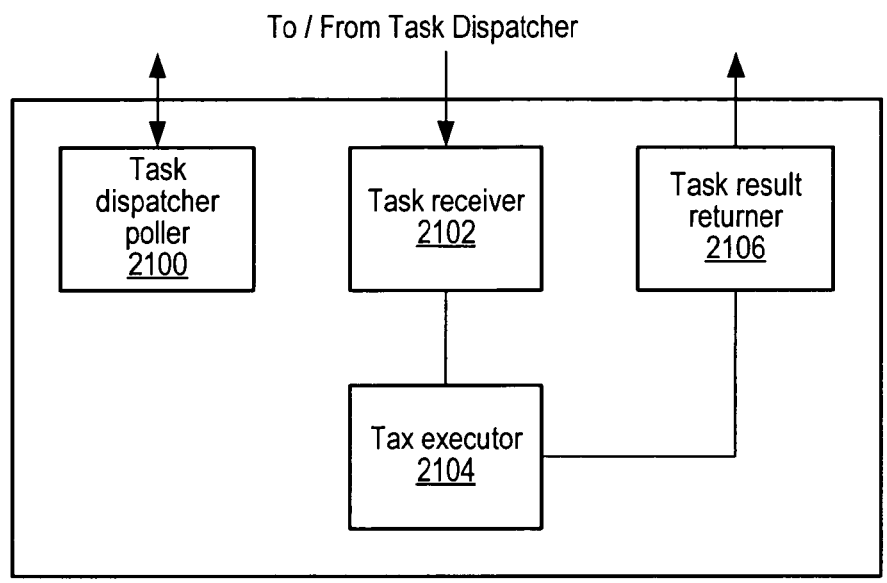
FIG. 27 is a block diagram illustrating an apparatus for coordinating execution of a task by an idle worker in a distributed computing framework according to one embodiment.

FIG. 27 is a block diagram illustrating an apparatus for coordinating execution of a task by an idle worker in a distributed computing framework according to one embodiment. A task dispatcher poller 2100 may poll a task dispatcher to inform the task dispatcher that the worker is idle and provide information regarding resources available from the worker. This information may include information regarding codes cached by the worker. A task receiver 2102 may receive the one or more tasks from the task dispatcher. The task dispatcher may be a task dispatcher manager. This may be a task dispatcher that controls one or more task dispatchers in a peer group. A task executor 2104 coupled to the task receiver 2102 may execute the one or more tasks. An execution result returner 2106 coupled to the task executor 2104 may return the results of the execution to the task dispatcher. The polling, receiving, and returning may be performed using a peer-to-peer protocol, for example a peer-to-peer protocol of the JXTA platform.

Figure 28:
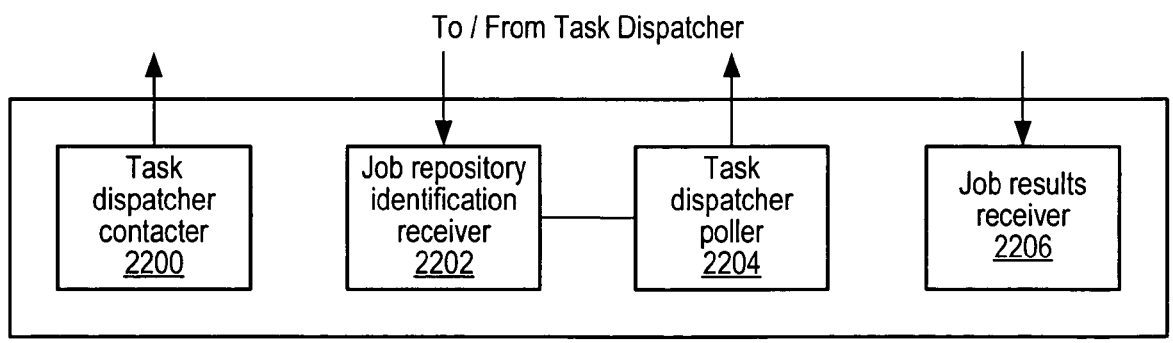
FIG. 28 is a block diagram illustrating an apparatus for submitting a job to a distributed computing environment according to one embodiment.

FIG. 28 is a block diagram illustrating an apparatus for submitting a job to a distributed computing environment according to one embodiment. A task dispatcher contactor 2200 may contact a task dispatcher with a request to initiate the job. The task dispatcher may be a task dispatcher manager that controls one or more task dispatchers in a task dispatcher peer group. A job repository identification receiver 2202 may receive a job repository identification corresponding to the job from the task dispatcher. A task dispatcher poller 2204 coupled to the job repository identification receiver 2202 may poll the task dispatcher with the job repository identification to determine if the job has been completed. A job results receiver 2206 may receive results of the job from the task dispatcher if the job has been completed. The contacting, receiving a job repository identification, polling, and receiving results may be performed using a peer-to-peer protocol, for example a peer-to-peer protocol of the JXTA platform.

Figure 29:
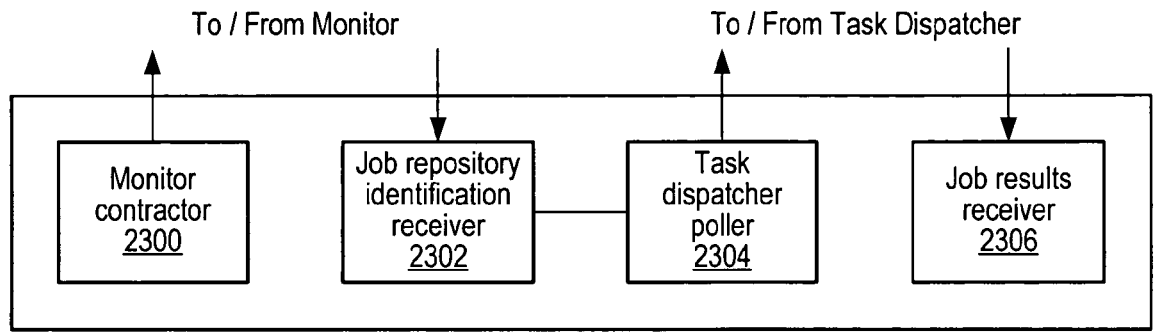
FIG. 29 is a block diagram illustrating an apparatus for submitting a job to a distributed computing environment according to one embodiment.

FIG. 29 is a block diagram illustrating an apparatus for submitting a job to a distributed computing environment according to one embodiment. A monitor contactor 2300 may contact a monitor with a request to initiate the job. A job repository identification receiver 2302 may receive a job repository identification corresponding to the job from the monitor as well as task dispatcher information. The task dispatcher may be a task dispatcher manager that controls one or more task dispatchers in a task dispatcher peer group. A task dispatcher poller 2304 coupled to the job repository identification receiver 2302 may poll the task dispatcher with the job repository identification to determine if the job has been completed. A job results receiver 2306 may receive results of the job from the task dispatcher if the job has been completed. The contacting, receiving a job repository identification, polling, and receiving results may be performed using a peer-to-peer protocol, for example a peer-to-peer protocol of the JXTA platform.

Figure 30:
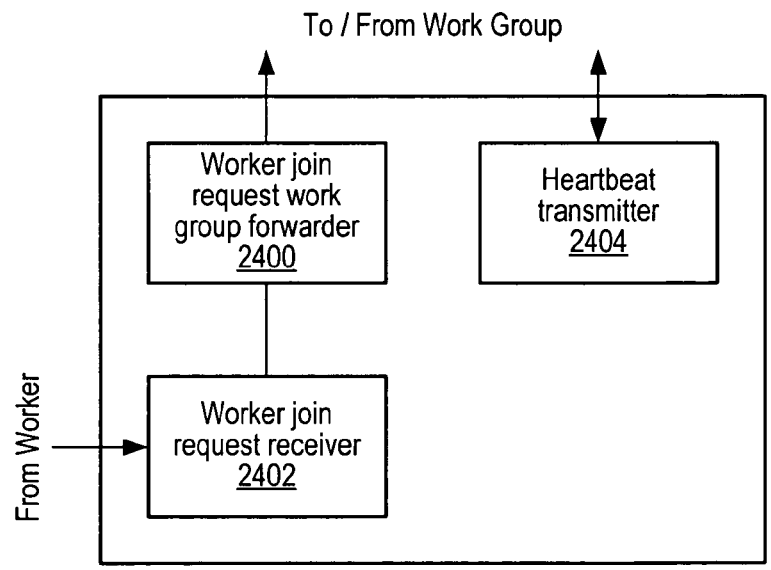
FIG. 30 is a block diagram illustrating an apparatus for adding a worker to a work group according to one embodiment.

FIG. 30 is a block diagram illustrating an apparatus for adding a worker to a work group according to one embodiment. A worker join request receiver 2400 may receive a join request from a worker. A worker join request work group forwarder 2402 coupled to the worker join request receiver 2400 may forward the join request to a work group. In one embodiment, the work group may be determined by examining workload of two or more work groups. A heartbeat transmitter 2404 may transmit a heartbeat to the work groups to receive status regarding work group loads, codes, and information about the loss of task dispatchers.

Distributed Computing Mechanism

Embodiments of a system and method for submitting and performing computational tasks in a distributed heterogeneous networked environment (which, for simplicity, may be referred to as the distributed computing mechanism) are described. Embodiments may allow tasks to be submitted by users and run in parallel on a network of heterogeneous computers implementing a variety of operating environments (e.g. UNIX-based environments, PC-based systems, cell phones, etc.). One embodiment enables users (e.g. software developers) to submit tasks to a cluster or group of peer nodes participating in a peer-to-peer environment on a network. In one embodiment, tasks may preferably be submitted to the cluster or group for execution from any peer node (or, in one embodiment, any other node) connected to the network. Embodiments of the system and method for the dynamic configuration of replicated database servers in networks described above may be used in embodiments of the exemplary distributed computing mechanism to dynamically configure and synchronize replicated databases.

A peer node may manifest in the form of a processor, a process or a device. A peer node may be anything with a digital heartbeat including sensors, servers, PCs, computers up to and including supercomputers, PDAs, manufacturing and medical equipment, phones and cellular phones. A peer node may also be referred to as a "peer." In order to interact with other peer nodes (e.g. to form or join peer groups), the peer node needs to be connected to some kind of network (wired or wireless), such as IP, Bluetooth, or Havi, among others. In one embodiment, the peer nodes may participate in a peer-to-peer environment implemented in accordance with a peer-to-peer platform. One example of such a peer-to-peer platform is the JXTA platform. In one embodiment, the peer nodes may participate in a distributed computing framework such as the exemplary distributed computing framework described above to implement the system and method for submitting and performing computational tasks in a distributed heterogeneous networked environment. It is important to note that the distributed computing framework described above is exemplary and that other distributed computing frameworks may also be used.

In one embodiment, a user on an originating node (the node may be a peer node or other node on the network) may identify code that may be run in parallel. In one embodiment, the code may be advertised on the network, for example using a broadcast advertisement. In one embodiment, advertisements such as those of the JXTA platform may be used to advertise code on the network. Other embodiments may use other methods to advertise code on the network. Peer nodes that receive the advertisement and that are willing to participate may request the code. The code may be sent to the one or more (local or remote) peer nodes that respond positively to the advertisement. In one embodiment, once the code is received by a peer node, the code may be stored locally. In one embodiment, the peer nodes that receive the code may participate in a peer group, such as a peer group of the JXTA platform. In one embodiment, the peer nodes that receive the code may participate in one or more peer groups such as the peer groups described for the exemplary distributed computing framework described above.

The user may split work to be executed by the code distributed to the peer nodes into separate tasks. These tasks may be advertised on the network, for example using a broadcast advertisement. In one embodiment, advertisements such as those of the JXTA platform may be used to advertise tasks on the network. Other embodiments may use other methods to advertise tasks on the network. Tasks may be sent to peer nodes that request them. Typically, these peers will be the same as the ones responding to the code advertisements, but other peer nodes than those that requested and received the code may respond and request tasks. This may happen, for example, if a peer node that requested the code is disconnected from the network. It may also happen if new peer nodes join the network and requests the code previously advertised to join the group of peer nodes that have previously received the code.

In one embodiment, communication between peer nodes may be implemented according to a peer-to-peer protocol that enables the establishment of communications channels between two peers or among a plurality of peers. In one embodiment, one or more of the peer-to-peer platform protocols of the JXTA platform may be used for communication between peer nodes. Other embodiments may use other peer-to-peer protocols for communication between peer nodes, including peer-to-peer protocols of other peer-to-peer platforms than the JXTA platform. In one embodiment, some information (e.g. the code and/or tasks) may be transferred via a network communications protocol such as HTTP. It is important to note that other protocols may be used for communications between peers and/or for information transfer than those protocols described herein.

The peer nodes may then work on the tasks that they requested. Once a peer node's work on a task is completed, the peer node may send the results of the task back to the originating node. The peer node may then request additional tasks. In one embodiment, if a peer node is interrupted during execution, the task may be readvertised, and other peer nodes may request the task. When tasks are completed, the user on the originating node may retrieve and process the results of the tasks.

Embodiments may use one or more protocols for establishment of connections between peer nodes (e.g. the JXTA platform protocols) and information transfer (e.g. network communication protocols such as HTTP) that are available on a variety of operating environments. Using these protocols, embodiments may not be intrinsically limited to submitting tasks to a limited subset of peer nodes. In one embodiment, the code may be written in a bytecode-level language recognized by all or a subset of the peer nodes in the network (e.g. the Java programming language). In this embodiment, peer nodes with virtual machines able to interpret this bytecode-level language may participate in the computations. In one embodiment, the format used in the code may not be known by at least some peer nodes in the network. In this case, only a subset of the peer nodes that desire to work may request the code and work on tasks related to it. The advertisement may reach all of the peer nodes, and peer nodes may request the code if they are supporting the code format and desire to work with the code.

One embodiment may transfer code over the network via an information transfer protocol (e.g. HTTP). The bytecode or binaries required for code execution may be loaded by the job submitter and sent over the network to other peer nodes using the information transfer protocol. A receiving (local or remote) peer node may save the bytecode/binaries locally and load them dynamically to run tasks that may be subsequently requested. In one embodiment, the entire code is transferred from the job submitter to the peer node, and the peer node may not need to load anything more from the job submitter.

One embodiment may use a protocol that provides a mechanism for a peer node behind a firewall to cross the firewall to access data outside the firewall. One embodiment may use a protocol that provides a mechanism for a peer node behind a firewall to cross the firewall to access data outside the firewall using relay peers, such as embodiments of the mechanism and relay peers provided by the JXTA platform. The relay peers may be used, for example, to contact peer nodes outside the firewall domain.

Figure 31A:
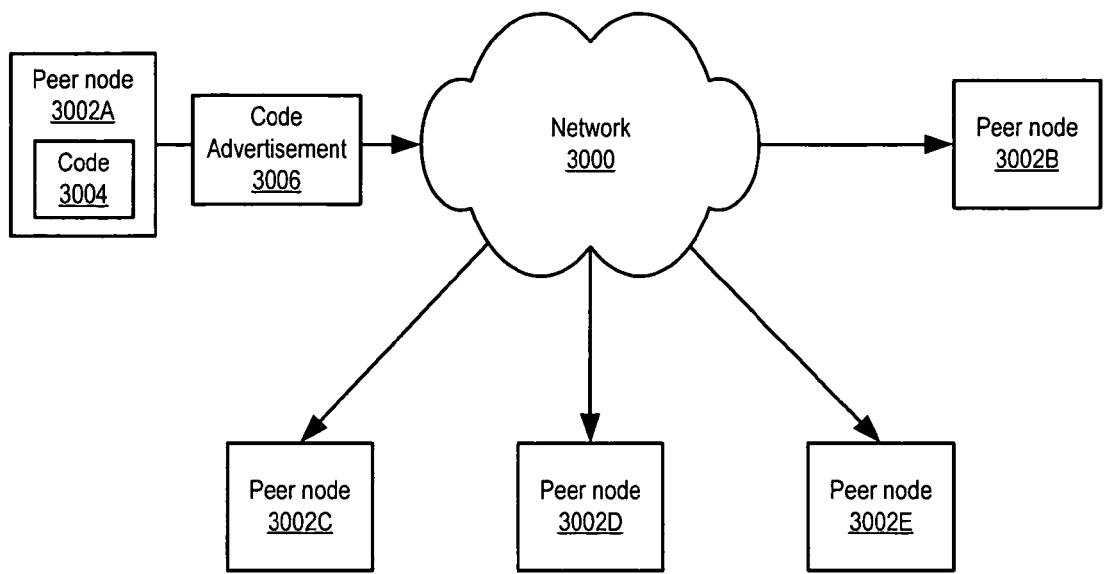
FIGS. 31A-31E illustrate submitting and performing computational tasks in a distributed heterogeneous networked environment according to one embodiment.

FIGS. 31A-31E illustrate submitting and performing computational tasks in a distributed heterogeneous networked environment according to one embodiment. In one embodiment, the mechanism illustrated in FIGS. 31A-31E may be implemented and performed according to the exemplary distributed computing framework described above. In FIG. 31A, peer node 3002A may have generated computer-executable code 3004. The code may be configured to run a plurality of tasks in parallel on two or more peer nodes 3002 on the network 3000 to perform a job. In one embodiment, the code 3004 may be programmed in a bytecode language. In one embodiment, the bytecode language may be the Java programming language.

In one embodiment, peer node 3002A may broadcast an advertisement for the code 3004 on the network 3000. Other embodiments may use other mechanisms to advertise the code 3004 on the network. In one embodiment, the code 3004 may be advertised using one or more advertisement mechanisms such as those of the JXTA platform, and advertising the code may be performed using one or more peer-to-peer platform (e.g. JXTA) protocols. In one embodiment, the code may be advertised according to the exemplary distributed computing framework described above. It is important to note that code, may be generated on and advertised from any peer node 3002 (or, in one embodiment, any node) coupled to network 3000. In other words, peer node 3002A may represent any node coupled to network 3000.

Any or all peer nodes 3002 coupled to network 3000 may receive the code advertisement 3006. In this example, peer nodes 3002B-3002E may receive code advertisement 3006. In one embodiment, the code advertisement 3006 may be received using one or more advertisement mechanisms such as those of the JXTA platform. In one embodiment, one or more of peer nodes 3002B-3002E may be on opposite sides of a firewall or firewalls from peer node 3002A.

One or more of the peer nodes 3002 that receive the code advertisement 3006 may respond to the code advertisement 3006, if desired. In one embodiment, peer nodes 3002 that are configured to execute the computer language in which the code 3004 is implemented may respond to the code advertisement 3006. In one embodiment, responding peer nodes 3002 may implement containers (e.g. Java Virtual Machines (JVMs)) in which the code 3004 may be executed. In one embodiment, peer nodes 3002 may respond to the code advertisement 3006 by sending a response message requesting the code 3004 to peer node 3002A. In one embodiment, peer nodes 3002 may respond to the code advertisement 3006 using one or more peer-to-peer platform protocols, such as the peer-to-peer platform protocols of the JXTA platform. In one embodiment, code advertisement 3006 may include information configured for use in responding to the code advertisement 3006. In this example, peer nodes 3002C-3002E may respond to the code advertisement 3006, and peer node 3002B may not respond to the code advertisement.

Figure 31B:
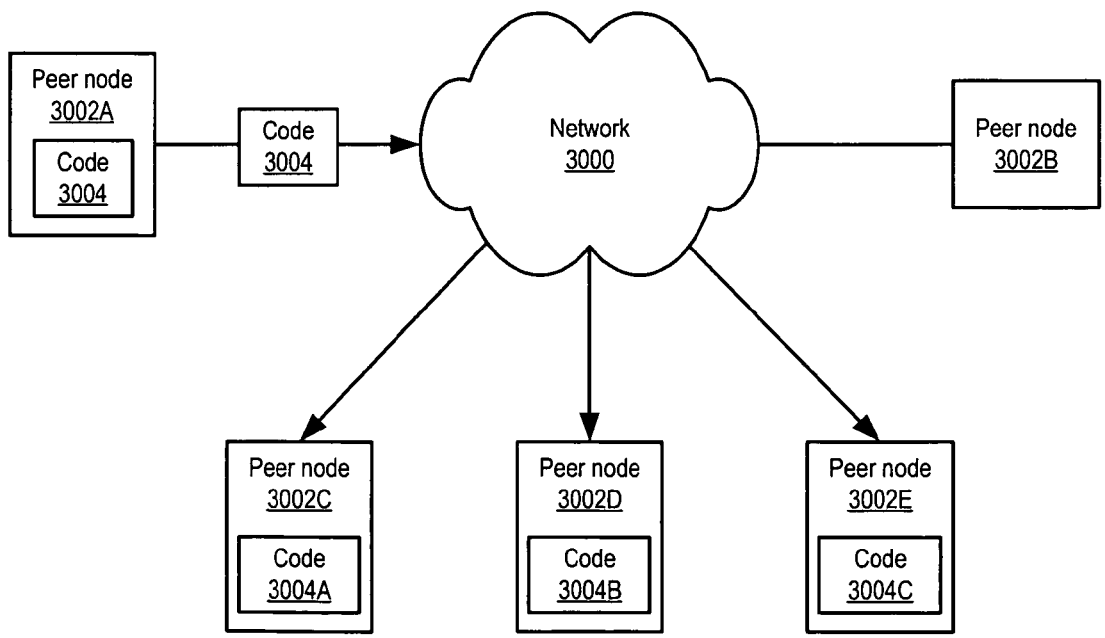

In FIG. 31B, peer node 3002A may provide code 3004 to one or more peer nodes 3004 that respond to the code advertisement 3006. In this example, peer node 3002A may provide code 3004 to peer nodes 3002C-3002E. In one embodiment, to provide code 3004 to a peer node 3002, peer node 3002A may transmit the code 3004 to the peer node 3002 according to a network information transfer protocol. In one embodiment, the network information transfer protocol may be HTTP. Other embodiments may use other network information transfer protocols to transmit code 3004. After peer node 3002A provides code 3004 to peer nodes 3002C-3002E, each of the peer nodes 3002 that received the code 3004 may include a copy of code 3004. In one embodiment, a peer node 3002 that receives the code 3004 may store the code 3004 to a local storage, e.g. a disk device or other non-volatile storage. In this example, peer node 3002C includes copy of code 3004A, peer node 3002D includes copy of code 3004B, and peer node 3002E includes copy of code 3004C.

Figure 31C:
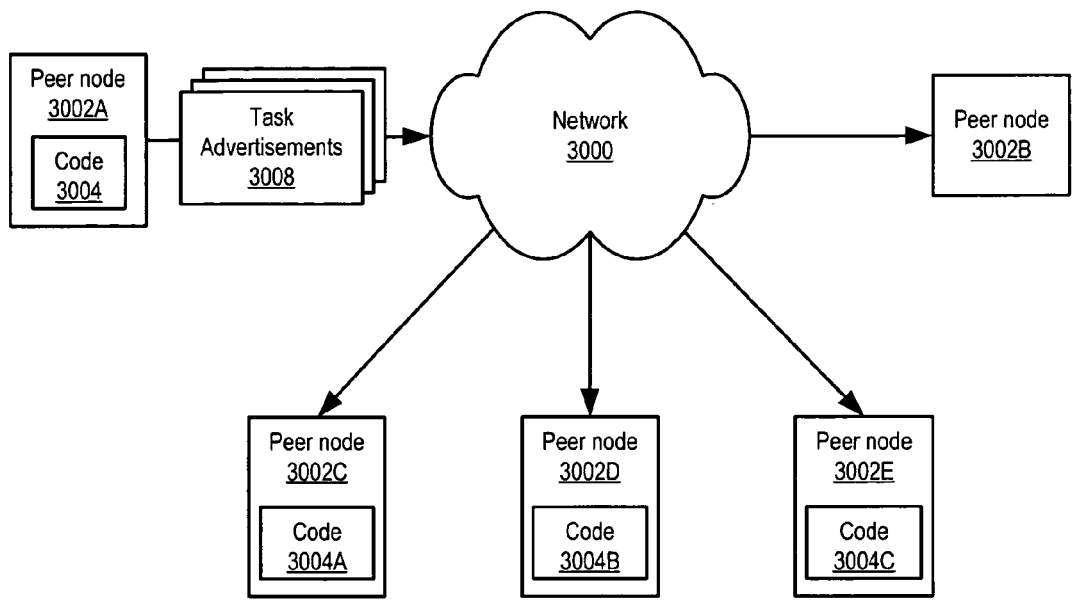

In FIG. 31C, peer node 3002A may partition a job to be performed by code 3004 into a plurality of tasks. In one embodiment, peer node 3002A may broadcast one or more advertisements for the tasks 3008 on the network 3000. In one embodiment, there may be one task advertisement 3008 for each task. Other embodiments may use other mechanisms to advertise the tasks on the network. In one embodiment, the tasks may be advertised using one or more advertisement mechanisms such as those of the JXTA platform, and advertising the tasks may be performed using one or more peer-to-peer platform (e.g. JXTA) protocols. In one embodiment, the tasks may be advertised according to the exemplary distributed computing framework described above.

One or more of the peer nodes 3002 that receive the task advertisement(s) 3008 may respond to the task advertisement(s) 3008, if desired. In one embodiment, peer nodes 3002 may respond to the task advertisement(s) 3008 by sending a response message requesting a task to peer node 3002A. In one embodiment, peer nodes 3002 may respond to the task advertisement(s) 3008 using one or more peer-to-peer platform protocols, such as the peer-to-peer platform protocols of the JXTA platform. In one embodiment, task advertisement(s) 3008 may include information configured for use in responding to the task advertisement(s) 3008. In this example, peer nodes 3002C-3002E may respond to the task advertisement(s) 3008, and peer node 3002B may not respond to the task advertisement(s). Note that, in one embodiment, peer node 3002B or other peer nodes 3002 on the network 3000 may respond to the task advertisement(s) 3008 even if the peer node did not respond to the code advertisement 3006 and/or did not receive code 3004 from peer node 3002A. In one embodiment, if a peer node 3002 (e.g. peer node 3002B) that has not received code 3004 responds to the task advertisement(s) 3008, peer node 3002A may choose to provide code 3004 to the peer node 3002 so that the peer node 3002 may execute one or more tasks as assigned.

Figure 31D:
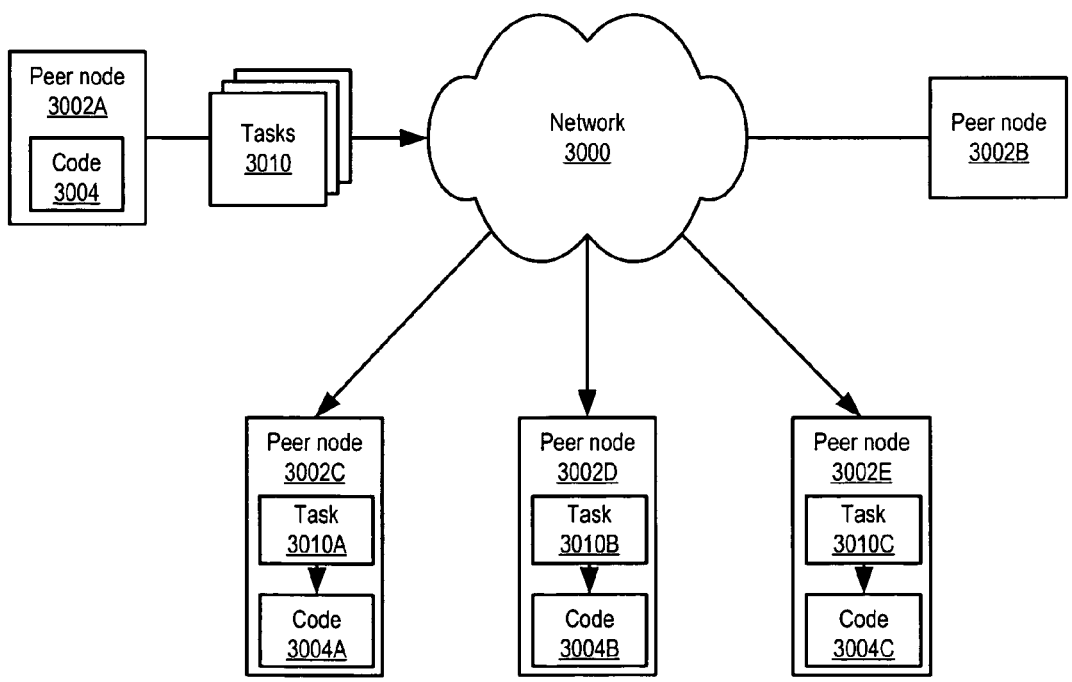

In FIG. 31D, peer node 3002A may assign a different task 3010 to one or more of the peer nodes 3002 that respond to task advertisement 3008. In one embodiment, assigning a task 3010 to a particular peer node 3002 may include sending a message to the peer node indicating the particular task 3010 to be performed by the peer node 3002. In one embodiment, the message may include one or more parameters indicating the particular task 3010 to be performed by the peer node 3002. Each peer node 3002 receiving a task assignment may receive different values for the parameters to indicate the particular task 3010 to be performed by the peer node 3010. In this example, peer node 3002C is assigned task 3010A, peer node 3002D is assigned task 3010B, and peer node 3002E is assigned task 3010C. In one embodiment, the tasks may be assigned according to the exemplary distributed computing framework described above. In one embodiment, task assignments may be transmitted to peer nodes 3002 according to a network information transfer protocol. In one embodiment, the network information transfer protocol may be HTTP.

Peer nodes 3002 assigned tasks 3010 may then execute the assigned tasks 3010 according to code 3004. In one embodiment, a peer node 3002 may dynamically load a portion or all of stored code 3004 into execution memory (e.g. RAM) to perform its assigned task 3010. In this example, peer node 3002C may execute task 3010A, peer node 3002D may execute task 3010B, and peer node 3002E may execute task 3010C. Note that peer nodes 3002 may execute the tasks 3010 in parallel. Each task may be executed according to code 3004 to perform a particular portion of the job that peer node 3002A desires to execute using the distributed computing mechanism described herein. In one embodiment, the tasks may be executed according to the exemplary distributed computing framework described above.

Figure 31E:
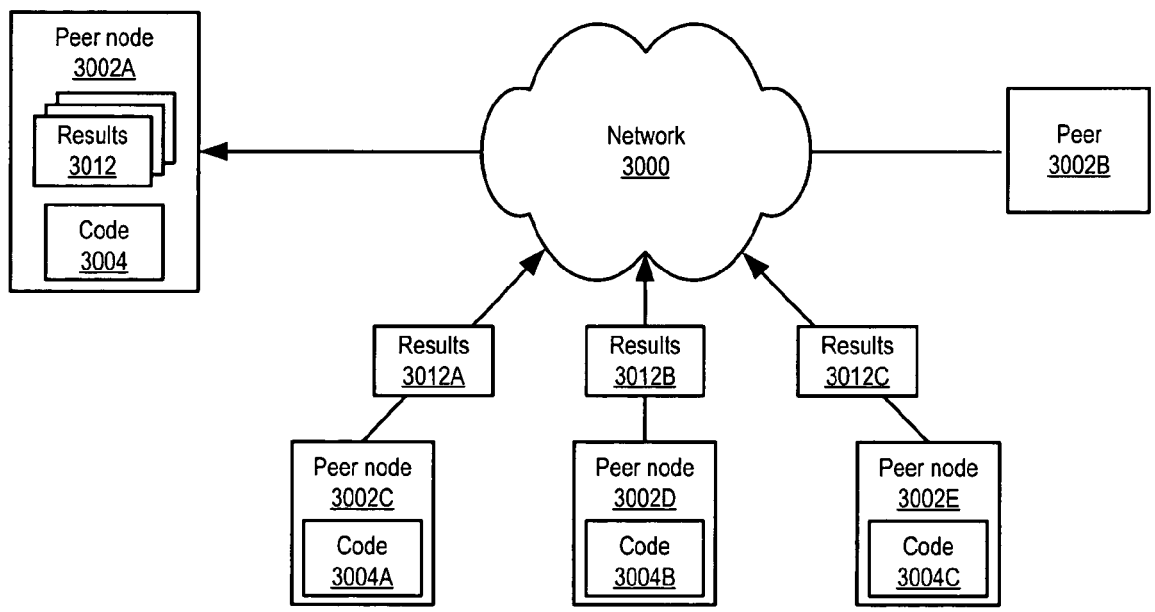

In FIG. 31E, as each peer node 3002 completes its assigned task 3010, the peer node 3002 may return results of the task 3010 to peer node 3002A. In this example, peer node 3002C may return results 3012A of task 3010A to peer node 3002A when task 3010A completes, peer node 3002D may return results 3012B of task 3010B to peer node 3002A when task 3010B completes, and peer node 3002E may return results 3012C of task 3010C to peer node 3002A when task 3010C completes. In one embodiment, results may be transmitted to peer node 3002A according to a network information transfer protocol. In one embodiment, the network information transfer protocol may be HTTP. In one embodiment, the results may be returned to peer node 3002A according to the exemplary distributed computing framework described above.

If there are more tasks to be performed, a peer node 3002 that completes a task 3010 may receive another task assignment from peer node 3002A. In one embodiment, a peer node 3002 that completes a task 3010 may send a message to peer node 3002 requesting another task assignment, if any are available. Peer nodes 3002 may continue receiving task assignments and executing tasks 3010 until all tasks 3010 for the job are completed. Peer node 3002A may store results 3012 of completed tasks 3010 until all tasks 3010 of the job are completed. Peer node 3002A may then post-process results 3012 of the completed job, if desired. Note that peer node 3002A or any other peer node 3002 may advertise other codes 3004 to perform other jobs on the network before, during or after the running of a job. In other words, more than one job may be in various stages of performance, as illustrated in FIGS. 31A-31E, at any one time. In one embodiment, a peer node 3002 may include more than one code 3004 configured to execute tasks for different jobs, and may request and be assigned more than one task 3010 from one job, or even tasks 3010 from more than one job, at a time.

Figure 32:
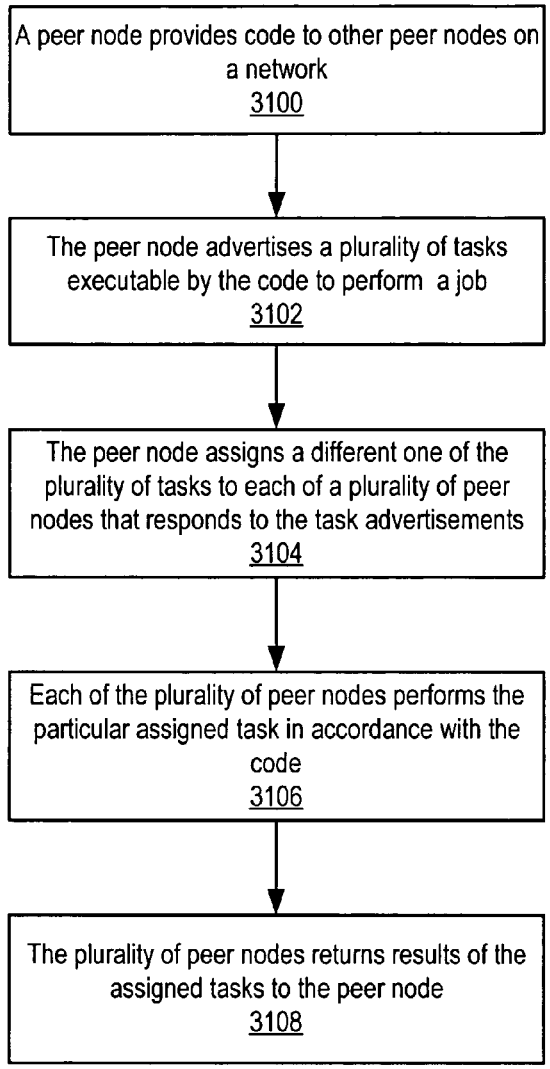
FIG. 32 is a flowchart illustrating a method of submitting and performing computational tasks in a distributed heterogeneous networked environment according to one embodiment.

FIG. 32 is a flowchart illustrating a method of submitting and performing computational tasks in a distributed heterogeneous networked environment according to one embodiment. The method illustrated in FIG. 32 illustrates means for the distributed computing mechanism to advertise a plurality of tasks on the network, to assign a different one of the plurality of tasks to each of a group of peer nodes that responds to the task advertisement(s), and means for executing the plurality of tasks in parallel on the group of peer nodes to perform a job. In one embodiment, the method illustrated in FIG. 32 may be implemented and, performed according to the exemplary distributed computing framework described above. A peer node on a network may have generated computer-executable code configured to run a plurality of tasks in parallel on two or more peer nodes on the network to perform a job. In one embodiment, the code may be programmed in a bytecode language. In one embodiment, the bytecode language may be the Java programming language. As indicated at 3100, a peer node may provide the code to two or more other peer nodes on the network.

The peer node may partition a job to be performed by the provided code into a plurality of tasks. As indicated at 3012, the peer node may advertise the plurality of tasks executable by the code to perform the job. In one embodiment, the peer node may broadcast one or more advertisements for the tasks on the network. In one embodiment, there may be one task advertisement for each task. Other embodiments may use other mechanisms to advertise the tasks on the network. In one embodiment, the tasks may be advertised using one or more advertisement mechanisms such as those of the JXTA platform, and advertising the tasks may be performed using one or more peer-to-peer platform (e.g. JXTA) protocols. In one embodiment, the tasks may be advertised according to the exemplary distributed computing framework described above.

One or more of the peer nodes that receive the task advertisement(s) may respond to the task advertisement(s), if desired. In one embodiment, peer nodes may respond to the task advertisement(s) by sending a response message requesting a task to the peer node. In one embodiment, peer nodes may respond to the task advertisement(s) using one or more peer-to-peer platform protocols, such as the peer-to-peer platform protocols of the JXTA platform. In one embodiment, task advertisement(s) may include information configured for use in responding to the task advertisement(s). Note that, in one embodiment, peer nodes on the network may respond to the task advertisement(s) even if the peer node did not respond to the code advertisement and/or did not receive the code from the peer node. In one embodiment, if a peer node that has not received the code responds to the task advertisement(s), the originating peer node may choose to provide code to the responding peer node so that the peer node may execute one or more tasks as assigned.

As indicated at 3104, the peer node may assign a different one of the plurality of tasks to each of a plurality of peer nodes that responds to the task advertisement(s). In one embodiment, assigning a task to a particular peer node may include sending a message to the peer node indicating the particular task to be performed by the peer node. In one embodiment, the message may include one or more parameters indicating the particular task to be performed by the peer node. Each peer node receiving a task assignment may receive different values for the parameters to indicate the particular task to be performed by the peer node. In one embodiment, the tasks may be assigned according to the exemplary distributed computing framework described above. In one embodiment, task assignments may be transmitted to peer nodes according to a network information transfer protocol. In one embodiment, the network information transfer protocol may be HTTP.

Each of the peer nodes that received a task assignment may then perform the particular assigned task in accordance with the code received from the originating peer node as indicated at 3106. Each task may be executed according to code to perform a particular portion of the job that the originating peer node desires to execute using the distributed computing mechanism described herein. In one embodiment, the tasks may be executed according to the exemplary distributed computing framework described above.

As indicated at 3108, the plurality of peer nodes assigned tasks may return results of the assigned tasks to the originating peer node. As each peer node completes its assigned task, the peer node may return results of the task to the originating peer node. In one embodiment, results may be transmitted according to a network information transfer protocol. In one embodiment, the network information transfer protocol may be HTTP. In one embodiment, the results may be returned to the originating peer node according to the exemplary distributed computing framework described above.

If there are more tasks to be performed, a peer node that completes a task may receive another task assignment from the originating peer node. In one embodiment, a peer node that completes a task may send a message to peer node requesting another task assignment, if any are available. Peer nodes may continue receiving task assignments and executing tasks until all tasks for the job are completed. The originating peer node may store results of completed tasks until all tasks of the job are completed. The peer node may then post-process results of the completed job, if desired.

Figure 33:
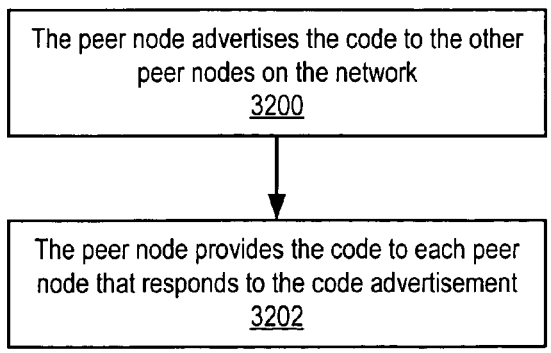
FIG. 33 is a flowchart illustrating a method of providing code to a plurality of peer nodes on a network according to one embodiment.

FIG. 33 is a flowchart illustrating a method of providing code to a plurality of peer nodes on a network according to one embodiment. The method illustrated in FIG. 33 illustrates means for the distributed computing mechanism to provide computer-executable code to a plurality of peer nodes on a network. In one embodiment, the method illustrated in FIG. 33 may be implemented and performed according to the exemplary distributed computing framework described above. A peer node on a network may have generated computer-executable code configured to run a plurality of tasks in parallel on two or more peer nodes on the network to perform a job. In one embodiment, the code may be programmed in a bytecode language. In one embodiment, the bytecode language may be the Java programming language. As indicated at 3200, the peer node may advertise the code to other peer nodes on the network.

In one embodiment, the peer node may broadcast an advertisement for the code on the network. Other embodiments may use other mechanisms to advertise the code on the network. In one embodiment, the code may be advertised using one or more advertisement mechanisms such as those of the JXTA platform, and advertising the code may be performed using one or more peer-to-peer platform (e.g. JXTA) protocols. In one embodiment, the code may be advertised according to the exemplary distributed computing framework described above. It is important to note that code may be generated on and advertised from any peer node (or, in one embodiment, any node) coupled to the network.

Any or all peer nodes coupled to the network may receive the code advertisement. In one embodiment, the code advertisement may be received using one or more advertisement mechanisms such as those of the JXTA platform. In one embodiment, one or more peer nodes that receive the code advertisement may be on opposite sides of a firewall or firewalls from the originating peer node.

One or more of the peer nodes that receive the code advertisement may respond to the code advertisement, if desired. In one embodiment, peer nodes that are configured to execute the computer language in which the code is implemented may respond to the code advertisement. In one embodiment, responding peer nodes may implement containers (e.g. JVMs) in which the code may be executed. In one embodiment, peer nodes may respond to the code advertisement by sending a response message requesting the code to the originating peer node. In one embodiment, peer nodes may respond to the code advertisement using one or more peer-to-peer platform protocols, such as the peer-to-peer platform protocols of the JXTA platform. In one embodiment, the code advertisement may include information configured for use in responding to the code advertisement.

As indicated at 3002, the originating peer node may provide the code to each peer node that responds to the code advertisement. In one embodiment, to provide the code to a peer node, the originating peer node may transmit the code to the peer node according to a network information transfer protocol. In one embodiment, the network information transfer protocol may be HTTP. Other embodiments may use other network information transfer protocols to transmit the code. After the peer node provides the to the other peer nodes, each of the peer nodes that received the code may include a copy of the code. In one embodiment, a peer node that receives the code may store the code to a local storage, e.g. a disk device or other non-volatile storage.

The following is an example of using an embodiment of the distributed computing mechanism and is included for illustrative purposes and is not intended to be limiting. In one embodiment, this example may be implemented on peer nodes implementing the distributed computing mechanism according to a distributed computing framework such as the exemplary distributed computing framework described above. This example uses the Java programming language, but it is noted that other embodiments may use other programming languages. In this example, the class implementing the distributed computing mechanism is called RemoteThread. This example illustrates that the distributed computing mechanism described herein may be used to parallelize execution of tasks in performing work in a distributed heterogeneous networked environment.

This example uses an embodiment of the distributed computing mechanism to compute the sum of all integers between 1 and 1000. The calculation may be split into several tasks. For example, to divide the work into ten tasks, the first task may be the addition of all the integers between 1 and 100, the second task may be the addition of all the integers between 101 and 200, etc.

In one embodiment, there may be separate codes for execution kernel and job submission parts. To use the distributed computing mechanism to do this exemplary calculation on several peer nodes, the core of the calculation is implemented in a code, e.g., AddNumbers.java:

---

```
Import java.io.Serializable;
public class AddNumbers implements Runnable, Serializable
{
   private int result;       // This variable will contain the sum of
                             // all the numbers between first and last
   private int first;
   private int last;
   public AddNumbers(int first, int last)
   {
      result = 0;
      this.first = first;
      this.last = last;
   };
   public void run( )
```

```
    {
        // loop calculating the sum
        for (int i=first; i <=last; i++)
            result += i;
    };
    // This method returns the result after execution of the run( ) method
    public int getResult( )
    {
        return result;
    };
};
```

This class implements Runnable to enable passing to a RemoteThread, and Serializable for the class instances to be sent using IO streams over HTTP. The AddNumbers constructor may be used to initialize the data. AddNumbers takes arguments that may include information for the code to execute (in this case, the first and last integers of the particular task). AddNumbers class instances differentiate from other instances of AddNumbers through the way they are constructed. The run( ) method is the core of the calculation. Since the run( ) method may be invoked remotely on a machine unknown to the job submitter, the run( ) method preferably does not include anything requiring user interaction or displaying graphics. Once the run( ) method has been executed, the AddNumbers object may include the result of the calculation (in this case, the sum of all integers between the indicated first and last integers for the particular task, inclusive).

The submission mechanism RemoteThread may be used to submit the tasks to the cluster (group) of peers on the network. RemoteThread may be triggered from a second exemplary Java code:

```
public class myApp
{
    public myApp( )
    {
        // Split the job into 10 tasks, each element in the returned
        // array contains a task, i.e., an instance of the
        // AddNumbers class that contains enough information to run
        // the code
        AddNumbers[ ] tasks = prepareTasks(10);
        // Create an instance of RemoteThread with :
        // (a) the array of individual tasks,
        // (b) the directory where the class files for the code are.
        RemoteThread remoteTh =
            new RemoteThread(tasks, new File("AddNumbers"));
        remoteTh.start( ); // Start the job.
        remoteTh.join(10000);        // Check every 10 secs whether the job
                                     // has completed.
        // Retrieve the results.
        Runnable[ ] run = (Runnable[ ]) remoteTh.getRunnable( );
        if (run != null)
            // Process the results
            postprocess (run);
        // Call remove( ) and quit( ) method to stop the RemoteThread
        // cleanly
        removeTh.remove( );
        remoteTh.quit( );
        System.exit(0);
    )
    private AddNumbers[ ] prepareTasks (int numberOfJobs)
    {
        // Create the instances of AddNumbers class for each task
        AddNumbers[ ] task = new AddNumbers [numberOfJobs];
        for (int i=0; i <numberOfJobs; i++)
            tasks [i] = new AddNumvers (1+(i*1000)/numberOfJobs,
                                        ((i+1)*1000)/numberOfJobs);
        return tasks;
    )
    private void postprocess(Runnable[ ] run)
    {
        int sum = 0;
        for (int i = 0; i<run.length; i++)
            sum += ((AddNumbers)run[i]).getResult ( );
        System.out.println("sum = " + sum);
    }
    public static void main (String args[ ]) {
        myApp app = new myApp ( );
    }
}
```

Each task may be identified by one or more values. Using this exemplary code, ten tasks may be run. In this example, each task is identified by the first and last integers of the integers to be added. These values may be passed to the constructor of AddNumbers, and stored in two private integers. At this point, each task is well defined and may be run. A RemoteThread may be created. Two arguments are passed to the RemoteThread, the array of AddNumbers, and the directory in which the class AddNumbers.class is located. The start( ) method may be called to send the tasks to the peer nodes participating in the computation on the network.

In this example, every 10,000 milliseconds a check may be made to determine if the tasks have completed. The join( ) method returns only when all the tasks have completed. After all the tasks are completed, the results of the individual tasks may be retrieved using the getResult( ) method of RemoteThread. In one embodiment implemented according to the distributed computing framework described herein, the remove( ) method removes all tasks belonging to this job from the task repository. If this method is not called, the memory requirements of the repository manager may increase in time. The quit( ) method may be called before exiting the application to quit cleanly.

The following is another example of using an embodiment of the distributed computing mechanism and is included for illustrative purposes and is not intended to be limiting. In one embodiment, this example may be implemented on peer nodes implementing the distributed computing mechanism according to a distributed computing framework such as the exemplary distributed computing framework described above. This example uses the Java programming language, but it is noted that other embodiments may use other programming languages. This example illustrates that the distributed computing mechanism described herein may be used to parallelize execution of tasks in performing work in a distributed heterogeneous networked environment. In one embodiment, the execution kernel and job submission parts of the code may be combined. The following example illustrates the AddNumbers Java code incorporated in the myApp.java code and is included for illustrative purposes and is not intended to be limiting. In this example, the myApp code includes the run( ) method of the Runnable interface:

```
import java.io.Serializable;
public class myApp implements Runnable, Serializable
{
    private int result;
    private int first;
    private int last;
    public myApp (int first, int last)
    {
        result = 0;
```

-continued

```
    this.first = first;
    this.last = last;
};
public myApp( )
{
    // Split the job into 10 tasks, each element in the
    // returned array contains
    AddNumbers[ ] tasks = prepareTasks(10);
    // a task, i.e., an instance of the AddNumbers class that
    // contains enough information to run the code.
    // Create an instance of RemoteThread with:
    // (a) the array of individual tasks,
    // (b) the directory where the class files for the code are.
    RemoteThread remoteTh =
        new RemoteThread(tasks, new File("AddNumbers"));
    RemoteTh.start( ); // Start the job
    RemoteTh.join(10000);      // Check every 10 seconds whether
                               // the job has completed.
    // Retrieve the results.
    Runnable[ ] run = (Runnable[ ])remoteTh.getRunnable( );
    if (run != null)
        // Process the results
        postprocess(run);
//Call remove( ) and quit( ) methods to stop the RemoteThread cleanly
    removeTh.remove( );
    remoteTh.quit( );
    System.exit (0);
}
public void run( )
{
    // loop calculating the sum
    for (int i=first; i<=last; i++)
        result =+i;
);
public int getResult( )
{
    return result;
};
private AddNumbers[ ] prepareTasks (int numberOfJobs)
{
    // Create the instances of AddNumbers class for each task
    AddNumbers[ ] task = new AddNumbers[numberOfJobs];
    for (int i=0; i<numberOfJobs; i++)
        task[i] = new AddNumbers(1+(i*1000)/numberOfJobs,
                                ((i+1)*1000)/numberOfJobs);
    return tasks;
}
private void postprocess (Runnable[ ] run)
{
    int sum = 0;
    for (int i = 0; i<run.length; i++)
        sum += ((AddNumbers)run[i]).getResult( );
    Ssytem.out.println("sum = " + sum);
}
public static void main (String args[ ]) {
    myApp f = new myApp( );
}
}
```

The differences between the first example and this example are noted here. In this example, myApp implements Runnable and Serializable and defines the run( ) method. In this example, there are two different constructors for myApp. The first constructor takes two arguments and may be called to construct the Runnable tasks to the distributed computing mechanism. The second constructor may be used by the job submitter to the distributed computing mechanism. The second constructor is different from the first constructor in that preparation of the work and initialization of the ten tasks is performed by the second constructor. The second constructor may include one or more Graphical User Interfaces (GUIs) for interaction with the job submitter.

The Runnable interface may be implemented by all the codes to be run in parallel on the cluster or group of peer nodes. The Runnable interface may include a run( ) method which takes no argument and returns void. In one embodiment, the Runnable interface may be the same as or similar to the java.lang.Runnable interface. The RemoteThread class may be similar to the java.lang.Thread class and may be used by the application writer to submit an application to be run in parallel to the cluster of peers.

The following is an exemplary description of a process to submit tasks in parallel using embodiments of the distributed computing mechanism. There may be one or more different constructors for RemoteThread. One exemplary RemoteThread constructor is:

public RemoteThread(File codeDir)

Using this constructor to create an instance of the RemoteThread class, the argument is the directory where the classes containing the code to be passed to the peer nodes that will perform the tasks in parallel is located. This code may implement the Runnable interface. With this constructor, the classes may be sent to other peer nodes when the start( ) method is called.

Another exemplary RemoteThread constructor is:

public RemoteThread(Runnable task, File codeDir)

Using this constructor to create an instance of the RemoteThread class, the arguments are a task implementing the Runnable interface, and the directory where the classes containing the code to be passed to the peer nodes that will perform the tasks in parallel is located, as described for the first exemplary constructor. When the start( ) method is called, the classes and the task may be sent to other peer nodes.

Yet another exemplary RemoteThread constructor is:

public RemoteThread(Runnable[ ] tasks, File codeDir):

Using this constructor to create an instance of the RemoteThread class, the arguments are a set of tasks implementing the Runnable interface, and the directory where the classes containing the code to be passed to the peer nodes that will perform the tasks in parallel is located, as described for the first exemplary constructor. When the start( ) method is called, the classes and the tasks may be sent to the other peer nodes.

Still yet another exemplary RemoteThread constructor is:

public RemoteThread (Runnable[ ]H tasks, File codeDir)

This constructor is similar to the previous constructor, except that it takes a set of Runnable arrays. All of the Runnable objects in a given array are executed serially on a single remote or local peer node, while each array in the set may be run separately on different peer nodes. In the previous constructor, each Runnable object constituted an indivisible amount of work; in this constructor, the indivisible amount of work is an array of Runnable objects. This constructor may be used, for example, when the execution time of a single Runnable object is short, and grouping several Runnable objects together may improve the overall performance by decreasing the communication overhead. The results may not be accessible until all of the arrays in the set have completed.

A start( ) method may be called to submit the array of tasks to the group of peer nodes, for example:

public void start( )

A join( ) method may be called, for example:

public void join(int timeInterval)

In this exemplary join( )method, a time interval may be specified to determine how often the RemoteThread should check whether the job submitted has completed.

A method may be called to retrieve the array of Runnable tasks that contain the results of the code executions. The object returned may be of the type Runnable, Runnable[ ] or Runnable [ ][ ], depending on the constructor. For example, the following method may be called:

public object getRunnable( )

In one embodiment, methods may be called to remove the array of Runnable objects containing the results from the code repository and to clean up the RemoteThread before quitting the user application. For example, the following methods may be called:

void remove( )
void quit( )

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent is exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A replicated database system, comprising:
a plurality of server nodes each comprising a replica of a database, wherein the replicas of the database on the server nodes are concurrently accessible to service requests to the database; and
one or more pool nodes, wherein each of the one or more pool nodes is capable of becoming a server node in the replicated database system;
wherein the plurality of server nodes is configured to:
determine whether a new server node is needed in the plurality of server nodes; and
recruit one of the pool nodes as the new server node in the plurality of server nodes, wherein, to recruit one of the pool nodes as the new server node, at least one of the plurality of server nodes is configured to broadcast a message to the pool nodes requesting the pool nodes to volunteer to become the new server node.

2. The replicated database system as recited in claim 1, wherein, to determine whether a new server node is needed, the plurality of server nodes is further configured to detect that one of the server nodes has gone down, wherein the server node that has gone down is replaced with the new server node.

3. The replicated database system as recited in claim 2, wherein each of the plurality of server nodes is further configured to communicate with the other server nodes at periodic or aperiodic intervals, and wherein, to detect that one of the server nodes has gone down, the plurality of server nodes is further configured to detect that the one of the server nodes that has gone down has not communicated with the other server nodes for a specified number of intervals.

4. The replicated database system as recited in claim 1, wherein the pool node recruited as the new server node is configured to:
receive the broadcast message;
stop execution of a current process on the recruited pool node in response to the received broadcast message; and
start execution of a replicated database server process on the recruited pool node in response to the received broadcast message.

5. The replicated database system as recited in claim 1, wherein, to recruit one of the pool nodes as the new server node, the at least one of the plurality of server nodes is further configured to:
receive a response message to the broadcast message from the recruited pool node indicating that the recruited pool node is available to become a server node; and
configure the recruited pool node as the new server node in response to the response message from the recruited pool node.

6. The replicated database system as recited in claim 1, wherein, to recruit one of the pool nodes as the new server node, the at least one of the plurality of server nodes is further configured to replicate the database to the recruited pool node.

7. The replicated database system as recited in claim 1, wherein, to recruit one of the pool nodes as the new server node, at least one of the plurality of server nodes is configured to provide software and configuration information to the recruited pool node to enable the recruited pool node to operate as a server node.

8. The replicated database system as recited in claim 1, wherein, to determine that a new server node is needed, the plurality of server nodes is further configured to determine that demand on the replicated database has increased above a demand threshold.

9. The replicated database system as recited in claim 1, wherein the plurality of server nodes is further configured to:
determine that demand on the replicated database has decreased below a demand threshold;
select one of the server nodes to be released; and
release the selected server node, wherein the selected server node becomes a pool node.

10. The replicated database system as recited in claim 1, wherein each of the plurality of server nodes is further configured to:
periodically or aperiodically broadcast a current status of the server node's replica of the database to the other server nodes;
receive from one or more of the other server nodes differences between the broadcast current status of the server node's replica of the database and a current status of the replica of the database on the one or more other server nodes; and
update the server node's replica of the database according to the received differences.

11. The replicated database system as recited in claim 1, wherein the pool nodes and server nodes are configured to participate as peer nodes in a peer group on a peer-to-peer network.

12. The replicated database system as recited in claim 10, wherein the peer-to-peer network is implemented according to JXTA platform protocols.

13. The replicated database system as recited in claim 1, wherein the pool nodes and server nodes are configured to participate as nodes of a grid computing framework.

14. The replicated database system as recited in claim 1, wherein the replicated database is used to track tasks distributed to computing nodes of a distributed computing system.

15. A server node, comprising:
a processor; and
a memory comprising program instructions and a replica of a database, wherein the program instructions are executable by the processor to implement a replicated database server process configured to communicate with one or more other server nodes to:
determine whether a new server node is needed, wherein, to determine that a new server node is needed, the replicated database server process is further configured to communicate with the one or more other server nodes to determine that demand on the replicated database has increased above a demand threshold; and
recruit a pool node from one or more pool nodes each capable of becoming a server node as the new server node;
wherein each server node comprises a replica of the database, and wherein the replicas of the database on the server nodes are concurrently accessible to service requests to the database.

16. The server node as recited in claim 15, wherein, to determine that a new server node is needed, the replicated database server process is further configured to communicate with the other server nodes to detect that one of the server nodes has gone down, wherein the server node that has gone down is replaced with the new server node.

17. The server node as recited in claim 16, wherein the replicated database server process is further configured to communicate with the other server nodes at periodic or aperiodic intervals, and wherein, to detect that one of the server nodes has gone down, the replicated database server process is further configured to detect that the server node that has gone down has not communicated with the other server nodes for a specified number of intervals.

18. The server node as recited in claim 15, wherein, to recruit a pool node as the new server node, the replicated database server process is further configured to broadcast a message to the one or more pool nodes requesting a volunteer to become the new server node.

19. The server node as recited in claim 18, wherein, to recruit a pool node as the new server node, the replicated database server process is further configured to:
receive a response message to the broadcast message from the recruited pool node indicating that the recruited pool node is available to become a server node; and
configure the recruited pool node as the new server node in response to the response message from the recruited pool node.

20. The server node as recited in claim 15, wherein, to recruit a pool node as the new server node, the replicated database server process is further configured to replicate the database to the recruited pool node.

21. The server node as recited in claim 15, wherein, to recruit a pool node as the new server node, the replicated database server process is further configured to provide software and configuration information to the recruited pool node to enable the recruited pool node to operate as a server node.

22. The server node as recited in claim 15, wherein the replicated database server process is further configured to communicate with the other server nodes to:
determine that demand on the replicated database has decreased below a demand threshold;
select one of the server nodes to be released; and
release the selected server node, wherein the selected server node becomes a pool node.

23. The server node as recited in claim 15, wherein the replicated database server process is further configured to:
periodically or aperiodically broadcast a current status of the server node's replica of the database to the other server nodes;
receive from one or more of the other server nodes differences between the broadcast current status of the server node's replica of the database and a current status of the replica of the database on the one or more other server nodes; and
update the server node's replica of the database according to the received differences.

24. A system, comprising:
means for replicating a database on a plurality of server nodes, wherein the replicas of the database on the server nodes are concurrently accessible to service requests to the database;
means for the server nodes determining whether a new server node is needed in the plurality of server nodes;
means for the server nodes recruiting a pool node from one or more pool nodes as the new server node, wherein each of the one or more pool nodes is capable of becoming a server node in the replicated database system;
means for the server nodes determining that one of the server nodes is no longer needed; and
means for the one of the server nodes to be released, wherein the released server node becomes a pool node.

25. The system as recited in claim 24, further comprising means for synchronizing the replicas of the database on the two or more server nodes.

26. A method for dynamic configuration of a replicated database system, comprising:
a plurality of server nodes determining that a new server node is needed in the plurality of server nodes, wherein each of the plurality of server nodes comprises a replica of a database, and wherein the replicas of the database on the server nodes are concurrently accessible to service requests to the database, wherein said determining that a new server node is needed further comprises determining that demand on the replicated database system has increased above a demand threshold;
the plurality of server nodes recruiting a pool node from one or more pool nodes to become the new server node in the plurality of server nodes, wherein each of the one or more pool nodes is capable of becoming a server node in the replicated database system; and
configuring the recruited pool node to operate as the new server node in the plurality of server nodes.

27. The method as recited in claim 26, wherein said determining that a new server node is needed comprises detecting that one of the server nodes has gone down, wherein the server node that has gone down is replaced with the new server node.

28. The method as recited in claim 27, wherein said detecting that one of the server nodes has gone down comprises:
each of the plurality of server nodes communicating with the other server nodes at periodic or aperiodic intervals; and
one or more of the plurality of server nodes detecting that the one of the server nodes has not communicated with the other server nodes for a specified number of intervals.

29. The method as recited in claim 26, wherein said recruiting a pool node to become the new server node comprises at least one of the plurality of server nodes broadcasting a message to the pool nodes requesting one or more of the pool nodes to volunteer to become the new server node.

30. The method as recited in claim 29,
wherein said recruiting a pool node to become the new server node further comprises one of the plurality of server nodes receiving a response message to the broadcast message from the recruited pool node indicating that the recruited pool node is available to become a server node; and
wherein said configuring the recruited pool node to operate as the new server node comprises the one of the plurality of server nodes configuring the recruited pool node as the new server node in response to the response message.

31. The method as recited in claim 26,
wherein said recruiting a pool node to become the new server node comprises the recruited pool node receiving a broadcast message requesting a pool node to volunteer to become the new server node; and
wherein said configuring the recruited pool node to operate as the new server node comprises:
stopping execution of a current process on the recruited pool node in response to the received broadcast message; and
starting execution of a replicated database server process on the recruited pool node in response to the received broadcast message.

32. The method as recited in claim 26, wherein said configuring the recruited pool node to operate as the new server node comprises one of the plurality of server nodes replicating the database to the recruited pool node.

33. The method as recited in claim 26, wherein said configuring the recruited pool node to operate as the new server node comprises one of the plurality of server nodes providing software and configuration information to the recruited pool node to enable the recruited pool node to operate as a server node.

34. The method as recited in claim 26, further comprising:
the plurality of server nodes determining that demand on the replicated database has decreased below a demand threshold;
the plurality of server nodes selecting one of the server nodes to be released; and
releasing the selected server node, wherein the selected server node becomes a pool node.

35. The method as recited in claim 26, further comprising:
each of the server nodes periodically or aperiodically broadcasting a current status of the server node's replica of the database to the other server nodes;
the server node receiving from one or more of the other server nodes differences between the broadcast current status of the server node's replica of the database and a current status of the replica of the database on the one or more other server nodes; and
the server node updating the server node's replica of the database according to the received differences.

36. The method as recited in claim 26, wherein the pool nodes and server nodes are peer nodes in a peer group on a peer-to-peer network.

37. The method as recited in claim 26, wherein the replicated database is used to track tasks distributed to computing nodes of a distributed computing system.

38. A computer-accessible storage medium, comprising program instructions, wherein the program instructions are computer-executable to implement:
a plurality of server nodes determining that a new server node is needed in the plurality of server nodes, wherein each of the plurality of server nodes comprises a replica of a database, and wherein the replicas of the database on the server nodes are concurrently accessible to service requests to the database, wherein, in said determining that a new server node is needed, the program instructions are further computer-executable to implement determining that demand on the replicated database has increased above a demand threshold;
the plurality of server nodes recruiting a pool node from one or more pool nodes to become the new server node in the plurality of server nodes, wherein each of the one or more pool nodes is capable of becoming a server node in the replicated database system; and
configuring the recruited pool node to operate as the new server node in the plurality of server nodes.

39. The computer-accessible storage medium as recited in claim 38, wherein, in said determining that a new server node is needed, the program instructions are further computer-executable to implement detecting that one of the server nodes has gone down, wherein the server node that has gone down is replaced with the new server node.

40. The computer-accessible storage medium as recited in claim 39, wherein, in said detecting that one of the server nodes has gone down, the program instructions are further computer-executable to implement:
each of the plurality of server nodes communicating with the other server nodes at periodic or aperiodic intervals; and
one or more of the plurality of server nodes detecting that the one of the server nodes has not communicated with the other server nodes for a specified number of intervals.

41. The computer-accessible storage medium as recited in claim 38, wherein, in said recruiting a pool node to become the new server node, the program instructions are further computer-executable to implement at least one of the plurality of server nodes broadcasting a message to the pool nodes requesting one or more of the pool nodes to volunteer to become the new server node.

42. The computer-accessible storage medium as recited in claim 41,
wherein, in said recruiting a pool node to become the new server node, the program instructions are further computer-executable to implement one of the plurality of server nodes receiving a response message to the broadcast message from the recruited pool node indicating that the recruited pool node is available to become a server node; and
wherein, in said configuring the recruited pool node to operate as the new server node, the program instructions are further computer-executable to implement the one of the plurality of server nodes configuring the recruited pool node as the new server node in response to the response message.

43. The computer-accessible storage medium as recited in claim 38,
wherein, in said recruiting a pool node to become the new server node, the program instructions are further computer-executable to implement the recruited pool node receiving a broadcast message requesting a pool node to volunteer to become the new server node; and
wherein, in said configuring the recruited pool node to operate as the new server node, the program instructions are further computer-executable to implement:
stopping execution of a current process on the recruited pool node in response to the received broadcast message; and starting execution of a replicated database server process on the recruited pool node in response to the received broadcast message.

44. The computer-accessible storage medium as recited in claim 38, wherein, in said configuring the recruited pool node to operate as the new server node, the program instructions are further computer-executable to implement one of the plurality of server nodes replicating the database to the recruited pool node.

45. The computer-accessible storage medium as recited in claim 38, wherein, in said configuring the recruited pool node to operate as the new server node, the program instructions are further computer-executable to implement one of the plurality of server nodes providing software and configuration information to the recruited pool node to enable the recruited pool node to operate as a server node.

46. The computer-accessible storage medium as recited in claim 38, wherein the program instructions are further computer-executable to implement:
  the plurality of server nodes determining that demand on the replicated database has decreased below a demand threshold;
  the plurality of server nodes selecting one of the server nodes to be released; and
  releasing the selected server node, wherein the selected server node becomes a pool node.

47. The computer-accessible storage medium as recited in claim 38, wherein the program instructions are further computer-executable to implement:
  each of the server nodes periodically or aperiodically broadcasting a current status of the server node's replica of the database to the other server nodes;
  the server node receiving from one or more of the other server nodes differences between the broadcast current status of the server node's replica of the database and a current status of the replica of the database on the one or more other server nodes; and
  the server node updating the server node's replica of the database according to the received differences.

48. The computer-accessible storage medium as recited in claim 38, wherein the pool nodes and server nodes are peer nodes in a peer group on a peer-to-peer network.

49. The computer-accessible storage medium as recited in claim 38, wherein the replicated database is used to track tasks distributed to computing nodes of a distributed computing system.

\* \* \* \* \*